United States Patent
Kuki

(10) Patent No.: US 8,840,974 B2
(45) Date of Patent: Sep. 23, 2014

(54) OPTICAL FILM, POLARIZING PLATE AND LIQUID CRYSTAL DISPLAY APPARATUS

(75) Inventor: Ryota Kuki, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 530 days.

(21) Appl. No.: 12/203,210

(22) Filed: Sep. 3, 2008

(65) Prior Publication Data

US 2009/0068377 A1    Mar. 12, 2009

(30) Foreign Application Priority Data

Sep. 6, 2007 (JP) ................ 2007-231262

(51) Int. Cl.
G02B 5/30 (2006.01)
G02B 1/10 (2006.01)
C08J 7/04 (2006.01)

(52) U.S. Cl.
CPC ............... G02B 1/105 (2013.01); C08J 7/047 (2013.01); C08J 2301/12 (2013.01); G02B 5/30 (2013.01)
USPC .............................. 428/1.33; 349/96; 349/122

(58) Field of Classification Search
CPC ........... G02B 1/105; G02B 5/30; C08L 1/10; C08L 1/12; C08L 1/14; C07H 15/00; C07H 15/06; C08J 2301/12; C08J 17/047
USPC ........................ 428/1.31, 1.33; 349/96, 122
See application file for complete search history.

(56) References Cited

U.S. PATENT DOCUMENTS

| | | | | |
|---|---|---|---|---|
| 2,926,174 A | * | 2/1960 | Linn | 549/417 |
| 3,291,625 A | * | 12/1966 | Faraone et al. | 106/18.18 |
| 3,314,940 A | * | 4/1967 | Lemmerling et al. | 536/59 |
| 3,384,532 A | * | 5/1968 | Martins et al. | 428/430 |
| 3,477,969 A | * | 11/1969 | Parker | 428/416 |
| 3,495,998 A | * | 2/1970 | Rose, Jr. et al. | 106/162.7 |
| 3,959,193 A | * | 5/1976 | Putman et al. | 524/40 |
| 5,006,648 A | * | 4/1991 | Van der Plank et al. | 536/119 |
| 5,750,605 A | * | 5/1998 | Blumenthal et al. | 524/230 |
| 5,759,643 A | * | 6/1998 | Miyashita et al. | 428/1.31 |
| 6,383,559 B1 | * | 5/2002 | Nakamura et al. | 427/180 |
| 8,445,081 B2 | | 5/2013 | Murakami et al. | |
| 2003/0171458 A1 | * | 9/2003 | Buchanan et al. | 524/32 |
| 2005/0154086 A1 | * | 7/2005 | Yoneyama | 523/213 |
| 2008/0049324 A1 | * | 2/2008 | Murakami et al. | 359/500 |
| 2008/0057227 A1 | * | 3/2008 | Suzuki et al. | 428/1.1 |
| 2009/0096962 A1 | * | 4/2009 | Shelton et al. | 349/96 |
| 2010/0089288 A1 | * | 4/2010 | Shelby et al. | 106/170.12 |

FOREIGN PATENT DOCUMENTS

| | | |
|---|---|---|
| JP | 2007-169592 | 7/2007 |
| JP | 2007-219110 | 8/2007 |
| WO | 2007/069490 | 6/2007 |

OTHER PUBLICATIONS

Japanese Office Action, Japanese Patent Application No. 2009-531206, dated May 25, 2012.
English translatiion of Japanese Office Action, Japanese Patent Application No. 2009-531206, dated May 25, 2012.
KIPO Office Action, Application No. 10-2010-7004634, Mailing Date: Mar. 26, 2014 (1 page).
English translation of KIPO Office Action, Application No. 10-2010-7004634, Mailing Date: Mar. 26, 2014 (4 page).

\* cited by examiner

*Primary Examiner* — Sophie Hon
(74) *Attorney, Agent, or Firm* — Lucas & Mercanti, LLP

(57) ABSTRACT

Disclosed is an optical film having a hard coat layer on a cellulose ester film, which contains an ester compound composed of a furanose structure or a pyranose structures and a sum of a number of the furanose structures or the pyranose structure is 1 to 12, provided that a part of hydroxy groups of the furanose structure or the pyranose structure has been esterified and a part of hydroxy groups of the furanose structure or the pyranose structure remains.

15 Claims, No Drawings

OPTICAL FILM, POLARIZING PLATE AND LIQUID CRYSTAL DISPLAY APPARATUS

This application is based on Japanese Patent Application No. 2007-231262 filed on Sep. 6, 2007 in Japanese Patent Office, the entire content of which is hereby incorporated by reference.

FIELD OF THE INVENTION

The present invention relates to optical film, a polarizing plate and a liquid crystal display apparatus, and particularly relates to optical film such as hard coat film and antireflection film which exhibits high transparency and superior visual recognition property with respect to such as light leakage and front contrast, and a polarizing plate and a liquid crystal display apparatus utilizing the same.

BACKGROUND OF THE INVENTION

In recent years, highly functional optical film provided with such as an antireflection function and a hard coat function is required in accordance with full colorization of a note personal computer and a cell phone, and higher precision requirement for a display. Recently, to improve visual recognition property, it has been required to provide the surface with such as antireflection property and anti-stain property; and, for example, developed has been optical film having a functional layer comprising such as metal oxide on cellulose ester film directly or intervening another layer. Further, the thinner layer thickness of utilized film is required to realize a thinner display apparatus, or the larger width of optical film is required to realize a larger image plane. Particularly with respect to a large image plane, optical film having excellent flatness is required; however, conventional film cannot achieve excellent flatness and has a problem of haze generation particularly in the case of a large width and a thin layer thickness.

Generally, additives such as a plasticizer and an ultraviolet absorbent are contained in cellulose ester film. These additives are added to improve processing behavior and moisture permeability of cellulose ester film However, on the other hand, by incorporation of these additives, there was a problem of deterioration in coating behavior at the time of arranging various coating layers on cellulose ester film.

In particular, there was a problem of change in physical properties due to bleed out or evaporation of these additives resulting in deterioration of storage stability and haze of cellulose ester film before processing.

To overcome these problems, accumulated type cellulose ester film by means of a co-extrusion method to provide distribution along the thickness direction, with respect to an incorporation method of a plasticizer and an ultraviolet absorbent, has been disclosed (for example, refer to patent documents 1 and 2). Further, such as a method to change types of a plasticizer, to utilize a new plasticizer or to incorporate plural types of plasticizers has been disclosed (for example, refer to patent documents 3-5). However, it is a present state that the effect is limited in the case of film having a large width and a thin layer thickness, and improvement of flatness and haze is insufficient.

Further, at the time of forming a hard coat layer on the aforesaid cellulose ester film, generally, a curable substance layer which is cured by actinic rays such as ultraviolet rays is coated and cured by irradiation of actinic rays. At this time, when flatness deterioration or bleed out is present in cellulose ester film as a substrate, there was a problem of generation of coating unevenness to further deteriorate flatness in accordance with curing shrinkage of a hard coat layer by irradiation of actinic rays. The phenomenon was particularly significant with cellulose ester film having a large width.

Further, in the case of coating an antireflection layer on a hard coat layer to prepare antireflection film, the aforesaid flatness deterioration will deteriorate the antireflection function itself and handling characteristics, which will be a cause to generate light leakage, visual recognition deterioration and color shading when said antireflection film is utilized in a polarizing plate or a display apparatus, and desired has been cellulose ester film having excellent flatness and haze even when a hard coat layer or an antireflection layer is provided.

[Patent Document 1] JP-A 2001-131301 (JP-A refers to Japanese Patent Publication Open to Public Inspection No.)

[Patent Document 2] JP-A 2002-90544

[Patent Document 3] JP-A H11-246704

[Patent Document 4] JP-A 2001-247717

[Patent Document 5] Japanese Translation of PCT International Application Publication No. 2005-515285

SUMMARY OF THE INVENTION

Problems to be Solved by the Present Invention

Therefore, an object of this invention is to provide cellulose ester film excellent in flatness and haze; to provide optical film having excellent visual recognition property with respect to such as light leakage and front contrast by decreasing coating unevenness and by increasing uniformity at the time of coating a hard coat layer on said cellulose ester film; and to provide a polarizing plate and a liquid crystal display apparatus being excellent in visual recognition property by employing said optical film.

The above-described object of this invention can be achieved by the following constitutions.

1. Optical film which is provided with at least a hard coat layer on cellulose ester film, wherein said cellulose ester film contains not less than one and not more than 12 of at least one type of a furanose structure or a pyranose structure and said esterified compound is an esterified compound in which a part of OH groups remains.

2. The optical film described in the item 1 wherein the aforesaid esterified compound is esterified by bonding of not less than one and not more than 6 of at least one type of a furanose structure or a pyranose structure.

3. The optical film described in the item 1 or 2, wherein the aforesaid esterified compound is provided with at least one furanose ring.

4. The optical film described in any one of the items 1-3, wherein the aforesaid esterified compound is a compound esterified by acid having an aromatic ring of monosaccharide (α-glucose, β-fructose) or a compound esterified by acid having an aromatic ring of polysaccharide of m+n=1-12 which is formed by dehydration condensation of not less than arbitrary two positions of —OR$_{12}$, —OR$_{15}$, —OR$_{22}$ and —OR$_{25}$ in monosaccharide represented by following formula (A).

Formula (A)

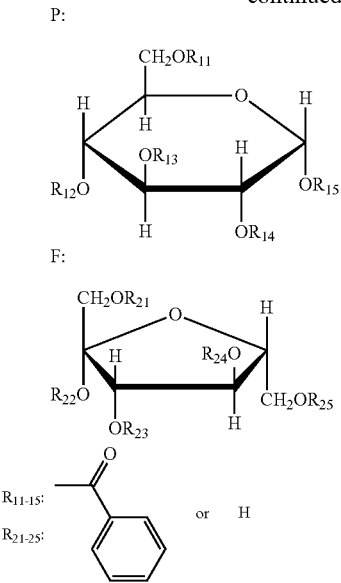

(wherein, acid having an aromatic ring may be provided with a substituent)

5. The optical film described in any one of the items 1-4, wherein the aforesaid cellulose ester film contains acrylic polymer.

6. The optical film described in any one of aforesaid items 1-5, wherein acetyl group substitution degree X of cellulose ester contained in the aforesaid cellulose ester film satisfies the following formula.

$$2.8 \leq X \leq 3.0 \quad \text{(Formula)}$$

7. The optical film described in any one of aforesaid items 1-6, wherein the aforesaid hard coat layer is comprised of urethane acrylate resin.

8. The optical film described in any one of aforesaid items 1-7, wherein an antireflection layer is provided on the aforesaid hard coat layer and said antireflection layer is comprised of at least a low refractive index layer containing hollow silica micro-particles.

A polarizing plate characterized by having the optical film described in any one of aforesaid items 1-8 on at least one surface.

10. A liquid crystal display apparatus having the polarizing plate described in aforesaid item 9.

According to this invention, provided can be cellulose ester film excellent in flatness and haze; and provided can be optical film having excellent visual recognition property with respect to such as light leakage and front contrast by decreasing coating unevenness and increasing uniformity at the time of coating a hard coat layer on said cellulose ester film. Further, provided can be a polarizing plate and a liquid crystal display apparatus which are excellent in visual recognition property by employing said optical film.

DETAILED DESCRIPTION OF THE INVENTION

In the following, the best embodiment to practice this invention will be detailed.

Optical film of this invention is characterized in that at least a hard coat layer is provided on cellulose ester film and said cellulose ester film contains not less than one and not more than 12 of at least one type of a furanose structure or a pyranose structure and said esterified compound is an esterified compound in which a part of OH groups remains. This invention can provide film for optical applications, which exhibits excellent flatness and haze as well as excellent visual recognition property with respect to such as light leakage and front contrast, by decreasing coating unevenness at the time of coating a hard coat layer and improving uniformity.

The inventors of this invention have found that compatibility of cellulose ester and said esterified compound is significantly increased and cellulose ester film having a hard coat layer exhibiting high transparency and high flatness without coating unevenness due to an effect of decreasing bleed out can be prepared, when cellulose ester film contains an esterified compound which is prepared by esterifying a compound in which not less than one and not more than 12 of at least one type of a furanose structure or a pyranose structure bond, and said esterified compound is a compound in which a part of OH groups remains. Further, a polarizing plate exhibiting excellent visual recognition property with respect to such as light leakage and front contrast can be provided by employing said hard coat film.

Generally, cellulose ester is manufactured as a mixture of one having a higher substitution degree and one having a lower substitution degree, compared to the total substitution degree of an acyl group unequivocally determined as a mean value. Cellulose ester utilized in this invention is also such a mixture, however, in said cellulose ester, there is a unit having three residual hydroxyl groups, and there are also units having two, one or none thereof, when attention is given to one glucose unit; that is, a mixture of cellulose ester having various hydroxyl group numbers. For such cellulose ester, an interaction is insufficient with a single saccharose derivative, and it is important to incorporate saccharose derivatives containing a hydroxyl group capable of providing a hydrogen bond, which is a strong inter-molecular action against cellulose ester; it is estimated that each of said derivative can effectively provide an interaction against each cellulose ester (glucose unit) having different number of hydroxyl groups. It is considered that various effects of this invention described before resulted by enhancement of an interaction between cellulose ester as polymer and a saccharose derivative as a low molecular weight substance.

The ester compound according to this invention contains at least one of hydroxy group. The compound preferably has no hydroxy group of 0-90% by weight, one hydroxy group of 10-90% by weight, two hydroxy groups of 0-50% by weight, and three or more hydroxy groups of 0-20% by weight, and more preferably no hydroxy group of 0-75% by weight, one hydroxy group of 20-80% by weight, two hydroxy groups of 5-30% by weight, and three or more hydroxy groups of 5-10% by weight.

In the following, constituent elements will be explained.

<Esterified Compound in Which Not Less Than One and Not More Than 12 of at Least One Type of Furanose Structure or Pyranose Structure Bond>

Cellulose ester film of this invention is characterized by that an esterified compound, which is prepared by esterifying a compound in which not less than one and not more than 12 of at least one type of a furanose structure or a pyranose structure bond, is incorporated and said esterified compound is an esterified compound a part of OH groups of which remains in this invention, an esterified compound is also generally called as a saccharose ester compound.

Further, the aforesaid esterified compound is preferably esterified by bonding of not less than 1 and not more than 6 of at least one type of a furanose structure or a pyranose structure.

Further, the aforesaid esterified compound is preferably benzoic acid ester of monosaccharide (α-glucose, β-fructose) or benzoic acid ester of polysaccharide prepared by dehydration condensation of arbitrary two of —OR$_{12}$, —OR$_{15}$, —OR$_{22}$ and —OR$_{25}$ in monosaccharide, in which m+n=2-12, represented by the aforesaid formula.

—OR$_{11}$— —OR$_{15}$, and —OR$_{21}$— —OR$_{25}$ are specifically preferably a benzoyl group or a hydrogen atom. A benzoyl group may be further provide with substituent R$_{26}$; which includes such as an alkyl group, an alkenyl group, an alkoxy group and a phenyl group, and these alkyl group, alkenyl group and a phenyl group may be further provided with a substituent. Oligosaccharide can be prepared in a similar method to an esterified compound of this invention.

Examples of an esterified compound of this invention include the following; however, this invention is not limited thereto.

Listed is glucose, galactose, mannose, fructose, xylose, arabinose, lactose, sucrose, nistose, 1F-fructosyl nystose, stachyose, maltitol, lactitol, lactulose, cellobiose, maltose, cellotriose, maltotriose, raffinose or kestose.

In addition to these, listed are such as gentiobiose, gentiotriose, gentiotetraose, xylotriose and galactosylscurose.

Among these compounds, compounds having the both of a pyranose structure and a furanose structure are preferable.

Such as sucrose, kestose, nistose, 1F-fructosyl nistose and stachyose are preferable, and sucrose is more preferable.

Monocarboxylic acid utilized for esterification of a part of OH groups in a pyranose structure or a furanose structure according to this invention is not specifically limited, and such as aliphatic monocarboxylic acid, alicyclic monocarboxylic acid and aromatic monocarboxylic acid, which are well known in the art, can be utilized. Carboxylic acid utilized may be one type or a mixture of not less than two types.

Preferable aliphatic monocarboxylic acid includes saturated fatty acid such as acetic acid, propionic acid, butyric acid, isobutyric acid, valeric acid, caproic acid, enanthic aid, caprylic acid, pelargonic acid, capric acid, 2-ethyl-hexane carboxylic acid, undecylic acid, lauric acid, tridecylic-acid, myristic acid, pentadecylic acid, palmitic acid, heptadecylic acid, stearic acid, nonadecanoic acid, arachic acid, behenic acid, ligunoceric acid, cerotic acid, heptacosanoic acid, montanic acid, melissic acid and lacceric acid; and unsaturated fatty acid such as undecylenic acid, oleic acid, sorbid acid, linoleic acid, linolenic acid, arachidonic acid and octenoic acid.

Examples of preferable alicyclic monocarboxylic acid include acetic acid, cyclopentanecarboxylic acid, cyclohexanecarboxylic acid, cyclooctanecarboxylic acid or derivatives thereof.

Examples of aromatic monocarboxylic acid include aromatic monocarboxylic acid in which an alkyl group or an alkoxy group is introduced to a benzene ring of such as benzoic acid and toluic acid; aromatic monocarboxylic acid having at least two benzene rings such as benzilic acid, biphenyl carboxylic acid, naphthalene carboxylic acid, tetralin carboxylic acid or derivatives thereof; more specifically, include xylylic acid, hemellitic acid, mesitylenic acid, prehnitylic acid, γ-isodurylic acid, durylic acid, mesitonic acid, α-isodurylic acid, cuminic acid, α-toluic acid, hydroatropic acid, atropic acid, hydrocinnamic acid, salicylic acid, o-anisic acid, m~anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asarylic acid, mandelic acid, homoanisic acid, homovanillic acid, homoveratric acid, o-homoveratric acid, phthalonic acid and p-coumaric acid; however, specifically preferable is benzoic acid.

An ester compound of oligosaccharide can be applied as a compound having 1-12 of at least one type of a pyranose structure or a furanose structure according to this invention.

Oligosaccharide is manufactured by acting an enzyme such as amylase on such as starch and saccharose, and oligosaccharide applicable in this invention includes such as maltooligosaccharide, isomaltooligosaccharide, furactooligosaccharide, galactooligosaccharide and xylooligosaccharide.

In the following, specific examples of an esterified compound according to this invention will be listed; however, this invention is not limited thereto.

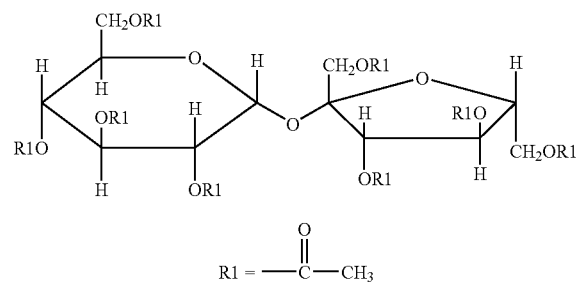

Compound 1

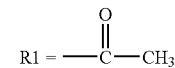

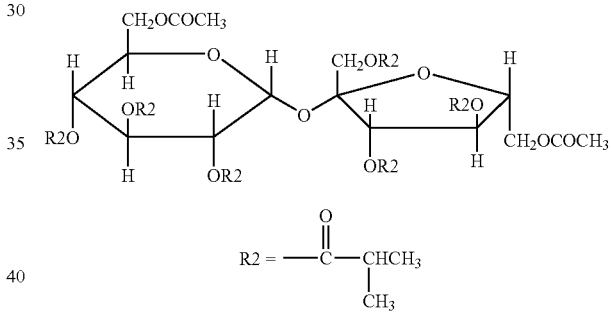

Compound 2

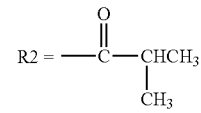

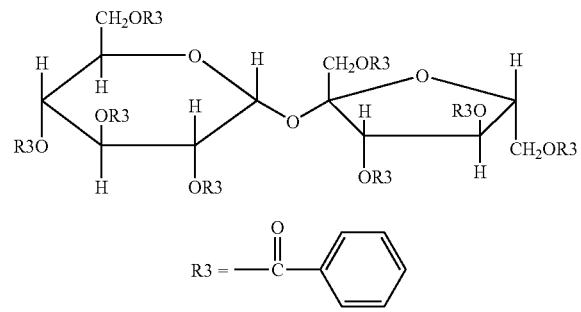

Compound 3

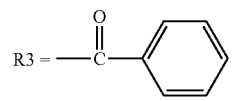

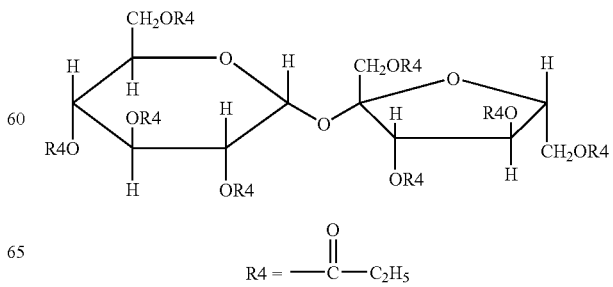

Compound 4

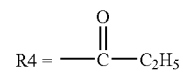

Compound 5
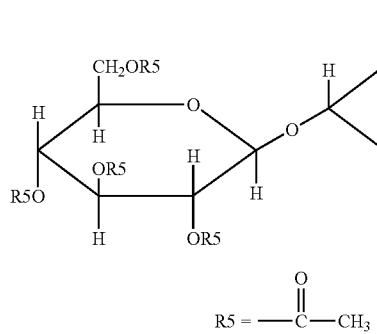
Compound 6
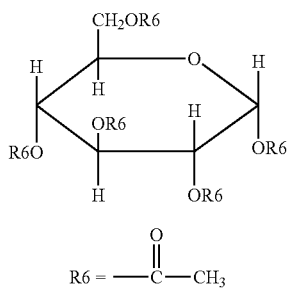
Compound 7
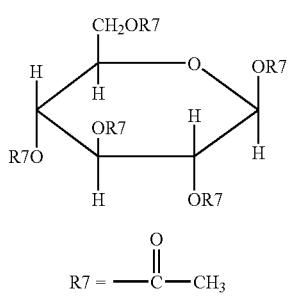
Compound 8
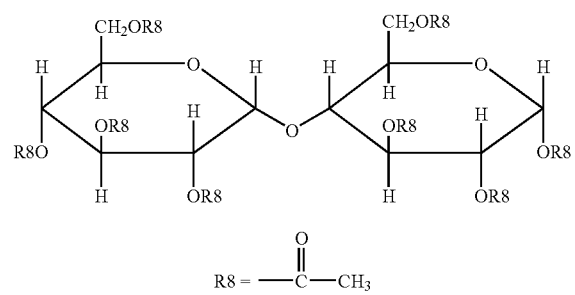
Compound 9
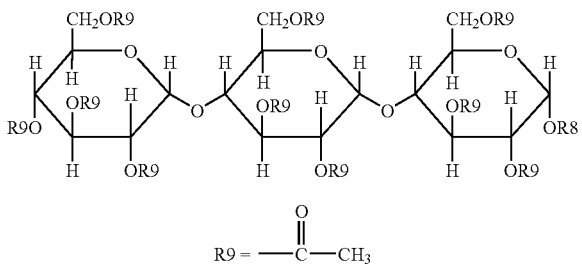
Compound 10
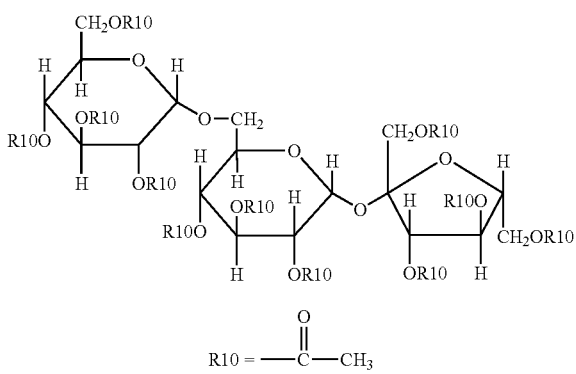
Compound 11
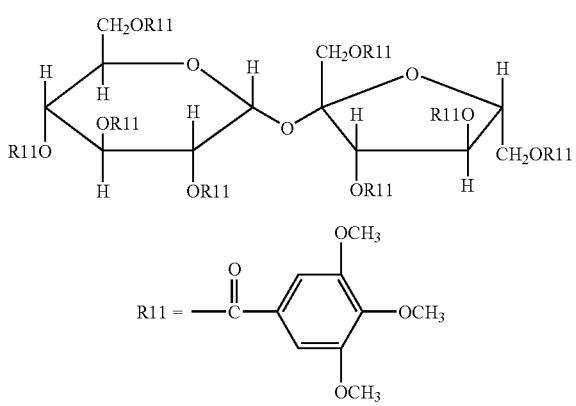
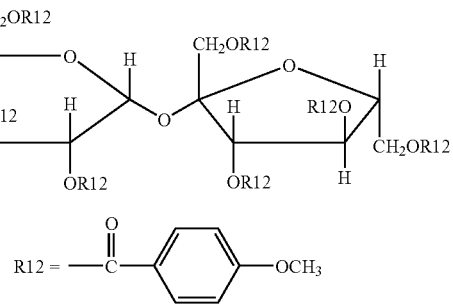
Compound 12
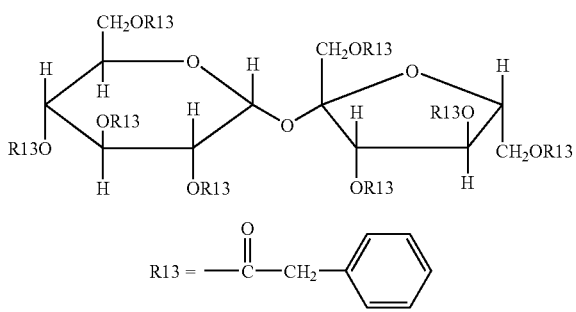
Compound 13

Compound 14
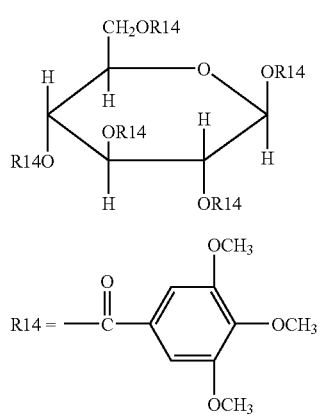
Compound 15
Compound 16
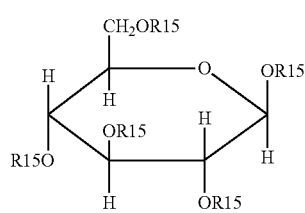
Compound 17
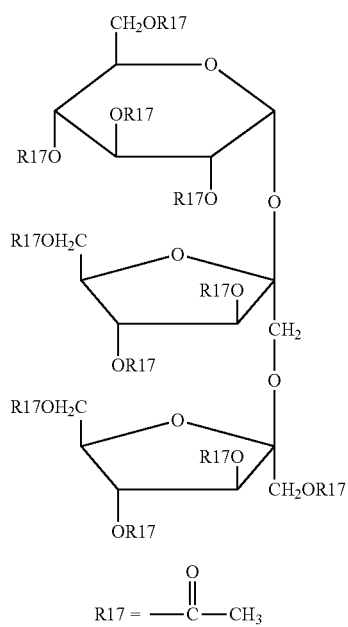
Compound 18
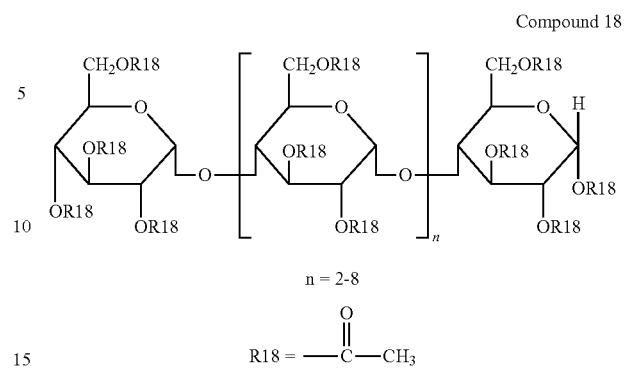
n = 2-8
Compound 19
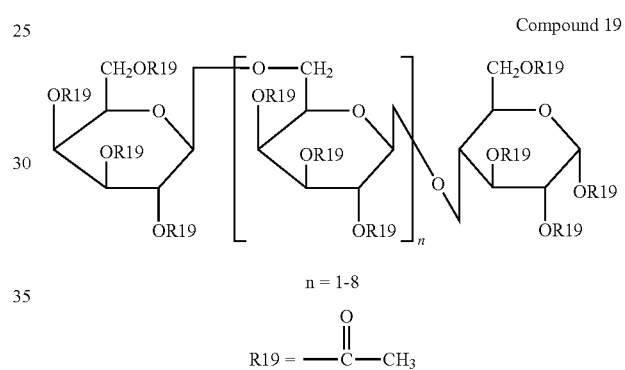
n = 1-8
Compound 20
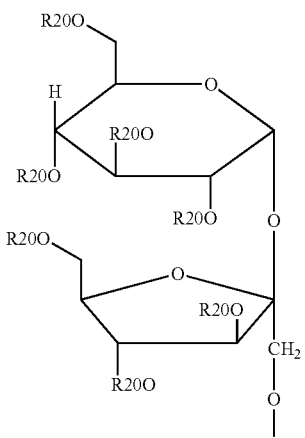

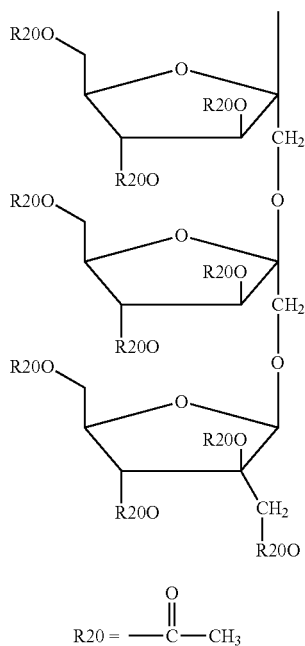

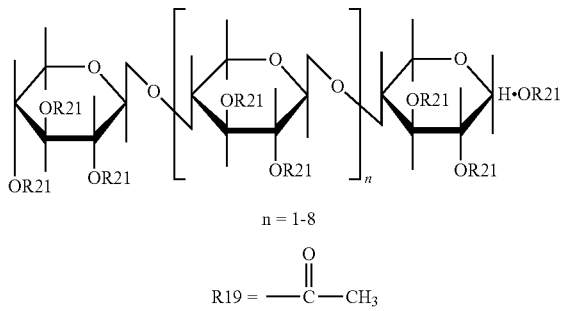

Compound 21

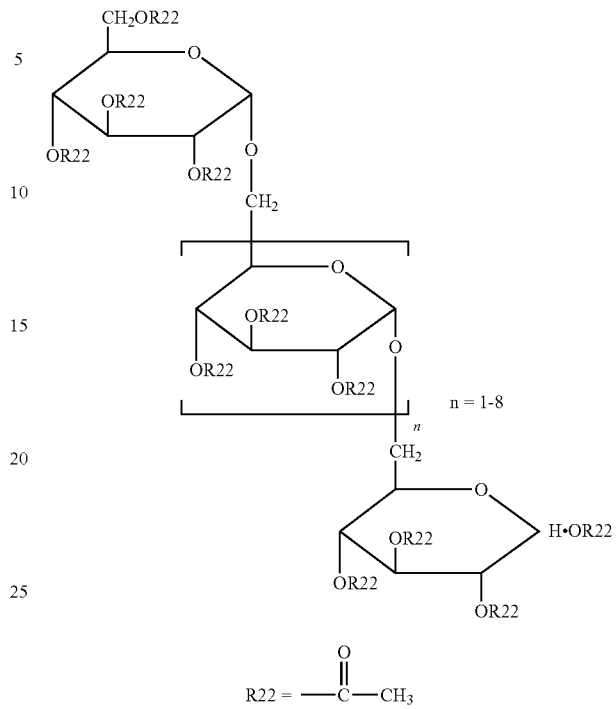

Compound 22

As for the substituents R1 through R22 of Compounds 1-22, at least one of the substituent in each compound represents a hydrogen atom.

Next, an example of a manufacturing method of an esterified compound of this invention will be described.

(Synthesis of Example Compound 3)

A four-necked flask equipped with a stirrer, a reflux condenser, a thermometer and a nitrogen gas introducing tube was charged with 34.2 g (0.1 mol) of saccharose, 180.8 g (0.8 mol) of benzoic acid anhydride and 379.7 g (4.8 mol) of pyridine, and the temperature was raised with stirring while introducing a nitrogen gas through the nitrogen gas introducing tube to conduct an esterification reaction at 70° C. for 5 hours. Next, after the inside of the flask was made to a reduced pressure of not higher than $4 \times 10^2$ Pa to eliminate excess pyridine by evaporation at 60° C., the inside of the flask was made to a reduced pressure of not higher than $1.3 \times 10$ Pa and a temperature of 120° C. to eliminate the most part of benzoic acid anhydride and generated benzoic acid by evaporation. Then, 1 L of toluene and 300 g of a 0.5 weight % sodium carbonate aqueous solution were added, and after stirring at 50° C. for 30 minutes, the system was left standing to take but the toluene layer. Finally, the toluene layer taken out was added with 100 g of water, and the toluene layer was taken out after washing at ordinary temperature for 30 minutes, toluene being eliminated by evaporation at 60° C. under a reduced pressure (not higher than $4 \times 10^2$ Pa), whereby an esterified compound was prepared. The prepared compound was analyzed by means of HPLC and LC-MASS to measure the number of residual hydroxyl groups and the ratio thereof in the compound, and it has been proved that the product is a mixture of one OH group (80 weight %), two OH groups (15 weight %) and not less than three OH groups (5 weight %). Herein, by purification of a part of the prepared mixture by column chromatography utilizing silica gel, each compound having a purity of 100% was obtained.

Optical film of this invention preferably contains 1-30 weight % of an esterified compound according to this invention against cellulose ester film and specifically preferably contains 5-30 weight %. It is preferable that an excellent effect of this invention is exhibited as well as no bleed out is generated in the case of this range.

(Cellulose Ester)

Cellulose ester contained in cellulose ester film of this invention is not specifically limited; however, cellulose ester is carboxylic acid ester having a carbon number of approximately 2-22, may be ester of aromatic carboxylic acid and specifically preferably is lower fatty acid ester of cellulose in lower fatty acid ester of cellulose, lower fatty acid means fatty acid having a carbon number of not more than 6. An acyl group bonding to a hydroxyl group may be a straight chain or a branched chain, or may form a ring. Further, the acyl group may be substituted by other substituents. In the case of a same substitution degree, it is preferable to select among acyl groups having a carbon number of preferably 2-6. The carbon number of the aforesaid cellulose ester is preferably 2-4 and more preferably 2-3.

The aforesaid cellulose ester can employ acyl groups derived from mixed acid, and specifically preferably can employ acyl groups having carbon numbers of 2 and 3, or carbon numbers of 2 and 4. As cellulose ester of this invention, utilized can be mixed fatty acid ester of cellulose, in which propionate group or a butyrate group bonds in addition to an acetyl group, such as cellulose acetate propionate, cellulose acetate butyrate or cellulose acetate propionate butyrate. Herein, as a butyryl group to form butyrate may be either a straight chain form or branched. As cellulose ester of this invention, cellulose acetate, cellulose acetate butyrate, cellulose acetate propionate and cellulose acetate phthalate are specifically preferably utilized.

Among them, cellulose triacetate is preferably utilized. In cellulose triacetate, it is preferable that the cellulose triacetate has an acetyl group substitution degree X of cellulose ester of $2.8 \leq X \leq 3.0$. Measurement of a substitution degree of an acyl group can be performed based on ASTM-D817-96.

Within the aforesaid range of an acyl group substitution degree, it is preferable that humidity dependence of retardation and ability to protect a polarizer as a polarizing plate protective film are improved because reacted parts against hydroxyl groups of a pyranose ring constituting the skeleton of cellulose resin is small to leave less said hydroxyl groups.

Cellulose as a starting material of cellulose ester utilized in this invention is not specifically limited, and includes such as cotton linter, wood pulp and kenaf. Further, cellulose ester prepared from them can be utilized by mixing each of them at an arbitrary ratio.

Cellulose ester according to this invention, in the case that an acylation agent as a cellulose starting material is acid anhydride, is prepared by a reaction utilizing a proton type catalyst such as sulfuric acid in an organic acid such as acetic acid or in an organic solvent such as methylene chloride. In the case that an acylation agent is acid chloride ($CH_3COCl$, $C_2H_5COCl$ or $C_3H_7COCl$), the reaction is performed utilizing a basic compound such as amine as a catalyst. Specifically, the synthesis can be performed referring to a method described in JP-A H10-54804.

An average substitution degree of an acyl group at the 6-position of a glucose unit of cellulose ester utilized in this invention is preferably 0.5-0.9.

A highly reactive primary hydroxyl group is present at the 6-position of a glucose unit constituting cellulose ester, different from the 2-position and the 3-position, and this primary hydroxyl group preferentially forms sulfuric ester in a manufacturing process of cellulose ester employing sulfuric acid as a catalyst. Therefore, in an esterification reaction of cellulose, the average substitution degree at the 2-position and the 3-position of a glucose unit can be made larger that that at the 6-position by increasing the amount of sulfuric acid as a catalyst, compared to general cellulose ester. Further, when necessary, since a hydroxyl group at the 6-position of a glucose unit can be selectively protected when cellulose is tritylated, it is possible to make the average substitution degree at 2-position and the 3-position of a glucose unit larger than that at the 6-position, by protecting a hydroxyl group at the 6-position by tritylation and releasing a trityl group (a protective group) after esterification. Specifically, cellulose ester manufactured by a method described in JP-A 2005-281645 can be also preferably utilized.

It is necessary to prolong the time of an acetylation reaction to increase an acetylation degree in the case of acetyl cellulose. However, when the reaction time is excessively long, decomposition will proceed simultaneously to cause such as cut off of a polymer chain and decomposition of an acetyl group, which leads to an unfavorable result. Therefore, it is necessary to set the reaction time of a certain range to increase the acetylation degree and depress decomposition to some extent. To regulate by reaction time is not suitable because the reaction conditions are various to be changed depending on the reaction equipment and installation and other conditions. Since molecular weight distribution is broadened as decomposition of polymer proceeds, also in the case of cellulose ester, the degree of decomposition can be determined by a value of weight average molecular weight (Mw)/number average molecular weight (Mn), which is generally utilized. That is, in a process of acetylation of cellulose triacetate, a value of weight average molecular weight (Mw)/number average molecular weight (Mn) can be utilized as one index not to advance decomposition too much due to prolonged reaction time but to perform acetylation reaction for sufficient time.

An example of a manufacturing method of cellulose ester will be shown below. Cotton linter of 100 weight parts as a cellulose starting material was crushed, being added with 40 weight parts of acetic acid, and the resulting system was subjected to a pretreatment activation at 36° C. for 20 minutes. Thereafter, the system was added with 8 weight parts of sulfuric acid, 260 weight parts of acetic acid anhydride and 350 weight parts of acetic acid, and the resulting system was subjected to esterification at 36° C. for 120 minutes. After neutralization with 11 weight parts of a 24% magnesium acetate aqueous solution, saponification repining at 63° C. for 35 minutes was performed to prepare acetyl cellulose. The product, after having been stirred for 160 minutes at room temperature by use of 10 times of an acetic acid aqueous solution (acetic acid/water=1/1 (weight ratio)), was filtered and dried to prepare purified acetyl cellulose having an acetyl substitution degree of 2.75. This acetyl cellulose had Mn of 92,000 Mw of 156,000 and Mw/Mn of 1.7. In a similar manner, by adjusting esterification conditions (temperature, time, stirring) and hydrolysis conditions, cellulose ester having a different substitution degree and a different Mw/Mn can be synthesized. Cellulose ester having an Mw/Mn ratio of 1.4-5.0 is preferably utilized.

Herein, cellulose ester synthesized is preferably subjected to purification to remove a low molecular weight component and to filtration to remove a component which has not been acetylated or has a low acetylation degree.

Further, mixed-acid cellulose ester can be prepared by a method described in JP-A H10-45804.

Further, cellulose ester is also affected by trace amounts of metal components in cellulose ester. These are considered to be related with water utilized in a manufacturing process, and a component which forms insoluble nuclei is preferably as small as possible in quantity; and metal ions of such as iron, calcium and magnesium, which may form an insoluble product by salt formation with such as polymer decomposition product possibly containing an organic acid group, are preferably small in quantity. An iron (Fe) component is preferably not more than 1 ppm. A calcium (Ca) component is easily form a coordination compound, that is a complex, with a acid component such as carboxylic acid and sulfonic acid as well as with many ligands, to form many insoluble scum (insoluble sediment, muddiness) derived from calcium.

A calcium (Ca) component is not more than 60 ppm and preferably 0-30 ppm. A magnesium (Mg) component is preferably 0-70 ppm and specifically preferably 0-20 ppm, since an excess amount thereof also generates an insoluble product. Metal components such as a content of iron (Fe), calcium (Ca) and magnesium (Mg) can be analyzed by use of an ICP-AES (an induction coupling plasma emission spectrophotometer) after completely dried cellulose ester is subjected to pretreatment by a micro-digest wet decomposition apparatus (sulfuric nitric acid decomposition) and alkali fusion.

(Additive)

Polarizing plate protective film of this invention can be appropriately incorporated with a plasticizer to achieve the effects of this invention. A plasticizer is not specifically limited, however, is preferably selected from such as a polycarboxylic ester type plasticizer, a glycolate type plasticizer, a phthalic ester type plasticizer, a fatty acid ester type plasticizer, a polyhydric alcohol ester type plasticizer, a polyester type plasticizer and an acryl type plasticizer. When not less than two types among them are utilized, at least one type is preferably a polyhydric alcohol ester type plasticizer.

A polyhydric alcohol ester type plasticizer is a plasticizer comprising ester of fatty acid polyhydric alcohol of not less than divalent and monocarboxylic acid, and is preferably provided with an aromatic ring or a cycloalkyl ring in a molecule. It is preferably fatty acid polyhydric alcohol ester of 2-20 valent.

Polyhydric alcohol preferably utilized in this invention is represented by following formula (a).

R1-(OH)n    Formula (a)

wherein, R1 is a n-valent organic group, n is a positive integer of not less than 2 and OH is an alcoholic and/or phenolic hydroxyl group.

Examples of preferable polyhydric alcohol include such as the following; however, this invention is not limited thereto. Listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetrioll 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Specifically preferable are triethylene glycol, tetraethylene glycol, dipropylene glycol, tripropylene glycol, sorbitol, trimethylolpropane and xylitol.

Monocarboxylic acid utilized in polyhydric alcohol ester is not specifically limited and such as fatty acid monocarboxylic acid, alicyclic monocarboxylic acid and aromatic monocarboxylic acid, which are well known in the art, can be utilized. It is preferable to utilize alicyclic monocarboxylic acid or aromatic monocarboxylic acid with respect to improvement of moisture permeability and reservation property.

Examples of preferable monocarboxylic acid include the following; however, this invention is not limited thereto.

As fatty acid monocarboxylic acid, fatty acid having a straight chain or a branched chain of carbon number of 1-32 can be preferably utilized. The carbon number is more preferably 1-20 and specifically preferably 1-10. It is preferable to incorporate acetic acid because of increasing compatibility with cellulose ester, and it is also preferable to utilize acetic acid and other monocarboxylic acid by mixing.

Preferable monocarboxylic acid includes saturated fatty acid such as acetic acid, propionic acid, butyric acid, valeric acid, caproic acid, enanthic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid and cyclooctane carboxylic acid or derivatives thereof.

Examples of preferable aromatic monocarboxylic acid include those in which 1-3 of alkoxy groups such as an alkyl group, a methoxy group or an ethoxy group are introduced into a benzene ring of such as benzoic acid and toluic acid, aromatic carboxylic acid having at least two benzene ring such as biphenyl carboxylic acid, naphthalene carboxylic acid and tetralin carboxylic acid, or derivatives thereof. Benzoic acid is specifically preferable.

A molecular weight of polyhydric alcohol ester is not specifically limited, however, is preferably 300-1,500 and more preferably 350-750. The molecular weight is preferably the larger because of being hard to evaporate, while the smaller is preferable with respect to moisture permeability and compatibility with cellulose ester.

Carboxylic acid utilized in polyhydric alcohol may be either one type or a mixture of not less than two types. Further, OH groups in polyhydric alcohol may be all esterified or may partly remain as an OH group.

In the following, specific examples of polyhydric alcohol will be exemplified.

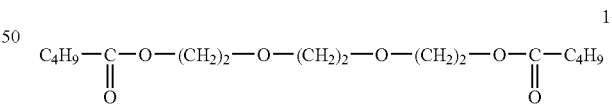

1

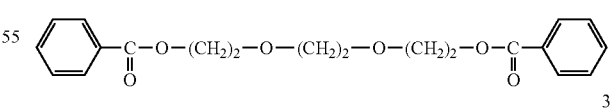

2

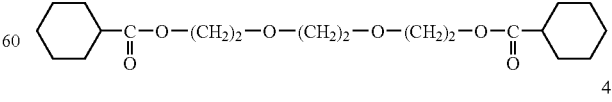

3

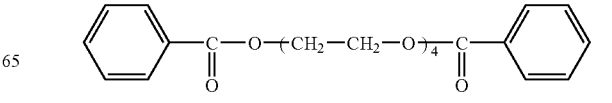

4

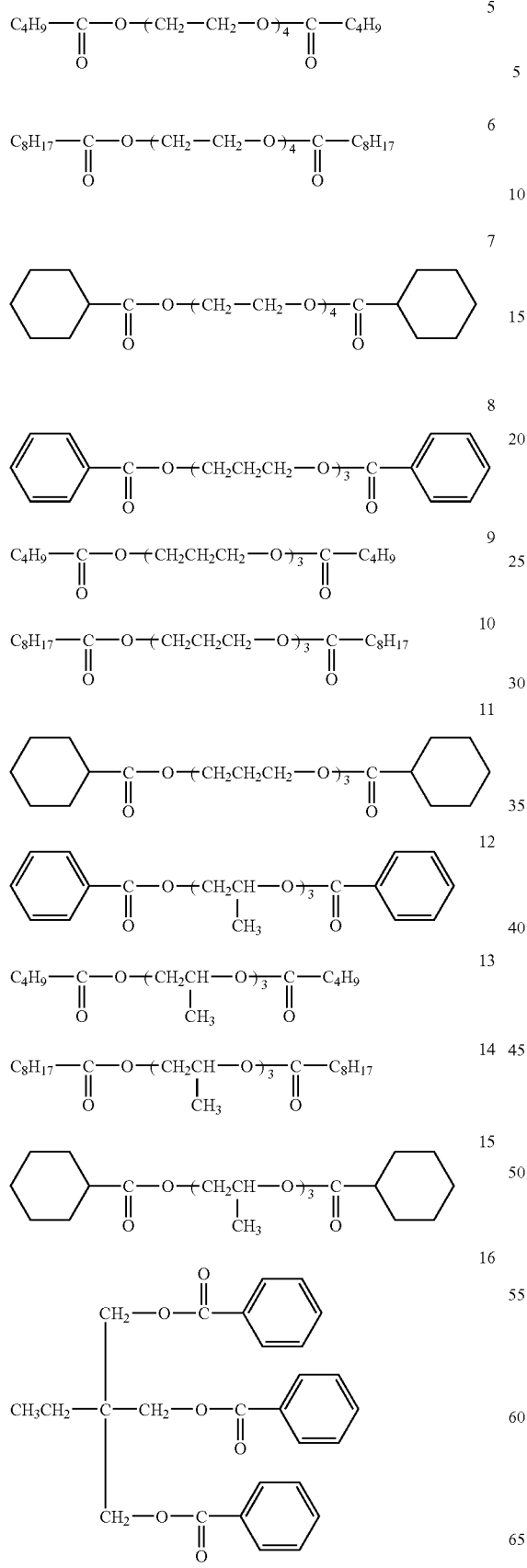
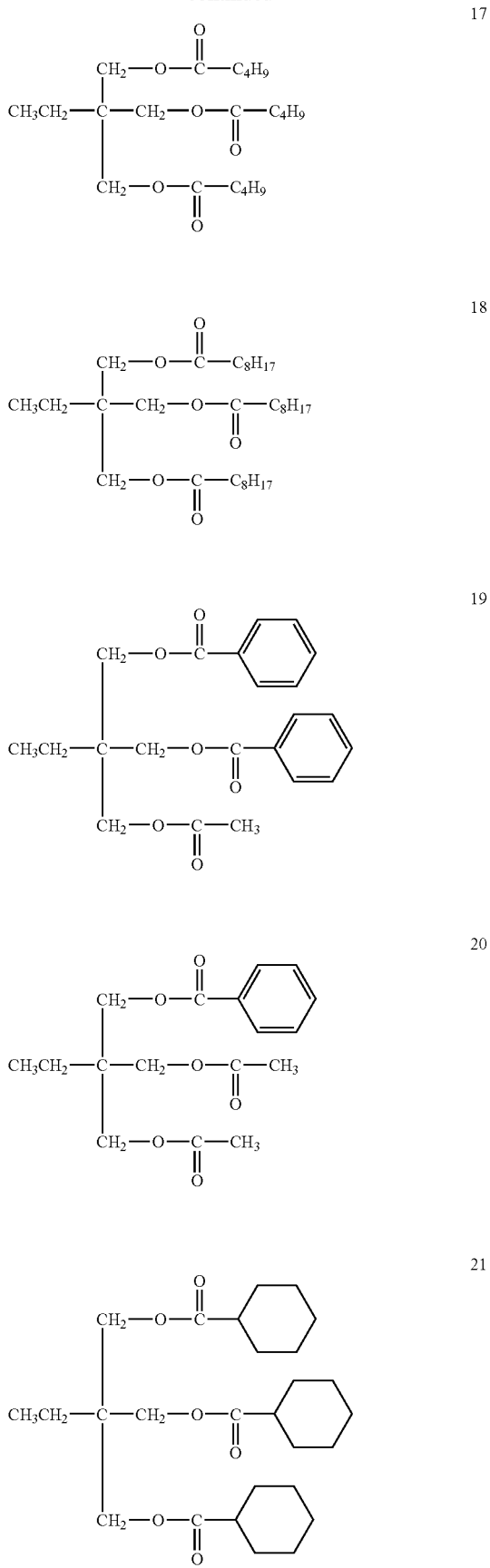

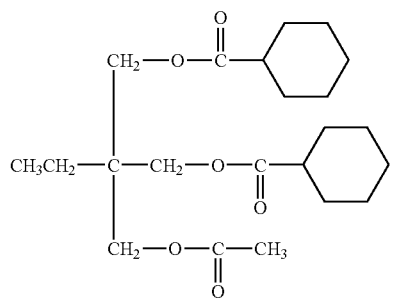
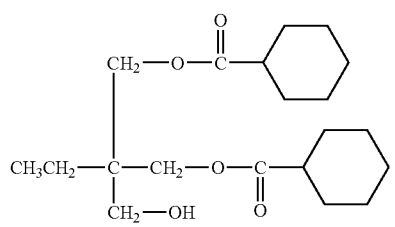
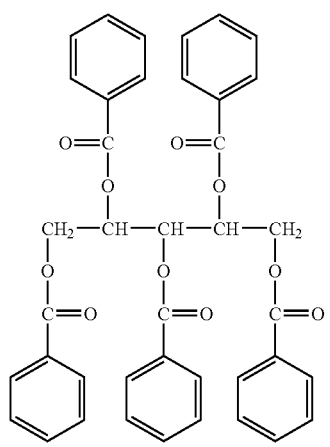
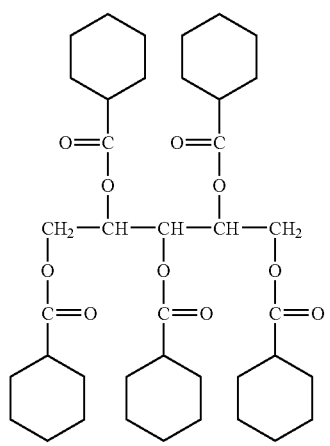
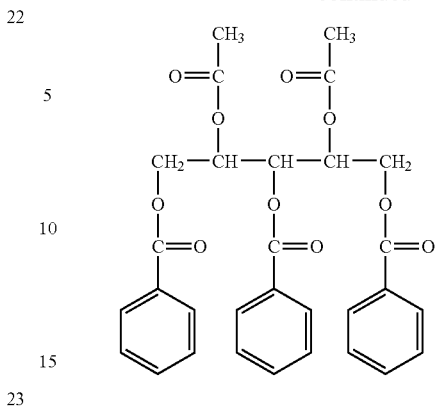
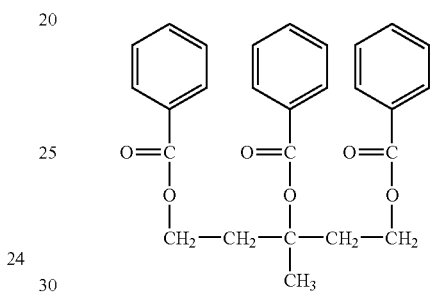
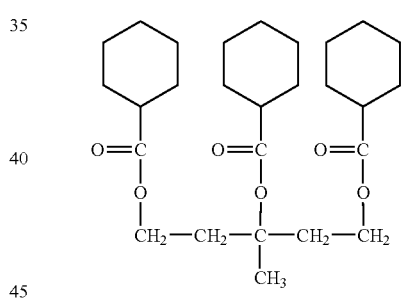
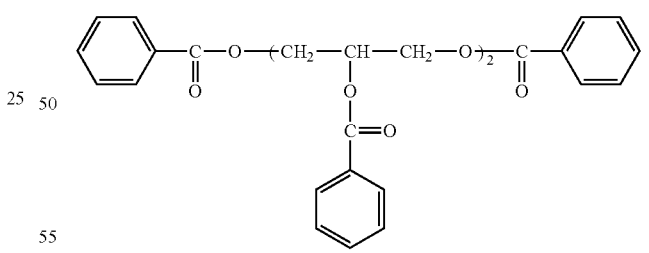
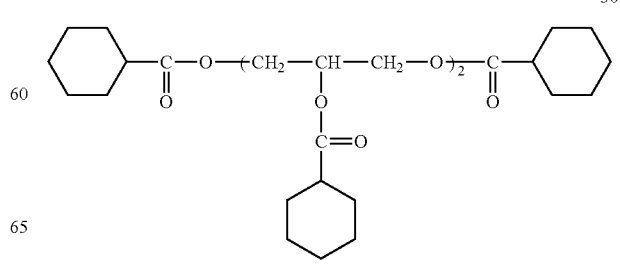

-continued

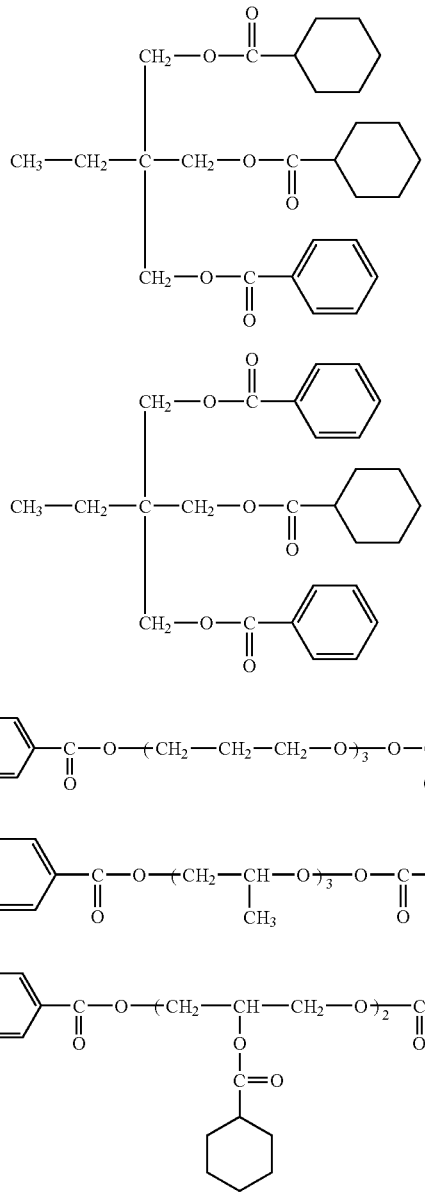

A glycolate type plasticizer is not specifically however, alkylphthalylalkyl glycolates are preferably utilized. Alkylphthalylalkyl glycolates include such as methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalate ester type plasticizer includes such as diethyl phthalate, dimethoxyethyl phthalate, dimethyl phthalate, dibutyl phthalate, di-2-ethylhexyl phthalate, dioctyl phthalate, dicyclohexyl phthalate and dicyclohexyl terephthalate.

A citric ester type plasticizer includes such as acetyltrimethyl citrate, acetyltriethyl citrate and acetyltributyl citrate.

A fatty acid ester type plasticizer includes such as butyl oleate, methylacetyl ricinoleate and dibutyl sebacate.

A phosphoric ester type plasticizer includes such as triphenyl phosphate, tricresyl phosphate, cresyldiphenyl phosphate, octyldiphenyl phosphate, diphenylbiphenyl phosphate, trioctyl phosphate and tributyl phosphate.

Polycarboxylic ester compound is comprised of ester of polycarboxylic acid of not less than 2 valences, preferably of 2-20 valences, and alcohol. Further, aliphatic polycarboxylic acid is preferably of 2-20 valences. In the case of aromatic polycarboxylic acid and alicyclic polycarboxylic acid, 3-20 valences are preferable.

Polycarboxylic acid is represented by following Formula (b).

$$R^2(COOH)_m(OH)_n \quad \text{Formula (b)}$$

(wherein, $R^2$ is an (m+n) valent organic group; m is an integer of not less than 2; n is an integer of not less than 0; COOH group is a carboxyl group; and OH group is an alcoholic or phenolic hydroxyl group.)

Examples of preferable polycarboxylic acid include the following, however, this invention is not limited thereto. Aromatic polycarboxylic acid of not less than 3 valences such as trimellitic acid, trimesic acid and pyromellitic acid, and derivatives thereof; aliphatic polycarboxylic acid such as succinic acid, adipic acid, azelaic acid, sebacic acid, oxalic acid, fumaric acid, maleic acid and tetrahydrophthalic acid; oxypolycarboxylic acid such as tartaric acid, tartronic acid, malic acid and oxalic acid; can be preferably utilized. It is specifically preferable to utilize oxypolycarboxylic acid with respect to such as improvement of storage stability.

Alcohol utilized in a polycarboxylic ester compound, which can be utilized in this invention, is not specifically limited and alcohols and phenols well known in the art can be utilized. For example, straight chain or branched aliphatic saturated alcohol or aliphatic unsaturated alcohol, having a carbon number of 1-32, can be preferably utilized. The carbon number is more preferably 1-20 and specifically preferably 1-10. Further, such as alicyclic alcohol such as cyclopentanol and cyclohexanol or derivatives thereof, and aromatic alcohol such as benzyl alcohol and cinnamyl alcohol or derivatives thereof can be also preferably utilized.

When oxypolycarboxylic acid as polyvalent carboxylic acid is utilized, an alcoholic or phenolic hydroxyl group of polycarboxylic acid may be esterified by use of monocarboxylic acid. Preferable monocarboxylic acid includes the following; however, this invention is not limited thereto.

As aliphatic monocarboxylic acid, straight chain or branched fatty acid having a carbon number of 1-32 is preferably utilized. The carbon number is more preferably 1-20 and specifically preferably 1-10.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid and cyclooctane carboxylic acid; or derivatives thereof.

Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthalene carboxylic acid and tetralin carboxylic acid, or derivatives thereof. Acetic acid, propionic acid and benzoic acid are specifically preferable.

The molecular weight of a monocarboxylic ester compound is not specifically limited, however, is preferably in a range of 300-1,000 and more preferably in a range of 350-750. The molecular weight is preferably the larger with respect to storage stability, while it is preferably smaller with respect to moisture permeability and compatibility with cellulose ester.

Alcohols, which are utilized in polycarboxylic ester applicable in this invention, may be either one type or a mixture of at least two types.

An acid value of a polycarboxylic ester compound utilizable in this invention is preferably not more than 1 mg KOH/g and more preferably not more than 0.2 mg KOH/g. By setting the acid value within the above-described range, variation of retardation due to environment is preferably suppressed.

(Acid Value)

An acid value refers to a milligram value of potassium hydroxide required to neutralize acid contained in 1 g of a sample (carboxyl groups existing in a sample). An acid value is measured based on JIS K0070.

Specifically preferable examples of a polycarboxylic ester compound will be shown below, however, this invention is not limited thereto. For example, listed are triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate and tetrabutyl pyromellitate.

A polyester type plasticizer is not specifically limited, however, a polyester type plasticizer having an aromatic ring or a cycloalkyl ring in a molecule can be utilized. A polyester type plasticizer is not specifically limited, however, such as an aromatic terminal ester type plasticizer represented by following Formula (c) can be utilized.

B-(G-A)$_n$-G-B    Formula (c)

(wherein, B is a benzene monocarboxylic acid residual group; G is an alkylene glycol residual group having a carbon number of 2-12, an aryl glycol residual group having a carbon number of 6-12, or an oxyalkylene glycol residual group having a carbon number of 4-12; A is an alkylene dicarboxylic acid residual group having a carbon number of 4-12 or an aryl dicarboxylic acid residual group having a carbon number of 6-12; and n is an integer of not less than 1.)

A compound represented by Formula (c) is comprised of benzene monocarboxylic acid residual group represented by B, an alkylene glycol residual group, an oxyalkylene glycol residual group or an arylglycol residual group represented by G, and an alkylen dicarboxylic acid residual group or an aryl dicarboxylic acid residual group represented by A; and can be prepared by a reaction similar to that of a general polyester type plasticizer.

A benzene monocarboxylic acid component of polyester type plasticizer utilized in this invention includes such as benzoic acid, p-tertiary-butylbenzoic acid, ortho-toluic acid, metha-toluic acid, para-toluic acid, dimethylbenzoic acid, ethylbenzoic acid, n-propylbenzoic acid, aminobenzoic acid and acetoxybenzoic acid, and these each may be utilized alone or as a mixture of not less than two types.

An alkylene glycol component having a carbon number of 2-12, which can be utilized in this invention, includes such as ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2, 4-trimethyl-1,3-pentanediol, 2-ethyl-1,3-hexanediol, 2-mthyl-1,8-octanediol, 1,9-nonanediol, 1,10-decanediol and 1,12-octadecanediol; and these glycols are utilized alone or as a mixture of at least two types. An alkylene glycol having a carbon number of 2-12 is specifically preferable because of excellent compatibility with cellulose ester.

Further, an oxyalkylene glycol component, having a carbon number of 4-12, of the above-described aromatic terminal ester includes such as diethylene glycol, triethylene glycol, tetraethylene glycol, dipropylene glycol and tripropylene glycol; and these glycols can be utilized alone or as a mixture of at least two types.

An alkylene dicarboxylic acid component, having a carbon number of 4-12, of aromatic terminal ester includes such as maleic acid, fumaric acid, glutaric acid, adipic acid, azelaic acid, sebacic acid and dodecane dicarboxylic acid; and these may be utilized alone or as a mixture of not less than two types. An arylene dicarboxylic acid component having a carbon number of 6-12 is phthalic acid, terephthalic acid, isophthalic acid, 1,5-naphthalene dicarboxylic acid and 1,4-naphthalene dicarboxylic acid.

A polyester type plasticizer utilized in this invention preferably has a number average molecular weight in a range of 300-1,500 and more preferably of 400-1,000. Further, an acid value thereof is not more than 0.5 mg KOH/g and a hydroxyl group value of not more than 25 mg KOH/g; and more preferably the acid value is not more than 0.3 mg KOH/g and the hydroxyl group value of not more than 15 mg KOH/g.

In the following, synthesis examples of an aromatic terminal ester type plasticizer utilizable in this invention will be shown.

<Sample No. 1 (Aromatic Terminal Ester Sample)>

Phthalic acid of 410 parts, 610 parts of benzoic acid, 737 parts of dipropylene glycol and 0.40 parts of tetraisopropyl titanate as a catalyst were charged together in a reaction vessel which was attached with a reflux condenser, and the system was kept heated at 130-250° C. to continuously remove the generated water while excess monohydric alcohol was refluxed with stirring in nitrogen gas flow. Next, the distillate was removed at 200-230° C. under a reduced pressure of not higher than $1.33 \times 10^4$ Pa and finally of not higher than $4 \times 10^2$ Pa, followed by being filtered to prepare an aromatic terminal ester type plasticizer having the following characteristics.

Viscosity (25° C., mPa·s); 43,400

Acid value; 0.2

<Sample No. 2 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 341 parts of ethylene glycol and 0.35 parts of tetraisopropyl titanate as a catalyst were utilized.

Viscosity (25° C., mPa·s); 31,000

Acid value; 0.1

<Sample No. 3 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,2-propanediol and 0.35 parts of tetraisopropyl titanate as a catalyst were utilized.

Viscosity (25° C., mPa·s); 38,000

Acid value; 0.05

<Sample No. 4 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,3-propanediol and 0.35 parts of tetraisopropyl titanate as a catalyst were utilized.

Viscosity (25° C., mPa·s); 37,000

Acid value; 0.05

In the following, specific examples of an aromatic terminal ester type plasticizer utilizable in this invention will be shown; however, this invention is not limited thereto.

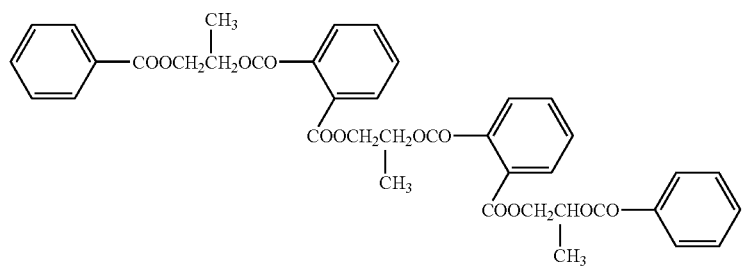

Mw: 696

(1)

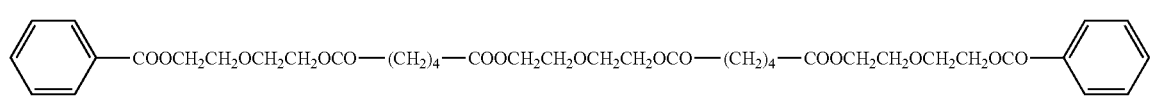

Mw: 746

(2)

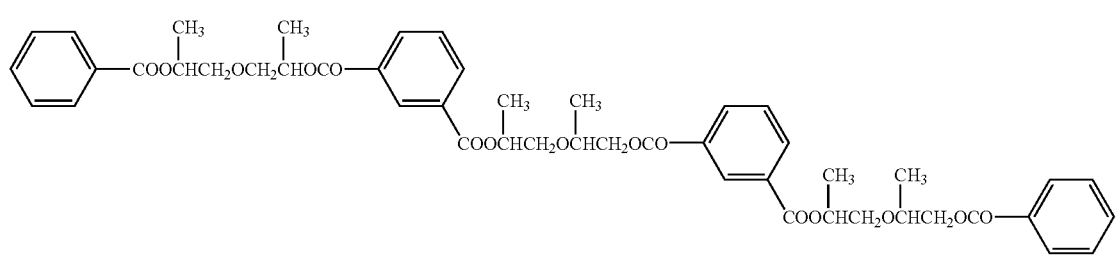

Mw: 830

(3)

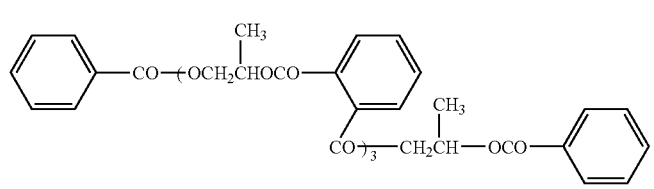

Mw: 886

(4)

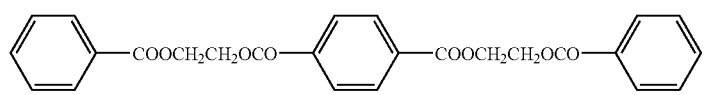

Mw: 462

(5)

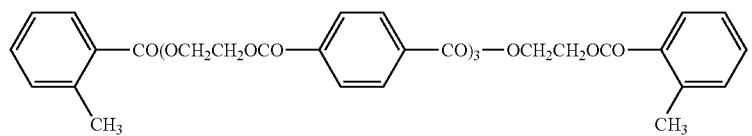

Mw: 874

(6)

-continued

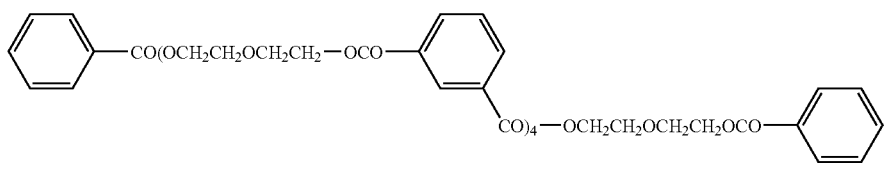

Mw: 1258

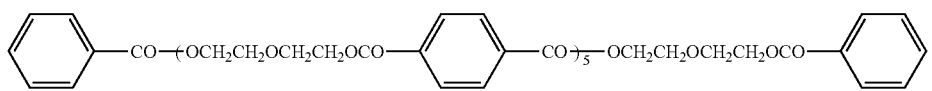

Mw: 1494

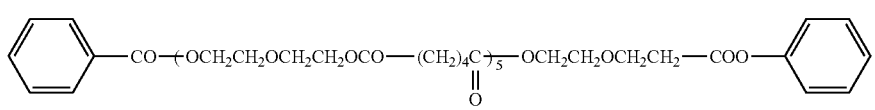

Mw: 1394

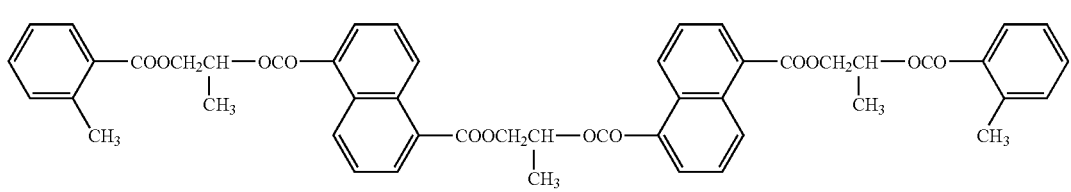

Mw: 852

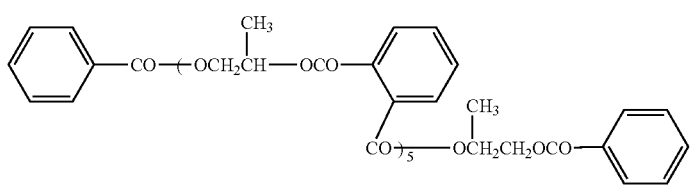

Mw: 1314

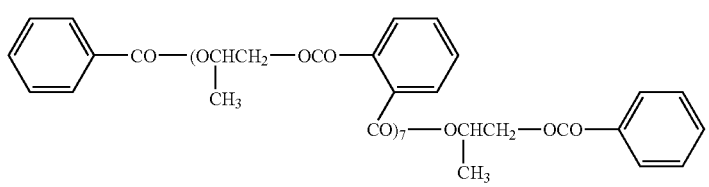

Mw: 1726

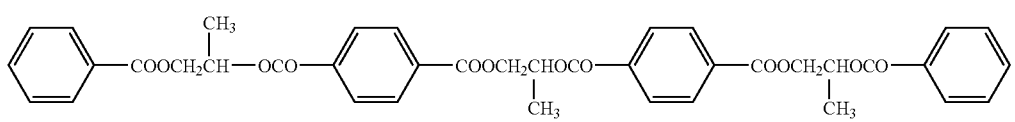

Mw: 696

<Acryl Polymer>

Cellulose ester film of this invention may also preferably contain an acryl polymer having a weight average molecular weight of not less than 500 and not more than 30,000 and a negative orientation birefringence with respect to stretching direction, to control a retardation value.

Good compatibility of the cellulose ester and the polymer can be obtained by controlling the polymer component so that the polymer has a weight average molecular weight of not less than 500 and not more than 30,000.

The acryl polymer includes a homopolymer or copolymer of acrylic acid ester or methacrylic acid ester.

The polymer has a weight average molecular weight of 500 to 30,000, and is preferably polymerized by a method to obtain uniform molecular weight.

The following methods can be cited as such the method; a method using a peroxide compound as the polymerization initiator such as cumene peroxide and t-butyl hydroperoxide, a method using a chain-transfer agent such as a mercapto compound or carbon tetra chloride additionally to the polymerization initiator, a method using a polymerization stopping agent such as benzoquinone and nitrobenzene, and a method described in JP-A 2000-128911 or 2000-344823 in which bulk polymerization is performed by using a compound having one thiol group and a secondary hydroxyl group or a combination of such the compound and an organic metal compound is used as a polymerization catalyst.

Monomer as a monomer unit to constitute polymer useful in this invention will be listed below, however, this invention is not limited thereto.

Ethylenic unsaturated monomer unit constituting polymer which is prepared by polymerization of ethylenic unsaturated monomer includes such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octate, vinyl methacrylate, vinyl crotonate, vinyl sorbate, vinyl benzoate and vinyl cinnamate as vinyl ester; such as methyl acrylate, (i-, n-)propyl acrylate, (n-, i-, s-, t-)butyl acrylate, (n-, i-, s-)pentyl acrylate, (n-, i-)hexyl acrylate, (n-, i-)heptyl acrylate, (n-, i-)octyl acrylate, (n-, i-)nonyl acrylate, (n-, i-)myristyl acrylate, cyclohexyl acrylate, 2-ethylhexyl acrylate, benzyl acrylate, phenethyl acrylate, ε-caprolactone acrylate, 2-hydroxyethyl acrylate, 2-hydroxylpropyl acrylate, 3-hydroxypropyl acrylate, 4-hydroxybutyl acrylate, 2-hydroxybutyl acrylate, p-hydroxymethylphenyl acrylate and p-(2-hydroxyethyl)phenyl acrylate as acrylic acid ester; those in which the above-described acrylic acid ester is changed into methacrylic acid ester as methacrylic acid ester; and such as acrylic acid, methacrylic acid, maleic acid anhydride, crotonic acid and itaconic acid as unsaturated acid.

Polymer constituted of the above-described monomer may be copolymer or homopolymer; and homopolymer of vinyl ester, copolymer of vinyl ester, and copolymer comprising vinyl ester and acrylic acid or methacrylic acid, are preferable.

Acrylic polymer having an aromatic ring as a side chain is acrylic polymer containing an acrylic acid or methacrylic acid ester monomer unit necessarily having an aromatic ring.

Further, acrylic polymer having a cyclohexyl group as a side chain is acrylic polymer containing an acrylic acid or methacrylic acid ester monomer unit having a cyclohexyl group.

Acrylic acid ester monomer having no aromatic ring nor cyclohexyl group includes such as methyl acrylate, (i-, n-)propyl acrylate, (n-, i-, s-, t-)butyl acrylate, (n-, i-, s-)pentyl acrylate, (n-, i-)hexyl acrylate, (n-,i-)heptyl acrylate, (n-, i-)octyl acrylate, (n-, i-)nonyl acrylate, (n-, i-)myristyl acrylate, 2-ethylhexyl acrylate, ε-caprolactone acrylate, 2-hydroxyethyl acrylate, 2-hydroxylpropyl acrylate, 3-hydroxypropyl acrylate, 4-hydroxybutyl acrylate, 2-hydroxybutyl acrylate, 2-methoxyethyl acrylate and 2-ethoxyethyl acrylate as acrylic acid ester; or those in which the above-described acrylic acid ester is changed into methacrylic acid ester.

Acrylic polymer, which is homopolymer or copolymer of the above-described monomer, is preferably provided with not less than 30 weight % of an acrylic acid ester monomer unit, and is preferably provided with not less than 40 weight % of an methacrylic acid ester monomer unit. Homopolymer of methyl acrylate or methyl methacrylate is specifically preferable.

Acrylic acid or methacrylic acid ester monomer having an aromatic ring includes such as phenyl acrylate, phenyl methacrylate, (2 or 4-chlorophenyl)acrylate, (2 or 4-chlorophenyl) methacrylate, (2, 3 or 4-ethoxycarbonylphenyl) acrylate, (2, 3 or 4-ethoxycarbonylphenyl)methacrylate, (o, m, or p-tolyl) acrylate, (o, -m or p-tolyl)methacrylate, benzyl acrylate, benzyl methacrylate, phenetyl acrylate, phenetyl methacrylate and 2-naphthyl acrylate, however, benzyl acrylate, benzyl methacrylate, phenetyl acrylate and phenetyl methacrylate are preferably utilized.

Among acrylic polymer having an aromatic ring as a side chain, it is preferable that an acrylic acid or methacrylic acid ester monomer unit occupies 20-40 weight % and an acrylic acid or methacrylic acid methylester monomer unit occupies 50-80 weight %.

Said polymer preferably contains 2-20 weight % of an acrylic acid or methacrylic acid ester monomer unit having a hydroxyl group.

Acrylic acid ester monomer having a cyclohexyl group includes such as cyclohexyl acrylate, cyclohexyl methacrylate, 4-methylcyclohexyl acrylate, 4-methylcyclohexyl methacrylate, 4-ethylcyclohexyl acrylate and 4-ethylcyclohexyl methacrylate; however, cyclohexyl acrylate and cyclohexyl methacrylate can be preferably utilized.

Acrylic polymer having a cyclohexyl group as a side chain is preferably provided with 20-40 weight % of an acrylic acid or methacrylic acid ester monomer unit having a cyclohexyl group and 50-80 weight % of an acrylic acid or methacrylic acid methylester monomer unit.

Further, said polymer preferably contains 2-20 weight % of an acrylic acid or methacrylic acid ester monomer unit having a hydroxyl group.

In the case of this acrylic acid or methacrylic acid ester monomer having a hydroxyl group, it is a constituting unit not of homopolymer but of copolymer.

In this case, preferably 2-20 weight % of an acrylic acid or methacrylic acid ester monomer unit having a hydroxyl group is contained in acrylic polymer.

In this invention, polymer having a hydroxyl group in a side chain can be also preferably utilized. A monomer unit having a hydroxyl group is similar to a monomer unit described before, however, is preferably acrylic acid or methacrylic acid ester, which includes such as 2-hydroxyethyl acrylate, 2-hydroxypropyl acrylater 3-hydroxypropyl acrylate, 4-hydroxypropyl acrylate, 2-hydroxybutyl acrylate, p-hydroxymethylphenyl acrylate and p-(2 hydroxyethyl)phenyl acrylate; or those in which these acrylic acid are substituted by methacrylic acid; and 2-hydroxyethyl acrylate and 2-hydroxyethyl methacrylate are preferable.

It is preferable to contain 2-20 weight % of an acrylic acid or methacrylic acid ester monomer unit having a hydroxyl group in polymer and more preferably 2-10 weight %.

The polymer as described before containing 2-20 weight % of a monomer unit having the above-described hydroxyl group is excellent in compatibility with cellulose ester, reservation property and dimension stability as well as in adhesion with a polarizer as polarizing plate protective film in addition to small moisture permeability, and is provided with an improvement effect of durability of a polarizing plate.

A method to provide at least one end of the main chain of acrylic polymer with a hydroxyl group is not specifically limited provided being a method to provide the end of the main chain with a hydroxyl group; and includes such as a method to utilize a radical polymerization initiator having a hydroxyl group such as azobis(2-hydroxyethylbutyrate), a method to utilize a chain transfer agent having a hydroxyl group such as 2-mercaptoethanol, a method to utilize a polymerization terminator having a hydroxyl group, a method to provide the end with a hydroxyl group by living ion polymerization, a method to perform block polymerization by use of a polymerization catalyst comprising a compound having one thiol group and a secondary hydroxyl group or a combination of said compound and an organometallic compound, which is described in JP-A 2000-128911 or 2000-344823; and specifically preferable is a method described in said patent publication.

Polymer prepared by a method related to the description of this patent publication is available on the market as Actflow Series manufactured by Soken Chemical & Engineering Co., Ltd., which can be preferably utilized. The above-described polymer having a hydroxyl group on the end and/or polymer having a hydroxyl group on the side chain in this invention has an effect to significantly improve compatibility and transparency of polymer.

Acrylic polymer of this invention is preferably polymer X having a weight average molecular weight of 5,000-30,000 which is prepared by copolymerization of ethylenic unsaturated monomer Xa having no aromatic ring in a molecule and ethylenic unsaturated monomer Xb having a hydrophilic group, or polymer Y having a weight average molecular weight of 500-3,000 which is prepared by polymerization of ethylenic unsaturated monomer having no aromatic ring Ya.

<Polymer X, Polymer Y>

Polymer X of this invention is a polymer having a weight average molecular weight of not less than 5,000 and not more than 30,000, which is prepared by copolymerization of ethylenically unsaturated monomer Xa which contains no aromatic ring nor a hydrophilic group in a molecule and ethylenically unsaturated monomer Xb which contains no aromatic ring but contains a hydrophilic group in a molecule.

Xa is preferably acryl or methacryl monomer provided with no aromatic ring and no hydrophilic group in a molecule, and Xb is preferably acryl or methacryl monomer provided with no aromatic ring but provided with a hydrophilic group, in a molecule.

Polymer X of this invention is represented by following Formula (X):

-(Xa)m-(Xb)n-(Xc)p-  Formula (X)

And Polymer X is a more preferable polymer represented by following Formula (X-1).

—[CH$_2$—C(—R$_1$)(—CO$_2$R$_2$)]m-[CH$_2$—C(—R$_3$)(—CO$_2$R$_4$—OH]-]n-[Xc]p-  Formula (X-1)

(wherein, R$_1$ and R$_3$ is H or CH$_3$. R$_2$ is an alkyl group or a cycloalkyl group having a carbon number of 1-12. R$_4$ is —CH$_2$—, —C$_2$H$_4$— or —C$_3$H$_6$—. Xc is a monomer unit polymerizable with Xa and Xb. m, n and p are a mole composition ratio. Herein, m, n and k are never 0; and m+n+p=100)

Monomer as a monomer unit constituting Polymer X of this invention will be listed below; however, this invention is not limited thereto.

In Polymer X, a hydrophilic group refers to a hydroxide group and a group provided with an ethylene oxide connecting chain.

Ethylenically unsaturated monomer Xa which is provided with no aromatic ring nor hydrophilic group in a molecule includes such as methylacrylate, ethyl acrylate, (i-, n-)propyl acrylate, (n-, i-, s-, t-)butyl acrylate, (n-, i-, s-)pentyl acrylate, (n-, i-)hexyl acrylate, (n-, i-)heptyl acrylater (n-, i-)octyl acrylate, (n-, i-)nonyl acrylate, (n-, i-)myristyl acrylate, (2-ethylhexyl)acrylate, (ε-caprolactone)acrylate and (2-ethoxyethyl) acrylate; or those in which acrylic ester described above are converted to methacrylic ester.

Among them, methyl acrylate, ethyl acrylate, methyl methacrylate, ethyl methacrylate and (n-, i-)propyl acrylate are preferable.

Ethylenically unsaturated monomer Xb, which is provided with no aromatic ring but is provided with a hydrophilic group, is preferably acrylic ester or methacrylic ester as a monomer unit having a hydroxyl group, and includes (2-hydroxyethyl)acrylate, (2-hydroxypropyl)acrylate, (3-hydroxypropyl)acrylate, (4-hydroxybutyl)acrylate and (2-hydroxybutyl)acrylate; or those in which these acrylic acid is replaced by methacrylic acid; and preferably (2-hydroxyethyl)acrylate, (2-hydroxyethyl)methacrylate, (2-hydroxypropyl)acrylate and (3-hydroxypropyl)acrylate.

Xc is not specifically limited provided being ethylenically unsaturated monomer other than Xa and Xb, and capable of copolymerization with Xa and Xb, however, is preferably those having no aromatic ring.

The mole composition ratio of Xa, Xb and Xc is preferably in a range of 100/0-65/35, and more preferably in a range of 99/1-75/25. p of Xc is 0-10. Xc may be plural monomer units.

When a mole composition ratio of Xa is large, compatibility with cellulose ester is improved; however, retardation value in the film thickness direction Rth is increased. When a mole composition ratio of Xb is large, the above-described compatibility is deteriorated; however, an effect to decrease Rth is high.

Further, when a mole composition ratio of Xb is over the above-described range, there is a tendency of causing haze at the time of casting, and it is preferable to determine mole composition ratios of Xa and Xb so as to optimize these effects.

The molecular weight of Polymer X is not less than 5,000 and not more than 30,000, more preferably not less than 8,000 and not more than 25,000.

By setting the weight average molecular weight to not less than 5,000, it is preferable that obtained can be advantages such as small dimension variation of cellulose ester film under high temperature and high humidity and small curl as polarizing plate protective film.

When the weight average molecular weigh is not more than 30,000, compatibility with cellulose ester is more improved, and bleeds out under high temperature and high humidity as well as generation of haze immediately after casting will be restrained.

The weight average molecular weight of polymer X of this invention can be controlled by a molecular weight controlling method well known in the art. Such a molecular weight controlling method includes a method to incorporate a chain transfer agent such as lauryl mercaptan and octyl thioglycolate.

Further, polymerization temperature is generally from room temperature to 130° C. and preferably 50-100° C., and the molecular weight control is possible by controlling this temperature or polymerization reaction time.

A weight average molecular weight can be measured by the following method.

Polymer Y of this invention is a polymer which is prepared by polymerization of ethylenically unsaturated monomer Ya and has a weight molecular weight of not less than 500 and not more than 3,000.

When a weight average molecular weight is not less than 500, it is preferable that residual monomer in polymer is decreased. Further, to set the molecular weight of not more than 3,000, it is preferable that retardation value Rt decreasing capability is maintained.

Ya is preferably acryl or methacryl monomer having no aromatic rings.

Polymer Y of this invention is represented by following Formula (Y).

(Ya)k-(Yb)q-  Formula (Y)

Further, Polymer Y of this invention is more preferably polymer represented by following Formula (Y-1).

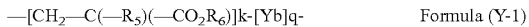   Formula (Y-1)

(in the formula, $R_6$ is an alkyl group or a cycloalkyl group having a carbon number of 1-12. Yb is a monomer unit polymerizable with Ya. k and q are a mole composition ratio, wherein, k is not 0, and k+p=100.)

Yb is not specifically limited provided being ethylenically unsaturated monomer which is copolymerizable with Ya. Yb may be plural monomer. k+q=100, and q is preferably 0-30.

Ethylenically unsaturated monomer Ya, which constitutes Polymer Y prepared by polymerizing ethylenically unsaturated monomer having no aromatic ring, includes acrylic ester such as methyl acrylate, ethyl acrylate, (i-, n-)propyl acrylate, (n-, i-, s-, t-)butyl acrylate, (n-, i-, s-)pentyl acrylate, (n-, i-)hexyl acrylate, (n-, i-)heptyl acrylate, (n-, i-)octyl acrylate, (n-, i-)nonyl acrylate, (n-, i-)myristyl acrylate, cyclohexyl acrylate, (2-ethylhexyl)acrylate, (ε-caprolactone)acrylate, (2-hydroxypropyl)acrylate, (3-hydroxypropyl)acrylate, (4-hydroxybutyl)acrylate and (2-hydroxybutyl)acrylate, those in which the above-described acrylic ester is changed into methacrylic ester such as methacrylic ester; and unsaturated acid such as acrylic acid, methacrylic acid, maleic acid anhydride, crotonic acid and itaconic acid.

Yb is not specifically limited provided being ethylenically unsaturated monomer copolymerizable with Yb, however, is preferably vinyl ester such as vinyl acetate, vinyl propionate, vinyl butyrate, vinyl valerate, vinyl pivalate, vinyl caproate, vinyl capriate, vinyl laurate, vinyl myristate, vinyl palmitate, vinyl stearate, vinyl cyclohexane carboxylate, vinyl octylate, vinyl methacrylate, vinyl crotonate, vinyl sorbate and vinyl cinnamate. Yb may be plural monomer.

Terminals of polymer X and polymer Y have a hydroxy group or thioether resulted from a polymerization catalyser and chain transfer agent Compatibility of polymer X and polymer Y to cellulose ester can be controlled by these terminal residues.

The hydroxyl group value of polymer X and Y is preferably 30-150 mg KOH/g.

(Measurement Method of Hydroxyl Group Value)

This measurement is based on JIS K 0070 (1992) This hydroxyl group value is defined as mg number of potassium hydroxide which is required to neutralize acetic acid bonding to a hydroxyl group when 1 g of a sample is acetylated.

Specifically, X g (approximately 1 g) of a sample is precisely weighed in a flask, which is added with exactly 20 ml of an acetylation agent (20 ml of acetic acid anhydride is added with pyridine to make 400 ml). The flask is equipped with an air condenser at the mouth and heated in a glycerin bath of 95-100° C.

After 1 hour and 30 minutes, the system is cooled and added with 1 ml of pure water through the air condenser to decompose acetic acid anhydride into acetic acid. Next titration with a 0.5 mol/L ethanol solution of potassium hydroxide was performed by use of a potentiometric titrator to determine the inflection point of the obtained titration curve as an end point. Further, as a blank test, titration without a sample is performed to determine the inflection point of a titration curve.

A hydroxyl group value is calculated by the following formula.

Hydroxyl group value=$\{(B-C) \times f \times 28.05/X\}+D$ (in the formula, B is quantity (ml) of a 0.5 mol/L ethanol solution of potassium hydroxide utilized for a blank test, C is quantity (ml) of a 0.5 mol/L ethanol solution of potassium hydroxide utilized for titration, f is a factor of a 0.5 mol/L ethanol solution of potassium hydroxide, D is an acid value, and 28.05 is ½ of molar quantity 56.11 of potassium hydroxide.)

Both of Polymer X and Polymer Y described above exhibit excellent compatibility with cellulose ester, excellent productivity without evaporation or vaporization, good storage stability small water vapor permeability and excellent dimension stability, as polarizing plate protective film.

The content of polymer X and Polymer Y in cellulose ester film is preferably in a range to satisfy following formulas (i) and (ii). When a content of polymer X is Xp, Percent by weight=(weight of polymer $X$/weight of cellulose ester)×100, and a content of Polymer Y is Yp (percent by weight), $5 \leq Xp+Yp \leq 35$ (percent by weight)   Formula (i)

$0.05 \leq Yp/(Xp+Yp) \leq 0.4$   Formula (ii)

Preferable range of formula (i) is 10-25 percent by weight.

A sufficient effect to decrease retardation value Rt can be achieved when the total amount of polymer X and Polymer Y is not less than 5 percent by weight. Further adhesion with a polyvinyl alcohol type polarizer is good when the total amount is not more than 35 percent by weight.

Polymer X and polymer Y may be added directly to a dope described below as its component and is dissolved to form the dope, or may be added to a dope after it is preliminary dissolved in an organic solvent which dissolves cellulose ester.

(Ultraviolet Absorbent)

Protective film according to this invention may also contain an ultraviolet absorbent. An ultraviolet absorbent has an object to improve durability by absorbing ultraviolet rays of not longer than 400 nm, and in particular, transmittance at a wavelength of 370 nm is preferably not more than 10%, more preferably not more than 5% and still more preferably not more than 2%.

An ultraviolet absorbent utilized in this invention is not specifically limited, however, includes such as an oxybenzophenone type compound, a benzotriazole type compound, a salicylic ester type compound, a benzophenone type compound, a cyano acrylate type compound, a triazine type compound, a nickel complex type compound and inorganic powder.

For example listed are 5-chloro-2-(3,5-di-sec-butyl-2-hydroxylphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxybenzophenone; and also listed and preferably utilized are Tinuvins, such as Tinuvin 109, Tinuvin 171, Tinuvin 234, Tinuvin 326, Tinuvin 327 and Tinuvin 328, which are available on the market from Ciba Specialty Chemicals.

Ultraviolet absorbents utilized in this invention are preferably a benzotriazole type ultraviolet absorbent, a benzophenone type ultraviolet absorbent and a triazine type ultraviolet absorbent, and specifically preferably a benzotriazole type ultraviolet absorbent and a benzophenone type ultraviolet absorbent.

For example, as a benzotriazole type ultraviolet absorbent, a compound represented by following Formula (d) can be utilized.

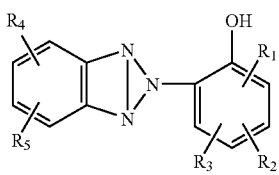

Formula (d)

In the formula, $R_1$, $R_2$, $R_3$, $R_4$ and $R_5$, which may be same or different, are a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, mono- or di-alkylamino group, an acylamino group or a 5-6 member heterocyclic group; and $R_4$ and $R_5$ may perform ring closure to form a 5-6 member carbon ring.

Further, these groups described above may be provided with a substituent.

In the following, specific examples of a benzotriazole type ultraviolet absorbent utilized in this invention will be listed.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-5'-methylphenyl)benzotriazole
UV-4: 2-(2'-hydroxy-3',5'-di-tert-butylphenyl)-chlorobenzotriazole
UV-5: 2-(2-hydroxy-3'-(3",4",5",6"-tetrahydrophthalimidomethyl)-5'-methylphenyl)-benzotriazole
UV-6: 2,2-methylenebis-(4-(1,1,3,3-tetramethylbutyl)-6-(2H-benzotriazole-2-yl)phenol)
UV-7: 2-(2'-hydroxy-3'-di-tert-butyl-5'-methylphenyl)-5-chlorobenzotriazole
UV-8: 2-(2H-benzotriazole-2-yl)-6-(straight chain and branched dodecyl)-4-methylphnol (Tinuvin 171)
UV-9: A mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (Tinuvin 109)

Further, a compound represented by following Formula (e) is preferably utilized as a benzophenone type ultraviolet absorbent.

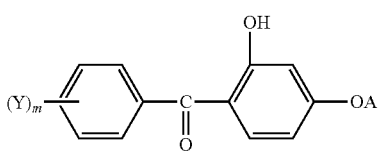

Formula (e)

In the formula, Y is a hydrogen atom, a halogen atom, an alkyl group, an alkenyl group, an alkoxy group and a phenyl group; and these alkyl group, alkenyl group and phenyl group may be provided with a substituent. A is a hydrogen atom, an alkyl group, an alkenyl group, a phenyl group, a cycloalkyl group, an alkylcarbonyl group, an alkylsulfonyl group or —CO(NH)$_{n-1}$-D group; and D is an alkyl group, an alkenyl group or a phenyl group which may be provided with a substituent. m and n are 1 or 2.

In the above description, an alkyl group is, for example, a straight chain or branched aliphatic group having a carbon number of up to 24; an alkoxy group is, for example, an alkoxy group having a carbon number of up to 18; and an alkenyl group is, for example, an alkenyl group having a carbon number of up to 16 such as an allyl group and a 2-butenyl group. Further, a substituent to an alkyl group, an alkenyl group and a phenyl group includes such as a halogen atom (such as a chlorine atom, a bromine atom and a fluorine atom), a hydroxyl group and a phenyl group (this phenyl group may be substituted by such as an alkyl group or a halogen atom).

In the following, specific examples of a benzophenone type ultraviolet absorbent represented by Formula (e).

UV-10: 2,4-dihydroxybenzophenone
UV-11: 2,2'-dihydroxy-4-methoxybenzophenone
UV-12: 2-hydroxy-4-methoxy-5-sulfobenzophenone
UV-13: bis(2-methoxy-4-hydroxy-5-benzoylphenylmethane)

In addition to these, a disc form compound such as a compound having a 1,3,5-triazine ring is preferably utilized.

Polarizing plate protective film according to this invention preferably contains more than two types of ultraviolet absorbents.

Further, a polymer ultraviolet absorbent may also be preferably utilized as an ultraviolet absorbent, and polymer type ultraviolet absorbents described in JP-A H06-148430 are specifically preferably utilized.

As an addition method of an ultraviolet absorbent, an ultraviolet absorbent may be added into a dope after having been dissolved in an organic solvent such as alcohol like methanol, ethanol and butanol, methylene chloride, methyl acetate, acetone and dioxane; or may be directly added into a dope composition. Those insoluble in an organic solvent, such as inorganic powder, will be added into a dope after having been dispersed in an organic solvent and cellulose ester by use of such as a dissolver or a sand mill.

The using amount of an ultraviolet absorbent is not uniform depending on a type and a using condition of an ultraviolet absorbent, however, in the case of the dry layer thickness of polarizing plate protective film of 30-200 μm, it is preferably 0.5-10 percent by weight and more preferably 0.6-4 percent by weight, for a polarizing plate protective film.

<Antioxidant>

Antioxidants are also called as antidegradants. Degradation of cellulose ester film may occur when a liquid crystal display is set at high humidity and high temperature circumstances. It is preferred to use the antioxidants in the cellulose ester film since they have a function to retard or prevent decomposition of cellulose ester film by halogen in residual solvent or phosphoric acid in phosphoric acid plasticizer in the cellulose ester film.

A hindered phenol compound is suitable as the antioxidant. Concrete examples of the compound include 2,6-di-t-butyl-p-cresol, pentaerythrityl-tetrakis-[3-(3,5-di-t-butyl-4-hydroxyphenyl)propionate], triethylene glycol-bis[3-(3-t-butyl-5-methyl-hydroxyphenyl)propionate], 1,6-hexandiol-bis[3-(3,5-di-t-butyl-4-hydroxyphenyl)-propionate], 2,4-bis-(n-octylthio)-6-(4-hydroxy-3,5-di-t-butylanilino)-1,3,5-triazine, 2,2-thio-diethylene-bis-[3-(3,5-di-t-butyl-4-hydroxyphenyl)p-ropionate], octadecyl-3-(3,5-di-t-butyl-4-hydroxyphenyl)propionate, N,N'-hexamethylenebis (3,5-di-tert-butyl-4-hydroxy-hydrocinnamide, 1,3,5-trimethyl-2,4,6-tris(3,5-di-t-butyl-4-hydroxybenzyl)-benzene and tris-(3,5-di-t-butyl-4-hydroxybenzyl)-isocyanurate. Specifically, 2,6-di-t-butyl-p-cresol, pentaerythrityl-tetrakis-[3-(3,5-di-t-butyl-4-hydroxyphenyl)propionate] and triethylene glycol-bis[3-(3-t-butyl-5-methyl-hydroxyphenyl)propionate] are preferable. A hydrazine type metal inactivating agent such as N,N'-bis[3-(3,5-di-t-butyl-4-hydroxyphenyl)-propionyl]hydrazine and a phosphor type processability stabilizing agent such as tris(2,4-di-t-butylphenyl)phosphite may be employed with together.

The adding amount of these compounds for obtaining the effects thereof is preferably from 1 ppm to 1.0%, and particularly preferably from 10 to 1,000 ppm, by weight of the cellulose derivative.

(Micro-particles)

Polarizing plate protective film according to this invention preferably contains micro-particles.

As inorganic micro-particles utilized in this invention, examples of an inorganic compound include silicon dioxide, titanium dioxide, aluminum oxide, zirconium oxide, calcium carbonate, talc, clay, burned kaolin, burned calcium silicate, hydrated calcium silicate, aluminum silicate, magnesium silicate and calcium phosphate. Micro-particles are preferably those containing silicon because turbidity is decreased, and silicon dioxide is specifically preferred.

The mean particle size of a primary particle of micro-particles is preferably 5-400 nm and more preferably 10-300 nm. These may be contained as secondary aggregate having a particle size of 0 05-0.3 μm, or may be contained as primary particles without aggregation in the case of particles having an average particle size of 100-400 nm. The content of these micro-particles in polarizing plate protective film is preferably 0.01-1 percent by weight and specifically preferably 0.05-0.5 percent by weight. In the case of a polarizing plate protective film comprising a constitution of plural layers by a co-casting method, micro-particles of this addition amount are preferably incorporated in the surface.

As micro-particles of silicon dioxide, for example, products under the names of Aerosil R972, R972V, R974, R812, 200, 200V, 300, R202, OX50 and TT600 (produced by Nippon Aerosil Co., Ltd.) are available on the market and can be utilized.

As micro-particles of zirconium oxide, for example, products under the names of Aerosil R976 and R811 (produced by Nippon Aerosil Co., Ltd.) are available on the market and can be utilized.

Examples of polymer include silicone resin, fluorine-containing resin and acrylic resin. Silicone resin is preferred and those, having a three dimensional net structure, are specifically preferable; for example, products under the name of Tospearl 103, 105, 108, 120, 145, 3120 and 240 (produced by Toshiba Silicones Co., Ltd.) are available on the market and can be utilized.

Among these, Aerosil 200V and Aerosil R972 are specifically preferably utilized because of a large effect to decrease a friction coefficient while keeping turbidity of polarizing plate protective film to be low. In polarizing plate protective film utilized in this invention, a dynamic friction coefficient of at least one of the surfaces is preferably 0.2-1.0.

Various types of additives may be batch-wise added into a dope as a cellulose ester containing solution before casting, or may be inline-wise added by preparing a solution of dissolved additives. In particular, a part of or the total amount of micro-particles are preferably added by an inline method to reduce a load on a filter medium.

In the case of addition of an additive solution is performed by an inline method, it is preferable to dissolve a small amount of cellulose ester in the solution to increase compatibility with a dope. The preferable amount of cellulose ester is 1-10 weight parts and more preferably 3-5 weight parts against 100 parts of a solvent.

To perform inline addition and mixing in this invention, for example, an inline mixer such as Static Mixer (manufactured by Toray Engineering Corp.) and SWJ (Toray Static Inline Mixer, Hi-Mixer) is preferably utilized.

(Manufacturing of Polarizing Plate Protective Film)

Next, polarizing plate protective film of this invention will be explained.

As polarizing plate protective film according to this invention, either of film manufactured by a solution casting method or film manufactured by a melt casting method can be preferably utilized.

Manufacturing of polarizing plate protective film of this invention is performed by a process to dissolve cellulose ester and additives in a solvent to prepare a dope, a process to cast the dope on an infinitely transferring endless metal support, a process to dry the cast dope to make a web, a process to peel off the web from a metal support, a process to stretch the web or to hold the width, a process to further dry the web, and a process to wind up the finished film.

A process to prepare a dope will be now described. The concentration of cellulose in a dope is preferably the higher with respect to decreasing a drying load after the dope has been cast on a metal support, while, when the concentration of cellulose ester is excessively high, filtering precision will be deteriorated due to an increased load at the time of filtering.

The concentration to balance these is preferably 10-35 percent by weight and more preferably 15-25 percent by weight.

A solvent utilized in a dope of this invention, one type alone or at least two types in combination may be utilized, however, a good solvent and a poor solvent of cellulose ester are preferably utilized in combination with respect to manufacturing efficiency.

A preferable range of a mixing ratio-of a good solvent to a poor solvent is 70-98 percent by weight of good solvent to 2-30 percent by weight of a poor solvent. As a good solvent and a poor solvent, one dissolves cellulose ester, which is utilized, by itself alone is defined as a good solvent and one swells or can not dissolve cellulose ester is defined as a poor solvent.

Therefore, a good solvent and a poor solvent may differ depending on an average acetylation degree (an acetyl substitution degree), and for example, when acetone is utilized as a solvent, it becomes a good solvent for acetic ester of cellulose ester (an acetyl substitution degree of 2.4) and cellulose acetate propionate, while it becomes a poor solvent for acetic ester of cellulose (an acetyl substitution degree of 2.8) of cellulose.

A good solvent utilized in this invention is not specifically limited, however, includes an organic halogen compound such as methylene chloride, dioxolan, acetone, methylacetate and methyl acetoacetate. Methylene chloride and methyl acetate are specifically preferable.

Further, a poor solvent utilized in this invention is not specifically limited, however, such as methanol, ethanol, n-butanol, cyclohexane and cyclohexanone are preferably utilized. Further, a dope is preferably contains 0.01-2 percent by weight of water. Further, as a solvent utilized for dissolution of cellulose ester, a solvent removed from film by drying in a film casting process is recovered and reused.

As a dissolution method of cellulose ester at the time of preparation of the dope described above, a general method can be employed. By combination of heating and increased pressure, it is possible to heat up to higher than a boiling point at an ordinary pressure.

It is preferable because generation of a granular insoluble residue, which is called as gel or flocculates, is inhibited, when cellulose ester is dissolved with stirring while being heated at a temperature in a range of not lower than a boiling point under ordinary pressure and not to boil the solvent under increased pressure. Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside and, for example, a jacket type equipment is preferable with respect to easy temperature control.

Heating temperature with addition of a solvent is preferably the higher in view of solubility of cellulose ester, however, productivity may be deteriorated due to increase of a required pressure when the heating temperature is excessively high. The heating temperature is preferably 45-120° C., more preferably 60-110° C. and still more preferably 70-105° C. Further, pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small.

Therefore, the absolute filtering precision of a filter medium is preferably not larger than 0.008 mm, more preferably 0.001-0.008 mm and furthermore preferably 0.003-0.006 mm.

The material of a filter medium is not specifically limited and an ordinary filter medium can be utilized, however, a filter medium made of plastic such as polypropylene and Teflon® and a filter medium made of metal such as stainless steel are preferable because of such as no release of fiber of a filter medium.

It is preferable to eliminate and reduce particularly impurities and foreign materials causing a bright spot defect having been contained in cellulose ester as a raw material by filtration.

Foreign materials causing bright spot defects means a spot (a foreign material) which is visible due to light leak, when two sheets of polarizing plates, between which polarizing plate protective film is placed, are arranged in a crossed Nicol state, and light is irradiated from one of the polarizing plate side to be observed from the other polarizing plate side. The number of bright spots having a diameter of not less than 0.01 mm is preferably not more than 200 spots/cm².

More preferably not more than 100 spots/not more than 200 spots/cm² furthermore preferably not more than 50 spots/cm² and most preferably 0-10 spot/cm². Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures before and after filtering (referred to as a pressure difference).

The preferable temperature is 45-120° C., more preferably 45-70° C. and furthermore preferably 45-55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is mirror finished, is utilized.

The cast width can be set to 1-4 m. The surface temperature of a metal support in a cast process is from −50° C. to lower than a boiling point of a solvent and it is preferable the temperature is the higher since web drying speed is fast; however, excessively high temperature may sometimes cause foaming of a web or deterioration of flatness. The support temperature is preferably 0-40° C. and more preferably 5-30° C.

It is also a preferable method to make a web gelled by cooling and to peel off the web from a drum with a plenty of residual solvent contained.

A method to control the temperature of a metal support is not specifically limited, however, there are a method to blow a hot wind or a cold wind on the web and a method to make hot water contact the rear side of a metal plate.

A method to utilize hot water is preferable because time required to make a metal support become a constant temperature is short due to more efficient heat transfer by use of a hot water. In the case of employing a hot wind, a wind of a temperature higher than the aimed temperature may be employed.

To provide a good flatness of polarizing plate protective film, the residual solvent amount at the time of peeling off a web from a metal support is preferably 10-150 percent by weight, more preferably 20-40 percent by weight or 60-130 percent by weight and specifically preferably 20-30 percent by weight or 70-120 percent by weight.

In this invention, a residual solvent amount is defined by the following formula.

$$\text{Residual solvent amount (percent by weight)} = \{(M-N)/N\} \times 100$$

Herein, M is a weight of a sample picked at an arbitrary time during or after manufacturing of a web or film and N is a weight after heating at 115° C. for 1 hour.

Further, in a drying process of polarizing plate protective film, a web is preferably peeled off from a metal support and further dried to make a residual solvent amount of not more than 1 percent by weight, more preferably not more than 0.1 percent by weight and specifically preferably 0-0.01 percent by weight.

In a film drying process, a roll drying method (in which a web is dried while being alternately passed through many rolls which are arranged up and down) or a method to dry a web while being transported by a tenter method will be applied.

To prepare polarizing plate protective film of this invention, it is specifically preferable that a web is stretched along the transport direction (the longitudinal direction) immediately after having been peeled off from a metal support with a large amount of a residual solvent and is further stretched in the width direction by means of a tenter method to grip the both edges of the web by such as clips.

<Hard Coat>

A hard coat layer having a thickness of 8-20 μm is provided on the optical film of this invention. The hard coat layer is provided by employing a gravure coater, dye coater and the like. The thickness is 8-20 μm, and preferably 10-16 μm at dry state. Improving anti-abrasion is not sufficient at not more than 8 μm, and sufficient flatness is hardly obtained over 20 μm. Fluctuation of thickness in longitudinal direction or lateral direction is preferably within ±0.5 μm, more preferably ±0.1 μm of an average thickness. Further preferably is within ±0.05 μm, and particularly preferable is within ±0.01 μm.

The hard coat layer is preferably an actinic energy curing resin layer.

The actinic ray curing resin layer refers to a layer which contains, as a main component, a resin curing through a crosslinking reaction when exposed to actinic rays such as UV light or electron beams. The actinic ray curing resin layer preferably contains an ethylenically unsaturated monomer, which is exposed to actinic rays such as. UV light or electron beams and cured to form a hard coat layer. Listed as representative actinic ray curing resins are UV curing resins as well as electron beam curing resins. The actinic ray curing resin is preferably a UV curing resin.

As ultraviolet ray curable resin, preferably utilized are such as ultraviolet ray curable urethane acrylate resin, ultraviolet ray curable polyester acrylate resin, ultraviolet ray curable epoxy acrylate resin, ultraviolet ray curable polyol acrylate resin or ultraviolet ray curable epoxy resin. The ultraviolet ray curable urethane acrylate resin is preferable among them.

Ultraviolet ray curable acryl urethane resin can be easily prepared generally by reacting polyester polyol with isocyanate monomer or prepolymer and further reacting the resulting product with acrylate type monomer having a hydroxyl group such as 2-hydroxyethylacrylate, 2-hydroxyethylmethacrylate (hereinafter, the term "acrylate" includes acrylate itself and methacrylate, and acrylate represents both) and 2-hydroxypropylacrylate. For example, those described in JP-A S59-151110 can be utilized. For example, B420 manufactured by Shin-Nakamura Chemical Co., Ltd. is preferably employed.

The UV ray curable polyesteracrylate resins include those prepared easily by reacting a polyesterpolyol with 2-hydroxyethylacrylate or 2-hydroxypropylacrylate, disclosed for example, in JP-A S59-151112.

Examples of the WV ray curable epoxyacrylate resin include those prepared by reacting an epoxyacrylate oligomer in the presence of a reactive diluting agent and a photoinitiator, disclosed for example, in JP-A H01-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the WV ray curable resins include benzoin or its derivative, or acetophenones, benzophenones, hydroxy benzophenones, Michler's ketone, α-amyloxime esters, thioxanthones or their derivatives an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR or BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Chemical Co., Ltd.); SEIKABEAM PHC2210(S), PHC X-9(K-3), PHC2213, DP-10, DP-20, DP-30, P1000, P1100, P1200, P1300, P1400, P1500, P1600, SCR900 (manufactured by Dainichiseika Color & Chemicals Mfg. Co., Ltd.); KRM7033, KRM7039, KRM7130, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No.340 Clear (manufactured by Chugoku Marine Paints, Ltd.); Sunrad H-601, RC-750, RC-700, RC-600, RC-500, RC-611 and RC-612 (manufactured by Sanyo Chemical Industries, Ltd.); SP-1509 and SP-1507 (manufactured by Showa Highpolymer Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetraacrylate, pentaerythritol triacrylate, pentaerythritol tetracrylate, dipentaerythritol hexaacrylate and alkyl modified dipentaerythritol pentaacrylate.

The UV-curable resin layer thus obtained may preferably contain inorganic or organic particles in order to attain the improving scratch resistance, providing lubrication, controlling refractive index and reducing glaring.

Inorganic particles to be contained in a hard coat layer include, for example: silicon oxide, titanium oxide, aluminum oxide, tin oxide, indium oxide, ITO, zinc oxide, zirconium oxide, magnesium oxide, calcium carbonate, talc, clay, calcined kaolin, calcined calcium silicate, hydrated calcium silicate, aluminum silicate, magnesium silicate and calcium phosphate. Of these, silicon oxide, titanium oxide, aluminum oxide, zirconium oxide, and magnesium oxide are specifically preferable.

Organic particles include, for example: particles of polymethacrylic acid methyl acrylate resin, acryl styrene based resin, polymethyl methacrylate resin, silicon-containing resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic particles include, for example: particles of cross-linked polystyrene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The mean particle diameter of the particles is preferably from 0.01 to 5 μm, more preferably from 0.1 to 5 μm, and specifically preferably from 0.1 to 4 μm. The hard coat layer preferably contains two or more kinds of particles having different diameters. The mixing ratio of particles and UV-curable resin composition is preferably from 0.1 to 30 weight parts of particles per 100 weight parts of resin composition.

The hard coat layer is preferably a layer having a mean center-line roughness (Ra : prescribed by JIS B 0601) of 0.001 to 0.1 μm or may be an anti-glare layer having Ra value of 0.1 to 1 μm. The mean center line roughness (Ra) is preferably measured by means of a non-contact surface micro morphology meter, for example, WYKO Optical Profiler NT-2000 manufactured by Veeco Instruments.

These actinic ray curing resin layers can be applied by any method, for example: a gravure coater, a dip coater, a reverse coater, a wire bar coater, a die coater and ink jet printing.

Light sources to cure layers of UV curable-resin by photo-curing reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is preferably from 5 to 150 mJ/cm$^2$, and more preferably from 20 to 100 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to apply tension to the film is not specifically limited and tension may be applied while the film is transported with back rolls or may be applied in a tenter in the lateral direction or in the biaxial directions of the film, whereby a cellulose ester film exhibiting a superior flatness can be obtained.

An organic solvent used for a coating solution of the UV curable-resin can be selected from, for example, hydrocarbons (toluene and xylene), alcohols (methanol, ethanol, isopropanol, butanol and cyclohexanol), ketones (acetone, methylethyl ketone and methylisobutyl ketone), esters (methyl acetate, ethyl acetate and methyl lactate) glycol ethers and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

The hard coat layer may be preferably mixed with a fluorine-containing surfactant or a silicone surfactant, which will be described below. The contents of these surfactants are preferably 0.01-3% by weight based on the solid content of the coating solution.

The hard coat layer may have a laminated structure containing two or more layers, one of which may be an anti-electrostatic layer containing conductive particles or an ionic polymer. One of the layers may also contain a color adjusting agent to have a color adjusting function to be used as a color filter for various kinds of displays, or may contain an electromagnetic wave blocking material or an IR ray absorbent to have respective functions.

The hard coat layer is preferably irradiated with UV rays after the layer is applied and dried. The duration of irradiation is preferably 0.1-60 seconds in order to obtain a sufficient amount of irradiation. The duration is more preferably 0.1-10 seconds in view of hardening efficiency and working efficiency.

The illuminance of the ionizing radiation is preferably 50-150 mW/cm$^2$.

The hard coat film subjected to UV light exposure or anti-reflection film having anti-reflection layer is wind in a roll form, and is preferably subjected to thermal aging at 50 to 100° C. for three days or more in a roll form. The aging is performed preferably at 70 to 100° C. for five to thirty days. The aging treatment is preferably performed at a place capable of controlling temperature and humidity for stable treatment, for example, a thermal processing clean room.

The roll film wound on a plastic core having provided with a hard coat or anti-reflection layer is preferably rotated in a wound state during the thermal treatment. The rotation is performed preferably one round per one minute or less, continuously or intermittently. The roll is preferably subjected to unwinding-rewinding at least once during the thermal treatment.

(Anti-reflection Layer)

The antireflection layer based on light diffraction, employed in the present invention, will now be described.

The antireflection layer may be constituted by a multi-refractive index layer. Layers are applied onto a hard coat layer on a transparent cellulose ester film substrate to decrease reflectance due to optical diffraction, while considering the refractive index, the layer thickness, the number of layers, and the order of layers. The anti-reflection layer may be composed of the combination of a high refractive index layer which exhibits a higher refractive index than the support and a low refractive index layer which exhibits a lower refractive index than the support. An anti-reflection layer composed of at least three refractive index layers is particularly preferred, in which three layers, which differ in refractive index, are coated in the order from the support of a medium refractive index layer (exhibiting a higher refractive index than the support or the hard coat layer and a lower refractive index than the high refractive index layer)/a high refractive index layer/a low refractive index layer. It is preferred to provide at least a low refractive index layer.

Examples of preferred layer configuration of the antireflection film of the present invention will now be described. Herein, "/" represents the arrangement of a layer upon a layer.

Back coat layer/support/hard coat layer/low refractive index layer Back coat layer/support/hard coat layer/high refractive index layer/low refractive index layer Back coat layer/support/hard coat layer/medium refractive index layer/high refractive index layer/low refractive index layer Back coat layer/support/antistatic layer/hard coat layer/medium refractive index layer/high refractive index layer/low refractive index layer Antistatic layer/support/hard coat layer/medium refractive index layer/high refractive index layer/low refractive index layer Back coat layer/support/hard coat layer/high refractive index layer/low refractive index layer/high refractive index layer/low refractive index layer <Low Reflective Index Layer>

(Alkoxysilane Compound or Hydrolysis Product Thereof)

The low refractive index layer preferably contains an alkoxysilane Compound or its hydrolysis product. Examples preferably used include tetraalkoxysilane (tetramethoxysilane and tetraethoxysilane), alkyltrialkoxysilane (methyltrimethoxysilane, and ethyltrimethoxysilane) aryltrialkoxysilane (phenyltrimethoxysilane, dialkyldialkoxysilane, diaryldialkoxysilane. Further, it is also preferable to use organoalkoxysilanes having various type of functional group (vinyltrialkoxysilane, methylvinyldialkoxysilane, γ-glycidyloxypropyltrialkoxysilane, γ-glycidyloxypropylmethyldialkoxysilane, β-(3,4)epoxycyclohexyl)ethyltrialkoxysilane, γ-methacryloyloxypropyltrialkoxysilane, γ-aminoptopyltrialkoxysilane, γ-mercaptopropyltrialkoxysilane, and γ-chloropropyltrialkoxysilane), perfluoroalkyl group containing silane compounds (for example, (heptadecafluoro-1,1,2,2-tetradecyl)triethoxysilane, 3,3,3-trifluoropropyltrimethoxy silane). In view of decreasing the refractive index of the layer and providing water repellency and oil repellency, it is preferable to particularly use fluorine containing silane compounds.

The low reflective index layer preferably contains hollow silica minute particle, the inside of which is porous or hollow, provided with an outer shell layer.

(Hollow Silica Minute Particles)

Hollow silica minute particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the inside of which is hollow, and the hollow is surrounded by a particle wall. The interior of the hollow is filled with the contents such as a solvent, a gas or a porous substance which have been utilized in preparation. The mean particle diameter of such hollow sphere particles is preferably in a range of 5-300 nm and preferably of 10-200 nm. The mean particle diameter of hollow sphere particles utilized is appropriately selected depending on the thickness of the formed transparent cover film and is preferably in a range of 2/3-1/10 of the layer thickness of the transparent cover film of such as a formed low refractive index layer. These hollow sphere particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porosity of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, $NaF$, $NaAlF_6$ and $MgF$. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased.

Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of JP-A H07-133105, is suitably applied. Specifically, in the case of a complex particle being comprised of silica and an inorganic compound other than silica, the hollow particle is manufactured according to the following first-third processes.

First Process: Preparation of Porous Particle Precursor

In the first process, alkaline aqueous solutions of a silica raw material and of an inorganic compound raw material other than silica are independently prepared or a mixed aqueous solution of a silica raw material and an inorganic compound raw material other than silica is prepared, in advance, and this aqueous solution is gradually added into an alkaline aqueous solution having a pH of not less than 10 while stirring depending on the complex ratio of the aimed complex oxide, whereby a porous particle precursor is prepared.

As a silica raw material, silicate of alkali metal, ammonium or organic base is utilized. As silicate of alkali metal, utilized are sodium silicate (water glass) and potassium silicate, organic base includes quaternary ammonium salt such as tetraethylammonium salt; and amines such as monoethanolamine, diethanolamine and triethanolamine. Herein, an alkaline solution, in which such as ammonia, quaternary ammonium hydroxide or an amine compound is added to a silicic acid solution, is also included in silicate of ammonium or silicate of organic base.

Further, as a raw material of an inorganic compound other than silica, utilized is an alkali-soluble inorganic compound. Specific examples include oxoacid of an element selected from such as Al, B, Ti, Zr, Sn Ce, P, Sb, Mo, Zn and W; alkali metal salt, alkaline earth metal salt, ammonium salt and quaternary ammonium salt of said oxoacid. More specifically, sodium aluminate, sodium tetraborate, ammonium zirconyl carbonate, potassium antimonite, potassium stannate, sodium aluminosilicate, sodium molybdate, cerium ammonium nitrate and sodium phosphate are suitable.

The pH value of a mixed aqueous solution changes simultaneously with addition of these aqueous solutions, however, operation to control the pH value into a specific range is not necessary. The aqueous solution finally takes a pH value determined by the types and the mixing ratio of inorganic oxide. At this time, the addition rate of an aqueous solution is not specifically limited. Further, dispersion of a seed particle may be also utilized as a starting material at the time of manufacturing of complex oxide particles. Said seed particles are not specifically limited, however, particles of inorganic oxide such as $SiO_2$, $Al_2O_3$, $TiO_2$ or $ZrO_2$ or complex oxide thereof are utilized, and generally sol thereof can be utilized. Further, a porous particle precursor dispersion prepared by the aforesaid manufacturing method may be utilized as a seed particle dispersion. In the case of utilizing a seed particle dispersion, after the pH of a seed particle dispersion is adjusted to not lower than 10, an aqueous solution of the aforesaid compound is added into said seed particle dispersion while stirring. In this case pH control of dispersion is not necessarily required. By utilizing seed particles in this manner, it is easy to control the particle diameter of prepared particles and particles having a uniform size distribution can be obtained.

A silica raw material and an inorganic compound raw material, which were described above, have a high solubility at alkaline side. However, when the both are mixed in pH range showing this high solubility, the solubility of an oxoacid ion such as a silicic acid ion and an aluminic acid ion will decrease, resulting in precipitation of these complex products to form particles or to be precipitated on a seed particle causing particle growth. Therefore, at the time of precipitation and growth of particles, pH control in a conventional method is not necessarily required.

A complex ratio of silica and an inorganic compound other than silica is preferably in a range of 0.05-2.0 and more preferably of 0.2-2.0, based on mole ratio $Mo_x/SiO_2$, when an inorganic compound other than silica is converted to oxide ($MO_x$). In this range, the smaller is the ratio of silica, increases the pore volume of porous particles. However, a pore volume of porous particles barely increases even when the mole ratio is over 2.0. On the other hand, a pore volume becomes small when the mole ratio is less than 0.05. In the case of preparing hollow particles, mole ratio of $Mo_x/SiO_2$ is preferably in a range of 0.25-2.0.

Second Process: Removal of Inorganic Compounds Other Than Silica from Porous Particles In the second process, at least a part of inorganic compounds other than silica (elements other than silica and oxygen) is selectively removed from the porous particle precursor prepared in the aforesaid first process. As a specific removal method, inorganic compounds in a porous particle precursor are dissolved and removed by use of such as mineral acid and organic acid, or by being contacted with cationic ion-exchange resin.

A porous particle precursor prepared in the first process is a particle having a network structure in which silica and an inorganic compound element bond via oxygen. In this manner, by removing inorganic compounds (elements other than silica and oxygen) from a porous particle precursor, porous particles, which are more porous and have a large pore volume, can be prepared. Further, hollow particles can be prepared by increasing the removal amount of inorganic compound (elements other than silica and oxygen) from a porous particle precursor.

Further, in advance to removal of inorganic compounds other than silica from a porous particle precursor, it is preferable to form a silica protective film by adding a silicic acid solution which contains a silane compound having a fluorine substituted alkyl group, and is prepared by dealkalization of alkali metal salt of silica; or a hydrolyzable organosilicon compound, in a porous particle precursor dispersion prepared in the first process. The thickness of a silica protective film is 0.5-15 nm. Herein, even when a silica protective film is formed, since the protective film in this process is porous and has a thin thickness, it is possible to remove the aforesaid inorganic compounds other than silica from a porous particle precursor.

By forming such a silica protective film, the aforesaid inorganic compounds other than silica can be removed from a porous particle precursor while keeping the particle shape as it is. Further, at the time of forming a silica cover layer described later, the pore of porous particles is not blocked by a cover layer, and thereby the silica cover layer described later can be formed without decreasing the pore volume. Herein, when the amount of inorganic compound to be removed is small, it is not necessary to form a protective film because the particles will never be broken.

It is preferable to form this silica protective film in the case of preparation of hollow particles. At the time of preparation of hollow particles, a hollow particle precursor, which is comprised of a silica protective film, a solvent and insoluble porous solid within said silica protective film, is obtained when inorganic compounds are removed, and hollow particles are formed, by making a particle wall from a formed cover layer, when the cover layer described later is formed on said hollow particle precursor.

The amount of a silica source added to form the aforesaid silica protective film is preferably in a range to maintain the particle shape. When the amount of a silica source is excessively large, it may become difficult to remove inorganic compounds other than silica from a porous particle precursor because a silica protective film becomes excessively thick. As a hydrolizable organosilicon compound utilized to form a silica protective film, alkoxysilane represented by formula $R_nSi(OR')_{4-n}$, can be utilized, wherein R and R':each is a hydrocarbon group such as an alkyl group, an aryl group, a vinyl group or an acryl group; n=0, 1, 2 or 3. Fluorine-substituted tetraalkoxysilane, such as tetramethoxysilane, tetraethoxysilane and tetraisopropoxysilane, is specifically preferably utilized.

As an addition method, a solution, in which a small amount of alkali or acid as a catalyst is added into a mixed solution of these alkoxysilane, pure water and alcohol, is added into the aforesaid dispersion of porous particles, and silicic acid polymer formed by hydrolysis of alkoxysilane is precipitated on the surface of inorganic oxide particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of a porous particle precursor is water alone or has a high ratio of water to an organic solvent, it is also possible to form a silica protective film by use of a silicic acid solution. In the case of utilizing a silicic acid solution, a predetermined amount of a silicic acid solution is added into the dispersion and alkali is added simultaneously, to precipitate silicic acid solution on the porous particle surface. Herein, a silica protective film may also be formed by utilizing a silicic acid solution and the aforesaid alkoxysilane in combination.

Third Process: Formation of Silica Cover Layer

In the third process, by addition of such as a hydrolyzable organosilicon compound containing a silane compound provided with a fluorine substituted alkyl group, or a silicic acid solution, into a porous particle dispersion (into a hollow particle dispersion in the case of hollow particles), which is prepared in the second process, the surface of particles is covered with a polymer substance of such as a hydrolyzable organosilicon compound or a silicic acid solution to form a silica cover layer.

As a hydrolyzable organosilicon compound utilized for formation of a silica cover layer, alkoxysilane represented by formula $R_nSi(OR')_{4-n}$ (R, R': a hydrocarbon group such as an alkyl group, an aryl group, a vinyl group and an acryl group; n=0, 1, 2 or 3), as described before, can be utilized. Tetraalkoxysilane such as tetramethoxysilane, tetraethoxysilane and tetraisopropoxysilane are specifically preferably utilized.

As an addition method, a solution, in which a small amount of alkali or acid as a catalyst is added into a mixed solution of these alkoxysilane, pure water and alcohol, is added into the aforesaid dispersion of porous particles (a hollow particle precursor in the case of hollow particles), and silicic acid polymer formed by hydrolysis of alkoxysilane is precipitated on the surface of porous particles (a hollow particle precursor in the case of hollow particles). At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of porous particles (a hollow particle precursor in the case of hollow particles) is water alone or a mixed solution of water with an organic solvent having a high ratio of water to an organic solvent, it is also possible to form a cover layer by use of a silicic acid solution A silicic acid solution is an aqueous solution of lower polymer of silicic acid which is formed by ion-exchange and dealkalization of an aqueous solution of alkali metal silicate such as water glass.

A silicic acid solution is added into a dispersion of porous particles (a hollow particle precursor in the case of hollow particles), and alkali is simultaneously added to precipitate silicic acid lower polymer on the surface of porous particles (a hollow particle precursor in the case of hollow particles). Herein, silicic acid solution may be also utilized in combination with the aforesaid alkoxysilane to form a cover layer. The addition amount of an organosilicon compound or a silicic acid solution, which is utilized for cover layer formation, is as much as to sufficiently cover the surface of colloidal particles and the solution is is added into a dispersion of porous particles (a hollow particle precursor in the case of hollow particles) at an amount to make a thickness of the finally obtained silica cover layer of 1-20 nm. Further, in the case that the aforesaid silica protective film is formed, an organosilicon compound or a silicic acid solution is added at an amount to make a thickness of the total of a silica protective film and a silica cover layer of 1-20 nm.

Next, a dispersion of particles provided with a cover layer is subjected to a thermal treatment. By a thermal treatment, in the case of porous particles, a silica cover layer, which covers the surface of porous particles, becomes minute to prepare a dispersion of complex particles comprising porous particles covered with a silica cover layer. Further, in the case of a hollow particle precursor, the formed cover layer becomes minute to form a hollow particle wall, whereby a dispersion of hollow particles provided with a hollow, the interior of which is filled with a solvent, a gas or a porous solid, is prepared.

Thermal treatment temperature at this time is not specifically limited provided being so as to block micro-pores of a silica cover layer, and is preferably in a range of 80-300° C. At a thermal treatment temperature of lower than 80° C., a silica cover layer may not become minute to completely block the micro-pores or the treatment time may become long. Further, when a prolonged treatment at a thermal treatment temperature of higher than 300° C. is performed, particles may become minute and an effect of a low refractive index may not be obtained.

A retractive index of inorganic particles prepared in this manner is as low as less than 1.42. It is assumed that the refractive index becomes low because such inorganic particles maintain porous property in the interior of porous particles or the interior is hollow. The refractive index of the low refractive index layer according to this invention is preferably 1.30-1.50 and more preferably 1.35-1.44.

Minute particles of $SiO_2$ on the market may be employed, example of which is P-4 manufactured by Catalysts & Chemicals Ind., Co., Ltd.

A content of hollow silica minute particles, the inside of which is porous or hollow, in a low refractive index layer is preferably 10-80 percent by weight and more preferably 20-60 percent by weight.

The low refractive index layer according to this invention preferably contains the silica minute particles described above and a silane coupling agent.

A silane coupling agent includes methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimetboxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Examples of a silane coupling agent having two alkyl substituents for silicon include: dimethyldimethoxysilane, phenylmethyldimethoxysilane, dimethyldiethoxysilane, phenylmethyldiethoxysilane γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

Among them, vinylmethoxysilane, vinyltriethoxysilane, vinyltriacethoxysilane, vinyltrimethoxyethoxysilane, γ-acryloyloxypropyltrimethoxysilane and γ-methacryloyloxypropyltrimethoxysilane, which are provided with a double bond in a molecule; γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane and methylvinyldiethoxysilane, as those having a 2-substituting alkyl group for silicon are preferable; and γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilne are specifically preferable.

Specific examples of the silane coupling agent include KBM-303, KBM-402, KBM-403, KBM-1403, KBM-502, KBM-503, KBE-502, KBE-503, KBM-603, KBE-603, KBM-903, KBE-903, KBE-9103, KBM-802 and KBM-803, each of which is manufactured by Shin-Etsu Chemical Co., Ltd.

Two or more coupling agents may be utilized in combination other silane coupling agents in addition to the above-described silane coupling agents may be utilized. Other silane coupling agents include alkyl ester of orthosilicic acid (such as methyl orthosilicate, ethyl orthosilicate, n-propyl orthosilicate, i-propyl orthosilicate, n-butyl orthosilicate, sec-butyl orthosilicate and t-butyl orthosilicate) and hydrolyzed substances thereof.

Practical example of the surface processing by a coupling is described.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating solution in advance.

It is also preferable that the low refractive index layer contains polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles. It is preferable that the polymers of (3) are formed employing a polymerization reaction during or after coating of the low refractive index layer while adding their monomers to the above low refractive index layer coating composition. It is preferable that at least two of (1), (2), and (3) or all are combined and employed of these, it is particularly preferable to practice the combination of (1) and (3) or the combination of (1), (2), and (3). Description will be made on (1) surface treatment, (2) shell, and (3) binder successively in that order.

(1) Surface Treatment

It is preferable that particles (specifically, inorganic particles) are subjected to a surface treatment to improve affinity with polymers. These surface treatments are classified into a physical surface treatment such as a plasma discharge treatment or a corona discharge treatment and a chemical surface treatment employing coupling agents. It is preferable that the chemical surface treatment is only performed or the physical surface treatment and the chemical surface treatment are performed in combination. Preferably employed as coupling agents are organoalkoxymetal compounds (for example, titanium coupling agents and silane coupling agents). In cases in which particles are composed of $SiO_2$, it is possible to particularly effectively affect a surface treatment employing the silane coupling agents.

Surface treatment by a coupling agent can be performed in such a manner that a coupling agent is added to a dispersion of minute particles and the dispersion is allowed to stand for several hours to 10 days at a temperature from a room temperature to 60° C. An inorganic acid, for example, sulfuric acid, hydrochloric acid, nitric acid, chromic acid, hypochlorous acid, boric acid, ortho silicic acid, phosphoric acid and carbonic acid or an organic acid, for example, acetic acid, polyacrylic acid, benzenesulfonic acid, phenol and polyglutamic acid, or their salt such as metal salt or ammonium salt, may be added to accelerate the surface treatment reaction.

(2) Shell

Shell forming polymers are preferably polymers having a saturated hydrocarbon as a main chain. Polymers incorporating fluorine atoms in the main chain or the side chain are preferred, while polymers incorporating fluorine atoms in the side chain are more preferred. Acrylates or methacrylates are preferred and esters of fluorine-substituted alcohol with polyacrylic acid or methacrylic acid are most preferred. The refractive index of shell polymers decreases as the content of fluorine atoms in the polymer increases. In order to lower the refractive index of a low refractive index layer, the shell polymers incorporate fluorine atoms in an amount of preferably 35-80 percent by weight, but more preferably 45-75 percent by weight. It is preferable that fluorine containing polymers are synthesized via the polymerization reaction of fluorine atom containing ethylenically unsaturated monomers. Listed as examples of fluorine atom containing ethylenically unsaturated monomers are fluoroolefins (for example, fluoroethylene, vinylidene fluoride, tetrafluoroethylene, hexafluoropropylene, perfluoro-2,2-dimethyl-1,3-dixol), fluorinated vinyl ethers and esters of fluorine substituted alcohol with acrylic acid or methacrylic acid.

Polymers to form the shell may be copolymers having recurring units with and without fluorine atoms. It is preferable that the units without fluorine atoms are prepared employing the polymerization reaction of ethylenically unsaturated monomers without fluorine atoms. Listed as examples of ethylenically unsaturated monomers without fluorine atoms are olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, butyl methacrylate, and ethylene glycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-t-butylacrylamide and N-cyclohexylacrylamide), methacrylamide and acrylonitrile.

In the case of (3) in which binder polymers described below are simultaneously used, a crosslinking functional group may be introduced into shell polymers and the shell polymers and binder polymers are chemically bonded via crosslinking. Shell polymers may be crystalline. When the glass transition temperature (Tg) of the shell polymer is higher than the temperate during the formation of a low refractive index layer, micro-voids in the low refractive index layer are easily maintained. However, when Tg is higher than the temperature during formation of the low refractive index layer, minute particles are not fused and occasionally, the resulting low refractive index layer is not formed as a continuous layer (resulting in a decrease in strength). In such a case, it is desirous that the low refractive index layer is formed as a continuous layer simultaneously employing the binder polymers of (3). A polymer shell is formed around the minute particle, whereby a minute core/shell particle is obtained. A core composed of a minute inorganic particle is incorporated preferably 5-90 percent by volume in the minute core/shell particle, but more preferably 15-80, percent by volume. At least two types of minute core/shell particle may be simultaneously employed. Further, inorganic particles without a shell and core/shell particles may be simultaneously employed.

(3) Binders

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenically unsaturated monomers. In order to prepare crosslinked binder polymers, it is preferable to employ monomers having at least two ethylenically unsaturated groups. Listed as examples of monomers having at least two ethylenically unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene, 4-vinylbenzoic acid-2-acryloylethyl ester, and 1,4-divinylcyclohexane); vinylsulfones (for example, divinylsulfone); acrylamides (for example, methylenebisacrylamide); and methacrylamides. It is preferable that polymers having polyether as a main chain are synthesized employing a ring opening polymerization reaction of a multi-functional epoxy compound. A crosslinking structure may be introduced into binder polymers employing a reaction of crosslinking group instead of or in addition to monomers having at least two ethylenically unsaturated groups. Listed as examples of the crosslinking functional groups are an isocyanate group, an epoxy group, an aziridine group, an oxazoline group, an aldehyde group, a carbonyl group, a hydrazine group, a carboxyl group, a methylol group, and an active methylene group. It is possible to use, as a monomer to introduce a crosslinking structure, vinylsulfonic acid, acid anhydrides, cyanoacrylate derivatives, melamine, ether modified methylol, esters and urethanes. Functional groups such as a block isocyanate group, which exhibit crosslinking properties as a result of the decomposition reaction, may be employed. The crosslinking groups are not limited to the above compounds and include those which become reactive as a result of decomposition of the above functional group. Employed as polymerization initiators used for the polymerization reaction and crosslinking reaction of binder polymers are heat polymerization initiators and photopolymerization initiators, but the photopolymerization initiators are more preferred. Examples of photopolymerization initiators include acetophenones, benzoins, benzophenones, phosphine oxides, ketals, antharaquinones, thioxanthones, azo compounds, peroxides, 2,3-dialkyldiones, disulfide compounds, fluoroamine compounds, and aromatic sulfoniums. Examples of acetophenones include 2,2-diethoxyacetophenone, p-dimethylacetophenone, 1-hydroxydimethyl phenyl ketone, 1-dihydroxycyclohexyl phenyl ketone, 2-methyl-4-methylthio-2-morpholinopropiophene, and 2-benzyl-2-dimethylamino-1-(4-morpholinophenyl)-butanone. Examples of benzoins include benzoin methyl ether, benzoin ethyl ether and benzoin isopropyl ether. Examples of benzophenones include benzophenone, 2,4-dichlorobenzophenone, 4,4-dichlorobenzophenone, and p-chlorobenzophenone. An example of phosphine oxides includes 2,4,6-trimethylbenzoyldiphenylphosphine oxide.

It is preferable that binder polymers are formed in such a manner that monomers are added to a coating composition for the low refractive index layer and the binder polymers are formed during or after coating of the low refractive index layer utilizing a polymerization reaction (if desired, further crosslinking reaction). A small amount of polymers (for example, polyvinyl alcohol, polyoxyethylene, polymethyl methacrylate, polymethyl acrylate, diacetyl cellulose, triacetyl cellulose, nitrocellulose, polyester, and alkyd resins) may be added to the coating composition for the low refractive index layer.

The low refractive index layers usable in the present invention may be a low refractive index layer formed by crosslinking of fluorine containing resins (hereinafter referred to as "fluorine containing resins prior to crosslinking") which undergo crosslinking via heating or ionizing radiation.

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene, perfluoro-2,2-dimethyl-1,3-dioxol) partially or completely fluorinated alkyl ester derivatives of (meth)acrylic acid (for example, VISCOAT 6FM (produced by Osaka Organic Chemical Industry Ltd.) and M-2020, (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilaner or vinyl glycidyl ether, as well as vinyl monomers having a carboxyl group, a hydroxyl group, an amino group, or a sulfone group (for example, (meth)acrylic acid, methylol(meth)acrylate, hydroxyalkyl (meth)acrylate, allyl acrylate, hydroxyalkyl vinyl ether, and hydroxyalkyl allyl ether) JP-A H10-25388 and H10-147739, describe that a crosslinking structure is introduced into the latter by adding compounds having a group which reacts with the functional group in the polymer and at least one reacting group Listed as examples of the crosslinking group are an acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

A fluorine containing copolymer formed by employing a fluorine containing vinyl monomer and a monomer other than a monomer giving crosslinking group in addition to the monomer described above may be used as a fluorine containing resins prior to crosslinking. The usable monomer includes olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, butyl methacrylate, and ethylene glycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-t-butylacrylamide and N-cyclohexylacrylamide), methacrylamide and acrylonitrile.

It is preferred to introduce polyorgano siloxane skeleton or perfluoropolyether skeleton into the fluorine containing copolymer to endow slippage or stain resistance. These are obtained by polymerization of polyorgano siloxane or perfluoropolyether having, for example, an acrylic, methacrylic, vinylether, or styryl group at their terminal, with a monomer described above, polymerization of polyorgano siloxane or perfluoropolyether having a radical generation group at their terminal a monomer described above, or a reaction of polyorgano siloxane or perfluoropolyether having a functional group with a fluorine containing copolymer.

The ratio of each monomer to form the fluorine containing copolymers prior to coating is as follows. The ratio of fluorine containing vinyl monomers is preferably 20-70, mol percent, but is more preferably 40-70, mol percent; the ratio of monomers to provide a crosslinking group is preferably 1-20, mol percent, but is more preferably 5-20 mol percent, and the ratio of the other monomers simultaneously employed is preferably 10-70, mol percent, but is more preferably 10-50, mol percent.

The fluorine containing copolymers can be obtained by polymerizing these monomers employing methods such as a solution polymerization method, a block polymerization method, an emulsion polymerization method or a suspension polymerization method.

The fluorine containing resins prior to coating are commercially available and it is possible to employ commercially available products. Listed as examples of the fluorine containing resins prior to coating are SAITOP (produced by Asahi Glass Co., Ltd.), TEFLON (a registered trade name) AD (produced by Du Pont), vinylidene polyfluoride, RUMIFRON (produced by Asahi Glass Co., Ltd.), and OPSTAR (produced by JSR Corp.).

The dynamic friction coefficient and contact angle to water of the low refractive index layer composed of crosslinked fluorine containing resins are in the range of 0.03-0.15, and in the range of 90-120, degrees, respectively.

The low refractive index layer according to this invention is prepared by coating a coating composition for the low refractive index layer, then the low refractive index layer is solidified by drying while the coated surface is kept to be under side with respect to horizontal direction, wherein the coating composition for the low refractive index layer comprises silica based hollow minute particles having outer shell and pores or void inside thereof and organic solvent for dilution.

Examples of an organic solvent utilized for dilution include: alcohols (such as methanol, ethanol, propanol, isopropanol, butanol, isobutanol, secondary butanol, tertiary butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether and propylene glycol monophenyl ether), amines (such as ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentametyldiethylene triamine and tetramethyipropylene diamine), amides (such as formamide, N,N-dimethyl formamide and N,N-dimethyl acetoamide), heterocyclic rings (such as 2-pyrrolidone, N-methyl-2-pyrrolidone, cyclohexyl pyrrolidone, 2-oxazoline and 1,3-dimethyl-2-imidazolidinone), sulfoxides (such as dimethylsulfoxide), sulfones (such as sulfolane), urea, acetonitrile and acetone. Alcohols, polyhydric alcohols and polyhydric alcohol ethers are specifically preferred.

Dilution ratio is appropriately selected since it is afactor a factor to determine the localizing the silica minute particles in the low refractive index layer due to a function of controlling the viscosity of coating composition.

The low refractive index layer may be formed via a coating method, for example, a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528, and "Yuji Harasaki: Coating Engineering, p. 253, (1973), published by Asakura Publishing Co., Ltd."

Thickness of the low refractive index layer is 50-200 nm, and more preferably 60-150, nm, in each.

(High Refractive Index Layer and Medium Refractive Index Layer)

A high refractive index layer is preferably arranged between a transparent substrate or a transparent substrate provided with a hard coat layer and a low refractive index layer in this invention. A medium refractive index layer is preferably arranged between a transparent substrate and a high refractive index layer in view of reduction of the reflectance. A refractive index of a high refractive index layer is preferably 1.55-2.30, and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of the high refractive index layer and the medium refractive index layer is preferably 5, nm-1, μm, more preferably 10, nm-0.2, μm and most preferably 30, nm-0.1, μm. The haze of a high refractive index layer and a medium refractive index layer is preferably not more than 5%, more preferably not more than 3% and most preferably not more than 1%. The strength of a high refractive index layer and a medium refractive index layer is preferably not less than H based on pencil hardness at a loading weight of 1, kg, more preferably not less than 2H and most preferably not less than 3H.

It is preferable that the medium and high refractive index layers are formed in such a manner that a coating composition containing a monomer or oligomer of an organic titanium compound represented by following Formula (1), or hydrolyzed products thereof are coated and subsequently dried, and the resulting refractive index is 1.55-2.5.

$$Ti(OR_1)_4 \hspace{4em} \text{Formula (1)}$$

where $R_1$, is an aliphatic hydrocarbon group having 1-8 carbon atoms, and is preferably an aliphatic hydrocarbon group having 1-4, carbon atoms. The alkoxide group undergoes hydrolysis to form a crosslinking structure via reaction such as —Ti—O—Ti in monomers or oligomers of organic titanium compounds or hydrolyzed products thereof, whereby a cured layer is formed.

Listed as preferred examples of monomers and oligomers of organic titanium compounds are dimers—decamers of $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, and $Ti(O-n-C_3H_7)_4$, dimers through decamers of $Ti(O-i-C_3H_7)_4$, and dimers through decamers of $Ti(O-n-C_4H_9)_4$. These may be employed singly or in combination of at least two types. Of these, specifically preferred are dimers through decamers of $Ti(O-n-CH_7)_4$, $Ti(O-i-C_3H_7)_4$, $Ti(O-n-C_4H_9)_4$, and $Ti(O-n-C_3H_7)_4$, and dimmers through decamers of $Ti(O-n-C_4H_9)_4$.

Coating composition for the middle or high refractive index layer is preferably prepared by a method in which the organic titanium compound mentioned above is added into the liquid composed water and an organic solvent added to the water. Hydrolysis/polymerization does not progress uniformly which causes white turbidity or induces deterioration of film strength when water is added later. Water and organic solvent are preferably agitated and dissolved to mix sufficiently.

The other preferable method is that a titanium compound is mixed with organic solvent then the mixture is added to a liquid of water and organic solvent mixed and agitated.

Content of water is preferably 0.25, to 3, mole for 1 mole of the organic titan compound. Sufficient film length is not obtained due to the insufficient hydrolysis/polymerization when the content is less than 0.25, mol It is not preferred because large particles of $TiO_2$, is generated and causes white turbidity when the content exceeds 3, moles. Water content should be adjusted within the range described above.

Content of water is preferably less than 10, percent by weight with respect to the whole amount of the coating composition. It is not preferred to cause white turbidity because of insufficient storage stability of the coating composition when the water content is more than 10, percent by weight.

Organic solvent used for the forming middle or high refractive index layer is preferably a water miscible organic solvent described above. Amount of the organic solvent as used is determined so that the water content satisfies 10, percent by weight of the whole amount of the coating composition by controlling the total amount of the organic solvent and water.

The content of monomers and oligomers of organic titanium compounds, as well as hydrolyzed products thereof is preferably 50.0-98.0% by weight with respect to solids incorporated in the liquid coating composition. The solid ratio is more preferably 50-90% by weight, but is still more preferably 55-90% by weight. Other than these, it is preferable to incorporate polymers of organic titanium compounds, which are subjected to hydrolysis followed by crosslinking, in a liquid coating composition, or to incorporate titanium oxide particles.

The high refractive index and medium refractive index layers preferably contain metal oxide particles as particles and further may incorporate binder polymers.

A strong coating layer provided with hardness and flexibility in evenly coated layer can be obtained by combining hydrolyzed/polymerized organic titanium compounds and metal oxide particles, in the above method of preparing a coating composition.

The refractive index of metal oxide particles employed in the high and medium refractive index layers is preferably 1.80-2.80,, but is more preferably 1.90-2.80. The weight average diameter of the primary particle of metal oxide particles is preferably 1-150, nm, is more preferably 1-100, nm, but is most preferably 1-80, nm. The weight average diameter of metal oxide particles in the layer is preferably 1-200, nm, is more preferably 5-150, nm, is still more preferably 10-100, nm, but is most preferably 10-80, nm. Metal oxide particles at an average particle diameter of at least 20, -30, nm are determined employing a light scattering method, while the particles at a diameter smaller than 20-30, nm are determined employing electron microscope images. The specific surface area of metal oxide particles is preferably 10-400, $m^2/g$ as a value determined employing the BET method, is more preferably 20-200, $m^2/g$, but is most preferably 30-150, $m^2/g$.

Examples of metal oxide particles are metal oxides containing at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and may contain other metals. Main component, as described herein, refers to the component of which content, in percent by weight, is the maximum in the particle composing components. Listed as examples of other elements are Ti, Zr, Sn, Sb, Cu, Fe, Mn, Pb, Cd, As, Cr, Hg, Zn, Al, Mg, Si, P and S.

The metal oxide particles are preferably subjected to a surface treatment. The surface treatment can be performed by employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

Two or more coupling agents may be used in combination and other silane coupling agent than those mentioned above may be used. The other silane coupling agent includes an alkylester of orthosilicate acid such as methyl orthsilicate, ethyl orthosilicate, n-propyl orthosilicate, i-propyl orthosilicate, n-butyl orthosilicate, sec-butyl orthosilicate, and t-butyl orthosilicate, and their hydrolysis products.

Surface treatment by a coupling agent can be performed in such a manner that a coupling agent is added to a dispersion of minute particles and the dispersion is allowed to stand for several hours to 10, days at a temperature from a room temperature to 60° C. An inorganic acid, for example, sulfuric acid, hydrochloric acid, nitric acid, chromic acid, hypochlorous acid, boric acid, ortho silicic acid, phosphoric acid and carbonic acid or an organic acid, for example, acetic acid, polyacrylic acid, benzenesulfonic acid, phenol and polyglutamid acid, or their salt such as metal salt or ammonium salt, may be added to accelerate the surface treatment reaction.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating solution in advance. Water used in the hydrolysis may be employed for the hydrolysis/polymerization of the organic titanium compound.

Two or more surface treatments may be performed in combination. The shape of the metal oxide particles is preferably rice shape, sphere, cubic, fusiform, or amorphous. Two or more kinds of metal oxide particles may be used in the middle or high refractive index layer in combination.

A ratio of metal oxide particles in the high and medium refractive index layers is preferably 5-65% by volume, more preferably 10-60% by volume and still more preferably 20-55% by volume.

The above-described metal oxide particles are supplied to a coating liquid, which forms a high refractive index layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuranY and ether alcohol (such as 1-methoxy-2-propanol) Among them, toluene, x-ylene, methyl ethyl ketone, methyl isobutyl ketone, cyclohexanone and butanol are specifically preferable.

A homogenizer can be used to disperse metal oxide particles in a medium. Examples of the homogenizer include a sand grinder mill (for example, a beads mill equipped with a pin), a high speed impeller mill, a pebble mill, a roller mill, ATTRITOR mill and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

It is preferable to employ polymers having a crosslinked structure (hereinafter referred to as a crosslinking polymer) as a binder polymer in the high refractive index and medium refractive index layers. Listed as examples of the crosslinking polymers include: polymers having a saturated hydrocarbon chain such as polyolefin, polyether, polyurea, polyurethane, polyester, polyamine, polyamide and melamine resins of these, crosslinked products of polyolefin, polyether and polyurethane are preferred, crosslinked products of polyolefin and polyether are more preferred, and crosslinked products of polyolefin are most preferred.

It is more preferable that crosslinking polymers have an anionic group. The anionic group exhibits a function to maintain the dispersion state of minute inorganic particles and the crosslinking structure exhibits a function to strengthen layers by providing a polymer with layer forming capability. The above anionic group may directly bond to a polymer chain or may bond to a polymer chain via a linking group However, it is preferable that the anionic group bonds to the main chain via a linking group as a side chain.

Listed as examples of the anionic group are a carboxylic acid group (carboxyl), a sulfonic acid group (sulfo), and phosphoric acid group (phosphono). Of these, preferred are the sulfonic acid group and the phosphoric acid group. Herein, the anionic group may be in the form of its salts. Cations which form salts with the anionic group are preferably alkali metal ions. Further, protons of the anionic group may be dissociated. The linking group which bond the anionic group with a polymer chain is preferably a bivalent group selected from the group consisting of —CO—, —O—, an alkylene group, and an arylene group, and combinations thereof. Crosslinking polymers which are binder polymers are preferably copolymers having recurring units having an anionic group and recurring units having a crosslinking structure. In this case, the ratio of the recurring units having an anionic group in copolymers is preferably 2, to 96, percent by weight, is more preferably 4, to 94, percent by weight, but is most preferably 6, to 92, percent by weight. The recurring unit may have at least two anionic groups.

In crosslinking polymers having an anionic group, other recurring units (an anionic group is also a recurring unit having no crosslinking structure) may be incorporated. Preferred as other recurring units are recurring units having an amino group or a quaternary ammonium group and recurring units having a benzene ring. The amino group or quaternary ammonium group exhibits a function to maintain a dispersion state of minute inorganic particles. The benzene ring exhibits a function to increase the refractive index of the high refractive index layer. Similar effects are achieved even though the amino group, quaternary ammonium group and benzene ring are incorporated in the recurring units having an anionic group and the recurring units having a crosslinking structure.

In crosslinking polymers containing a recurring unit having an amino group or a quaternary ammonium group, the amino group or quaternary ammonium group may directly bond to a polymer chain or may bond to a polymer chain via a side chain. The latter is preferred. The amino group or quaternary ammonium group is preferably a secondary amino group, a tertiary amino group or a quaternary ammonium group, and is more preferably a tertiary amino group or a quaternary ammonium group. A group bonded to the nitrogen atom of a secondary amino group, a tertiary amino group or a quaternary ammonium group is preferably an alkyl group, is more preferably an alkyl group having 1, to 12, carbon atoms, and is still more preferably an alkyl group having 1 to 6, carbon atoms. The counter ion of the quaternary ammonium group is preferably a halide ion. The linking group which links an amino group or a quaternary ammonium group with a polymer chain is preferably a bivalent group selected from the group consisting of —CO—, —NH—, —O—, an alkylene group and an arylene group, or combinations thereof. In cases in which the crosslinking polymers contain recurring units having an amino group or a quaternary ammonium group, the ratio is preferably 0.06, to 32, percent by weight, is more preferably 0.08, to 30, percent by weight, but is most preferably 0.1, to 28, percent t by weight.

It is preferred that coating compositions for high and medium refractive index layer composed of monomers to form crosslinking polymers are prepared and crosslinking polymers are formed via polymerization reaction during or after coating of the above liquid coating compositions. Bach layer is formed along with the formation of crosslinking polymers. Monomers having an anionic group work as a dispersing agent of minute inorganic particles in the liquid coating compositions. The used amount of monomers having an anionic group is preferably 1, to 50, percent by weight with respect to the minute inorganic particles, is more preferably 5, to 40 percent by weight, but is still more preferably 10, to 30 percent by weight. Further, monomers having an amino group or a quaternary ammonium group function as a dispersing aid in the liquid coating compositions. The used amount of monomers having an amino group or a quaternary ammonium group is preferably 3, to 33, percent by weight with respect to the monomers having an anionic group. By employing a method in which crosslinking polymers are formed during or after coating of a liquid coating composition, it is possible to allow these monomers to effectively function prior to coating of the liquid coating compositions.

Examples of monomer having at least two ethylenic unsaturated groups include ester of polyhydric alcohol and (meth) acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri (meth)acrylate, trimethylolethane tri(meth)acrylate, dipentaerythritol tetra(meth)acrylate, dipentaerythritol penta (meth)acrylate, pentaerythritol hexa(meth)acrylate, 1,2,3-cyclohexane tetramethacrylate, polyurethane polyacrylate and polyester polyacrylate) vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer. having an anionic group which is available on the market and preferably utilized includes KAYAMAR PM-21, and PM-2 (manufactured by Nippon Kayaku Co., Ltd.); ANTOX MS-60, MS-2N and MS-NH4, (manufactured by Nippon Nyukazai Co., Ltd.); ARONIX M-5000,, M-6000, and M-8000, series (manufactured by Toagosei Co., Ltd.); VISCOAT #2000, series (manufactured by Osaka Organic Chemical Industry Ltd.); NEW-FRONTIER GX-8289 (manufactured by Dai-Ichi Kogyo Seiyaku Co., Ltd.); NK ESTER CB-1, and A-SA (manufactured by Shin-Nakamura Chemical Co., Ltd.); and AR-100,, MR-100, and MR-200, (manufactured by Daihachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and New-Frontier C1615, (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator utilized to form binder polymer of the hardcoat layer.

As a polymerization initiator, those available on the market may be utilized. A polymerization accelerator may be utilized in addition to a polymerization initiator. The addition amount of a polymerization initiator and a polymerization accelerator is preferably in the range of 0.2-10, percent by weight based on the total amount of monomer. Polymerization of monomer (or oligomer) may be accelerated by heating the coating composition, i.e., dispersion of inorganic minute particles containing a monomer. Formed polymer after coating of light polymerization reaction may be posterior processed for thermally curing.

A polymer having relatively high refractive index is preferably employed for the middle and high refractive index layer. Examples of the polymer having relatively high refractive index include polystyrene, styrene copolymer, polycarbonate, a melamine resin, a phenol resin, an epoxy resin, and polyurethane obtained by reacting aliphatic or aromatic cyclic isocyanate with polyol. The other polymer having high refractive index such as those an aliphatic, hetero or aromatic cyclic group, polymer having halogen atom other than fluorine atom as a substituent may be employed.

Added to each of the anti-reflection layers or the coating compositions thereof may be polymerization inhibitors, leveling agents, thickeners, anti-coloring agents, UV absorbents, silane coupling agents, antistatic agents, and adhesion providing agents, other than the foregoing components such as metal oxide particles, polymers, dispersion media, polymerization initiators and polymerization accelerators.

In order to accelerate hydrolysis or curing of a composition containing metal alkoxide, irradiation of actinic radiation is preferable, after coating a medium or high refractive index layer usable in the present invention, or a low refractive index layer. Exposure to actinic radiation each time after a layer is coated is more preferable.

The abovementioned actinic rays represent ultraviolet rays, electron beams or γ rays and an energy source which activates a compound is usable without limitation., however, preferably usable is ultraviolet rays or electron beams. Ultraviolet rays are specifically preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use a low pressure mercury lamp, an intermediate pressure mercury lamp, a high pressure mercury lamp, an extra-high pressure mercury lamp, a carbon arc light, a metal halide lamp and an xenon lamp. Further, ArF excimer laser, KrF excimer laser, an excimer lamp and synchrotron radiation can also be used. The condition of irradiation is different depending on the type of the lamps however, the preferred amount of irradiation is 20-10,000 mJ/cm$^2$, more preferably 100-2,000 mJ/cm$^2$, and still more preferably 400-2,000 mJ/cm$^2$.

The UV ray may expose multiple anti-reflection layers layer by layer or all layer at once. It is preferable to expose multiple layers in view of productivity.

In the case of curing with electron rays, utilized can be various types of irradiation devices which include such as Cockcroft-Walton's type, Van de Graaff's type or a resonance transformer type, an insulation core transformer type, linear type, Dynamitron type and a high frequency type; electron rays preferably have energy of 50-1,000 k eV and more preferably of 100-300 k eV.

(Thickness of Anti-Reflection Layer)

Thickness of each refractive index layer composing the anti-reflection layer is preferably 1-200 nm in each, and more preferably 5-150 nm. It is preferable to select appropriate thickness according to the refractive index of each layer.

(Reflectance of Anti-Reflection Layer)

The anti-reflection layer preferably has an average reflection of 1% or less, in the range of 450-650 nm, and more preferably 0.5% or less. Minimum reflectance in this range of 0.0-0.3% is particularly preferable.

The reflectance and the thickness of the anti-reflection layer can be obtained by calculation based on the measurement of spectroscopic reflectance. Optical reflectance property of the anti-reflection layer can be obtained by measuring reflectance in a condition of 5° specular reflectance by a spectroscope. The reflectance is measured after light reflection on the backside surface is prevented in such a way that a substrate having no anti-reflection coating is subjected to light absorption treatment by roughening the surface and coated with black paint by spraying.

(Polarizing Plate)

It is possible to prepare the polarizing plate usable in the present invention, employing a common method. It is preferable that the rear surface of the anti-glare anti-reflection film according to the present invention is saponified and then is adhered to at least one surface of a polarizer film which has been prepared via alkali saponification, immersion in an iodine solution and stretching, employing an aqueous solution of completely saponified polyvinyl alcohol as an adhesive. On the other surface of the polarizer film, either the aforesaid film or another appropriate polarizing plate protective film may be employed. Preferably employed are commercially available cellulose ester films (for example, KONICA MINOLTA TAC KC8UX, KC4UX, KC5UX, KC8UCR-3,, KC8UCR-4,, KC8UCR5, KC8UY, KC4UY, KC12UR, KV8UY-HA, and KV8UX-RHA, all produced by Konica Minolta Opto, Inc.).

The polarizing plate protective film used on another surface of the polarizer film opposite to the anti-glare anti-reflection film preferably has the in-plane retardation Ro of 0, to 70, nm and Rt of −30, to +30, nm at a wavelength of 590, nm, or a cellulose ester film disclosed in JP-A 2003-012859. Alternatively, the polarizing plate protective film preferably holds a function of an anisotropic layer or a cellulose ester film, and it is preferably a cellulose ester optical compensation film having in-plane retardation Ro of 20, to 100, nm, and Rt of 100, to 400, nm at 590, nm.

The optical compensation film preferably contains the esterified sugar compound having furanose or pyranose structure, or the acryl polymer described above.

These films can be prepared, for example, by the method disclosed in JP-A 2002-71957, and 2003-170492. Alternatively, it is also preferable to prepare a polarizing plate protective film which also has a function of an optical compensation film by incorporating an optical anisotropic layer obtained by orienting liquid crystal compounds such as discotic liquid crystals. An optically anisotropic layer can be prepared, for example, by the method disclosed in JP-A 2003-98348. By using such a film in combination with the anti-glare anti-reflection film according to the present invention, a polarizing plate exhibiting an excellent flatness and a stable viewing angle enlarging effect can be obtained.

A polarizer film, which is a main component of the polarizing plate, is an element which transmits polarized light in only prescribed direction. A currently known representative polarizer film is a polyvinyl alcohol polarizer film. Two types of polyvinyl alcohol polarizer films are known, namely, one is stained with iodine and the other is stained with a dichroic dye. A polarizer film is prepared in such a manner that an aqueous polyvinyl alcohol solution is cast to form a film and then the film is uniaxially stretched, followed by dying, or the film is stained with a dye first and then uniaxially stretched, followed by carrying out a durability enhancing treatment employing a boron compound.

The polarizing plate may be composed by adhering a protect film on one side and a separate film on the opposite side. The protect film and the separate film are employed also for the purpose of protecting the polarizing plate at a time of shipping or product test. The protect layer is adhered to a side opposite to the surface on which the polarizing plate is adhered to a liquid crystal cell for the purpose of protecting the surface of the polarizing plate. The separate film is adhered to a side on which the polarizing plate is adhered to the liquid crystal cell for the purpose of covering the sticky layer adhered to the liquid crystal cell.

(Liquid Crystal Display)

Various displays each exhibiting an excellent visibility can be fabricated by incorporating the polarizing plate according to the present invention. The anti-glare anti-reflection film of the present invention is preferably employed in various mode driving system LCDs such as STN mode, TN mode, OCB mode, HAN mode, VA mode (for example, an MVA type and a PVA type), or IPS mode. The optical film according to this invention can provide excellent liquid crystal display devices having reduced light leakage and high visibility with excellent front face contrast.

EXAMPLES

In the following, this invention will be specifically explained in reference to examples, however, is not limited thereto.

The types of cellulose ester, a compound having a furanose structure or a pyrariose structure (a saccharose ester compound), an additive (acrylic polymer) and an acrylic type compound in a hard coat layer will be shown in table 1.

TABLE 1

| Cellulose ester | Acyl group substitution degree: | Total acyl group substitution degree |
|---|---|---|
| A | Acetyl group: 2.80 | 2.80 |
| B | Acetyl group: 2.90 | 2.90 |
| C | Acetyl group: 2.95 | 2.95 |
| D | Acetyl group: 2.85 | 2.85 |
| E | Acetyl group: 2.70 | 2.70 |
| F | Acetyl group: 1.90 Propionyl group: 0.95 | 2.85 |
| Saccharose ester compound: | | |
| A | Compound 3 | |
| B | Compound 4 | |
| C | Compound 5 | |
| D | Compound 6 | |
| E | Compound 9 | |
| F | Compound 18 (n = 4) | |
| G | Compound 18 (n = 5) | |
| Additive: | | |
| A | Acrylic polymer A | |
| B | Acrylic polymer B | |
| Acrylic type compound in hard coat (HC) layer: | | |
| A | Acrylic type compound in hard coat (HC) layer: | |
| B | Polyol acrylate | |

A saccharose ester compound was analyzed by HPLC and LC-MASS to measure the residual hydroxyl group number and the ratio (weight %) in a compound.

Further, acrylic polymer A and B are compounds described below.

Acrylic polymer A: Block polymerization was performed according to a polymerization method described in JP-A 2000-128911. That is, methyl methacrylate as a monomer was charged in a flask equipped with a stirrer, a nitrogen gas introducing tube, a thermometer, a charging opening and a reflux condenser, and a nitrogen gas was introduced to substitute the interior of the flask to which the thioglycerol was added with stirring.

After addition of thioglycerol, polymerization was conducted for 4 hours, and the content was cooled to room temperature, to which 20 weight parts of a 5 weight % benzoquinone tetrahydrofuran solution was added to terminate polymerization. The content was transferred to an evaporator, and tetrahydrofuran, residual monomer and residual thioglycerol were removed under a reduced pressure at 80° C., whereby acrylic polymer A was prepared.

Acrylic polymer B: Monomer mixture solution of the types and ratios described in table 2 of 40 g, 3.0 g of mercaptopropionic acid as a chain transfer agent and 30 g of toluene were charged into a glass flask equipped with a stirrer, two dropping funnels, a gas introducing inlet and a thermometer, and temperature of the system was raised to 90° C. Thereafter, through one of dropping funnels, 60 g of monomer mixture of the types and ratios described in table 1 were dropwise added over 3 hours, and, simultaneously, 0.6 g of azobisbutyronitrile dissolved in 14 g of toluene was dropwise added through the other funnel over 3 hours. Then, after 0.6 g of azobisbutyronitrile dissolved in 56 g of toluene had been dropwise added over 2 hours, the reaction was continued further 2 hours to prepare acrylic polymer B.

TABLE 2

| -(Ya)k-(Yb)q- | | | | | |
|---|---|---|---|---|---|
| Compound name: | | | | | |
| Ya | k | Yb | q | | Mw |
| Acrylic polymer A | MA | 100 | — | 0 | 1000 |

| -(Xa)m-(Xb)n-(Xc)p- | | | | | | |
|---|---|---|---|---|---|---|
| Compound name: | | | | | | |
| Xa | m | Xb | n | Xc | p | Mw |
| Acrylic polymer B | MMA | 90 | HEMA | 10 | — | 0 | 4000 |

MA, MMA and HEMA, which are described in table 2, each is an abbreviation of the following compounds.

MA: methyl acrylate
MMA: methyl methacrylate
HEMA: 2-hydroxyethyl methacrylate

Weight average molecular weights of said (meth)acrylic polymer A and B are shown in table 2 according to the following measurement method.

(Molecular Weight Measurement)

Weight average molecular weight was measured by use of high speed liquid chromatography.

The measurement condition was as follows.
Solvent: methylene chloride
Column: Shodex K806, K805, K803G (3, columns manufactured by Showa Denko K. K. were utilized in donnection.)
Column temperature: 25° C.
Sample concentration: 0.1 weight %
Detector: RI Model 504 (manufactured by GL Sciences Inc.)
Pump: L6000 (manufactured by Hitachi, Ltd.)
Flow rate: 1.0 ml/min
Calibration curve: A calibration curve by 13 samples of standard polystyrene STK (manufactured by Toso Co Ltd.) having Mw=1,000,000-500 was utilized 13 samples were utilized in an approximately equal interval.

Example 1

(Preparation of Hard Coat Film)
(Preparation of Hard Coat Film 1)
<Micro-particle Dispersion 1>

| Micro-particles (Aerosil R972V, manufactured by Nippon Aerosil co. Ltd.) | 11 weight parts |
|---|---|
| Ethanol | 89 weight parts |

The above composition, after having been mixed by a dissolver for 50 minutes, was homogenized by use of a Manton-Gaulin homogenizer.

<In-Line Additive Solution>

Cellulose ester B was added into a dissolution tank filled with methylene chloride, and the system, after having been completely dissolved with heating, was filtered through Azumi filter paper No. 244 manufactured by Azumi Filter Paper Co., Ltd.

The cellulose ester solution after having been filtered was gradually added with micro-particle dispersion with sufficient stirring. Further, homogenizing was performed to make the secondary particle size of a predetermined size. The resulting system was filtered through FINEMET NF manufactured by Nippon Seisen Co., Ltd., whereby in-line additive solution 1 was prepared.

| Methylene chloride | 99 weight parts |
|---|---|
| Cellulose ester B | 4 weight parts |
| Micro-particle dispersion 1 | 11 weight parts |

A main dope solution having the following composition was prepared. First, methylete chloride and ethanol were added into a pressure dissolution tank. Cellulose ester A was charged with stirring into the pressure dissolution tank filled with solvents. The system was completely dissolved with stirring and was filtered by use of Azumi Filter Paper No. 244. manufactured by Azumi Filter Paper Co., Ltd., whereby a primary dope solution was prepared.

<Composition of Primary Dope>

| Methylene chloride | 380 weight parts |
|---|---|
| Ethanol | 70 weight parts |
| Cellulose ester A | 100 weight parts |
| Acrylic polymer A | 5.5 weight parts |
| Saccharose ester compound of this invention | 5.5 weight parts |

The above composition was charged into a closed vessel and was completely dissolved while heating and stirring, being filtered by use of Azumi Filter Paper No. 24 manufactured by Azumi Filter Paper Co., Ltd., whereby dope was prepared.

To 100 parts by weight of the filtered dope as prepared in the above manner 3.1 parts by weight of the filtered In-line Additive Solution was added, and they were mixed well by an in-line mixer (Hi-Mixer SWJ, manufactured by Tore Co., Ltd.) Then the resulting was cast on a support comprising an endless belt made of stainless steel at 30° C. through a casting die warmed at 30° C. to form a web, followed by being dried on the support, and the web was peeled off from the support by a peeling off roll after having been dried on a support to make a residual solvent amount of a web of 80 weight %.

Next, the web was dried in a transfer drying process by means plural number rolls arranged up and down, by a drying wind of 70° C., and successively, after the both edges of the web were held with a tenter was stretched in the width direction at 130° C. to make the width of 1.1 times of that before stretching. After stretching with a tenter, the web was dried by a drying wind of 105° C. in a transfer drying process by means of plural number of rolls arranged up and down to make a residual solvent of 0.3 weight %, where by film was prepared. Further, the prepared film, after having been subjected to a heat treatment in an atmosphere of processing temperature of 105° C. and an atmosphere substitution rate of 12 (times/hour), was cooled to room temperature to be wound, whereby long roll cellulose ester film 1 having a layer thickness of 80 μm, a length of 1,000 m and a refractive index of 1.49 was prepared. A stretching magnification in the web transport direction immediately after peeled-off, which is calculated from a rotation rate of a stainless band support and a driving rate of a tenter, was 1.1 times.

Utilizing cellulose ester film 1 prepared above, hard coat film and antireflection film were prepared according to the following procedures.

<Coating of Hard Coat Layer and Back Coat Layer>

The following hard coat layer coating composition was filtered through a filter made of polypropylene having a pore size of 0.4 µm to prepare a hard coat layer coating solution, which was coated by use of a micro-gravure coater on cellulose ester film 1 prepared above, followed by being cured by use of an ultraviolet lamp at illuminance of an irradiated portion of 100 mW/cm2 and irradiation quantity of 0.1 J/cm$^2$ after having been dried at 90° C., whereby a hard coat layer having a day layer thickness of 7 µm was formed to prepare hard coat film 1.

(Hard Coat Layer Composition)

The following materials were mixed with stirring to prepare a hard coat layer composition.

| | |
|---|---|
| Urethane acrylate type resin: B420 (manufactured by Shin-Nakamura Chemical Co., Ltd.) | 220 weight parts |
| IRGACURE 184 (manufactured by Ciba Specialty Chemicals Inc.) | 20 weight parts |
| Propylene glycol monomethylether | 110 weight parts |
| Ethyl acetate | 110 weight parts |

Further, the following back coat layer composition was coated by an extrusion coater so as to make a wet thickness of 10 µm, followed by being dried at 85° C. to be wound, whereby a back coat layer was arranged.

<Back Coat Layer Composition>

| | |
|---|---|
| Acetone | 54 weight parts |
| Methyl ethyl ketone | 24 weight parts |
| Methanol | 22 weight parts |
| Diacetyl cellulose | 0.6 weight parts |
| 2% acetone dispersion of micro-particle silica (AEROSIL 200V, manufactured by Nippon Aerosil Co., Ltd.) | 0.2 weight parts |

In a similar manner, hard coat film 2-100 were prepared by varying cellulose ester film and acrylic compound in a hard coat layer as described in following tables 3-6.

<Evaluation of Hard Coat Film>

The following evaluation was made utilizing hard coat film 1-100 prepared above and the results were shown in tables 3-6.

(Haze)

Haze of a sample, when 3 sheets of the sample were accumulated, was measured by use of a haze meter (T-2600DA, manufactured by Tokyo Denshoku Co., Ltd.). It is not problematic when it is not more than 2.0% and preferably not more than 1.0%.

(Flatness; Visual Evaluation)

Each sample was cut out into a size of 90 cm wide and 100 cm long, 5 tubes of 50 W fluorescent lamps being fixed in a line at a height of 1.5 m so as to irradiate a sample table in an angle of 45°, each film sample being placed on the sample table, and roughness which can be seen by reflection was visually observed to make evaluation based on the following criteria. By this method, "uneven tension" and "wrinkle" can be judged.

A: All 5 tubes of fluorescent lamps are observed to be straight.

B: Some part of fluorescent lamps is observed to be slightly bending.

C: The whole of fluorescent lamps is observed to be 0slightly bending.

D: Fluorescent lamps are observed to be greatly undulating.

TABLE 3

| | | Saccharose ester compound: | | | | | | *3 | | | | |
|---|---|---|---|---|---|---|---|---|---|---|---|---|
| | | | Skeleton/ | | *5 | | | Addition | | Addition | | | |
| *1 | *2 | Compound | carboxylic acid | 0 | 1 | 2 | 3 or More | amount (weight %) | Type | amount (weight %) | *4 | Haze (%) | Flatness | Remarks |
| 1 | A | A | *6 | 0 | 80 | 15 | 5 | 5.5 | A | 5.5 | A | 0.2 | A | Invention |
| 2 | A | A | *6 | 0 | 70 | 25 | 5 | 5.5 | A | 5.5 | A | 0.7 | A | Invention |
| 3 | A | A | *6 | 0 | 60 | 30 | 10 | 5.5 | A | 5.5 | A | 0.9 | A | Invention |
| 4 | A | A | *6 | 50 | 40 | 10 | 0 | 5.5 | A | 5.5 | A | 1.3 | B | Invention |
| 5 | A | A | *6 | 75 | 20 | 5 | 0 | 5.5 | A | 5.5 | A | 1.7 | B | Invention |
| 6 | A | A | *6 | 100 | 0 | 0 | 0 | 5.5 | A | 5.5 | A | 2.1 | B | Comparison |
| 7 | A | — | — | — | — | — | — | — | A | 5.5 | A | 2.6 | C | Comparison |
| 8 | A | A | *6 | 0 | 80 | 15 | 5 | 2.0 | A | 5.5 | A | 1.0 | A | Invention |
| 9 | A | A | *6 | 0 | 80 | 15 | 5 | 4.0 | A | 5.5 | A | 1.2 | B | Invention |
| 10 | A | A | *6 | 0 | 80 | 15 | 5 | 7.0 | A | 5.5 | A | 1.4 | A | Invention |
| 11 | A | A | *6 | 0 | 80 | 15 | 5 | 10.0 | A | 5.5 | A | 1.9 | B | Invention |
| 12 | A | A | *6 | 0 | 80 | 15 | 5 | 5.5 | — | — | A | 1.7 | B | Invention |
| 13 | A | A | *6 | 0 | 80 | 15 | 5 | 5.5 | A | 2.0 | A | 1.1 | B | Invention |
| 14 | A | A | *6 | 0 | 80 | 15 | 5 | 5.5 | A | 4.0 | A | 0.7 | A | Invention |
| 15 | A | A | *6 | 0 | 80 | 15 | 5 | 5.5 | A | 7.0 | A | 0.7 | A | Invention |
| 16 | A | A | *6 | 0 | 80 | 15 | 5 | 5.5 | A | 10.0 | A | 1.5 | B | Invention |
| 17 | A | A | *6 | 0 | 80 | 15 | 5 | 5.5 | A | 5.5 | A | 0.4 | A | Invention |
| | | A | *6 | 0 | 60 | 30 | 10 | 5.5 | A | 5.5 | | | | |

TABLE 3-continued

| *1 | *2 | Compound | Skeleton/ carboxylic acid | *5 0 | *5 1 | *5 2 | *5 3 or More | Addition amount (weight %) | *3 Type | *3 Addition amount (weight %) | *4 | Haze (%) | Flatness | Remarks |
|---|---|---|---|---|---|---|---|---|---|---|---|---|---|---|
| 18 | A | A | *6 | 0 | 80 | 15 | 5 | 5.5 | A | 5.5 | A | 1.2 | B | Invention |
|  |  | B | *7 | 0 | 80 | 15 | 5 | 5.5 |  |  |  |  |  |  |
| 19 | A | B | *7 | 0 | 80 | 15 | 5 | 5.5 | A | 5.5 | A | 0.5 | B | Invention |
| 20 | A | B | *7 | 0 | 70 | 25 | 5 | 5.5 | A | 5.5 | A | 0.7 | B | Invention |
| 21 | A | B | *7 | 0 | 60 | 30 | 10 | 5.5 | A | 5.5 | A | 0.6 | B | Invention |
| 22 | A | B | *7 | 50 | 40 | 10 | 0 | 5.5 | A | 5.5 | A | 1.4 | B | Invention |
| 23 | A | B | *7 | 75 | 20 | 5 | 0 | 5.5 | A | 5.5 | A | 1.8 | B | Invention |
| 24 | A | B | *7 | 100 | 0 | 0 | 0 | 5.5 | A | 5.5 | A | 2.2 | C | Comparison |
| 25 | A | C | *8 | 0 | 80 | 15 | 5 | 5.5 | A | 5.5 | A | 0.8 | B | Invention |

*1: Hard coat film No.
*2: Cellulose ester
*3: Acrylic polymer
*4: Types of an acrylic type polymer compound in a hard coat layer
*5: Number of residual OH groups and the ratio (%)
*6: 6 + 5 member ring/benzoic acid
*7: 6 + 5 member ring/propionic acid
*8: 6 + 6 member ring/acetic acid

TABLE 4

| *1 | *2 | Compound | Skeleton/ carboxylic acid | *5 0 | *5 1 | *5 2 | *5 3 or More | Addition amount (weight %) | *3 Type | *3 Addition amount (weight %) | *4 | Haze (%) | Flatness | Remarks |
|---|---|---|---|---|---|---|---|---|---|---|---|---|---|---|
| 26 | A | C | *8 | 0 | 70 | 25 | 5 | 5.5 | A | 5.5 | A | 1.2 | B | Invention |
| 27 | A | C | *8 | 0 | 60 | 30 | 10 | 5.5 | A | 5.5 | A | 1.5 | B | Invention |
| 28 | A | C | *8 | 50 | 40 | 10 | 0 | 5.5 | A | 5.5 | A | 1.4 | B | Invention |
| 29 | A | C | *8 | 75 | 20 | 5 | 0 | 5.5 | A | 5.5 | A | 1.8 | B | Invention |
| 30 | A | C | *8 | 100 | 0 | 0 | 0 | 5.5 | A | 5.5 | A | 2.4 | C | Comparison |
| 31 | A | D | *9 | 0 | 80 | 15 | 5 | 5.5 | A | 5.5 | A | 0.9 | B | Invention |
| 32 | A | D | *9 | 0 | 70 | 25 | 5 | 5.5 | A | 5.5 | A | 1.0 | B | Invention |
| 33 | A | D | *9 | 0 | 60 | 30 | 10 | 5.5 | A | 5.5 | A | *1.3 | B | Invention |
| 34 | A | D | *9 | 50 | 40 | 10 | 0 | 5.5 | A | 5.5 | A | 1.0 | B | Invention |
| 35 | A | D | *9 | 75 | 20 | 5 | 0 | 5.5 | A | 5.5 | A | 1.8 | B | Invention |
| 36 | A | D | *9 | 100 | 0 | 0 | 0 | 5.5 | A | 5.5 | A | 2.3 | C | Comparison |
| 37 | A | E | *10 | 0 | 80 | 15 | 5 | 5.5 | A | 5.5 | A | 0.4 | B | Invention |
| 38 | A | E | *10 | 0 | 70 | 25 | 5 | 5.5 | A | 5.5 | A | 1.0 | B | Invention |
| 39 | A | E | *10 | 0 | 60 | 30 | 10 | 5.5 | A | 5.5 | A | 1.3 | B | Invention |
| 40 | A | E | *10 | 50 | 40 | 10 | 0 | 5.5 | A | 5.5 | A | 1.6 | B | Invention |
| 41 | A | E | *10 | 75 | 20 | 5 | 0 | 5.5 | A | 5.5 | A | 1.9 | B | Invention |
| 42 | A | E | *10 | 100 | 0 | 0 | 0 | 5.5 | A | 5.5 | A | 2.6 | C | Comparison |
| 43 | A | F | *8 | 0 | 80 | 15 | 5 | 5.5 | A | 5.5 | A | 0.7 | B | Invention |
| 44 | A | F | *8 | 0 | 70 | 25 | 5 | 5.5 | A | 5.5 | A | 1.2 | B | Invention |
| 45 | A | F | *8 | 0 | 60 | 30 | 10 | 5.5 | A | 5.5 | A | 1.6 | B | Invention |
| 46 | A | F | *8 | 50 | 40 | 10 | 0 | 5.5 | A | 5.5 | A | 1.2 | B | Invention |
| 47 | A | F | *8 | 75 | 20 | 5 | 0 | 5.5 | A | 5.5 | A | 1.6 | B | Invention |
| 48 | A | F | *8 | 100 | 0 | 0 | 0 | 5.5 | A | 5.5 | A | 2.6 | C | Comparison |

TABLE 4-continued

| | | | Saccharose ester compound: | | | | | *3 | | | | | |
|---|---|---|---|---|---|---|---|---|---|---|---|---|---|
| | | | Skeleton/ | | *5 | | Addition | | Addition | | | | |
| *1 | *2 | Compound | carboxylic acid | 0 | 1 | 2 | 3 or More | amount (weight %) | Type | amount (weight %) | *4 | Haze (%) | Flatness | Remarks |
| 49 | A | G | *8 | 0 | 80 | 15 | 5 | 5.5 | A | 5.5 | A | 1.4 | C | Invention |
| 50 | A | G | *8 | 0 | 70 | 25 | 5 | 5.5 | A | 5.5 | A | 1.6 | B | Invention |

*1: Hard coat film No.
*2: Cellulose ester
*3: Acrylic polymer
*4: Types of an acrylic type polymer compound in a hard coat layer
*5: Number of residual OH groups and the ratio (%)
*8: 6 + 6 member ring/acetic acid
*9: 6 member ring/acetic acid
*10: 6 + 6 + 6 member ring/acetic acid

TABLE 5

| | | | Saccharose ester compound: | | | | | *3 | | | | | |
|---|---|---|---|---|---|---|---|---|---|---|---|---|---|
| | | | Skeleton/ | | *5 | | Addition | | Addition | | | | |
| *1 | *2 | Compound | carboxylic acid | 0 | 1 | 2 | 3 or More | amount (weight %) | Type | amount (weight %) | *4 | Haze (%) | Flatness | Remarks |
| 51 | A | G | *8 | 0 | 60 | 30 | 10 | 5.5 | A | 5.5 | A | 1.9 | B | Invention |
| 52 | A | G | *8 | 50 | 40 | 10 | 0 | 5.5 | A | 5.5 | A | 2.1 | C | Invention |
| 53 | A | G | *8 | 75 | 20 | 5 | 0 | 5.5 | A | 5.5 | A | 1.7 | B | Invention |
| 54 | A | G | *8 | 100 | 0 | 0 | 0 | 5.5 | A | 5.5 | A | 2.4 | D | Comparison |
| 55 | B | A | *6 | 0 | 80 | 15 | 5 | 5.5 | A | 5.5 | A | 0.3 | A | Invention |
| 56 | B | A | *6 | 0 | 70 | 25 | 5 | 5.5 | A | 5.5 | A | 0.6 | A | Invention |
| 57 | B | A | *6 | 0 | 60 | 30 | 10 | 5.5 | A | 5.5 | A | 0.5 | A | Invention |
| 58 | B | A | *6 | 50 | 40 | 10 | 0 | 5.5 | A | 5.5 | A | 1.3 | B | Invention |
| 59 | B | A | *6 | 75 | 20 | 5 | 0 | 5.5 | A | 5.5 | A | 1.8 | B | Invention |
| 60 | B | A | *6 | 100 | 0 | 0 | 0 | 5.5 | A | 5.5 | A | 2.2 | C | Comparison |
| 61 | C | A | *6 | 0 | 80 | 15 | 5 | 5.5 | A | 5.5 | A | 0.5 | A | Invention |
| 62 | C | A | *6 | 0 | 70 | 25 | 5 | 5.5 | A | 5.5 | A | 0.4 | B | Invention |
| 63 | C | A | *6 | 0 | 60 | 30 | 10 | 5.5 | A | 5.5 | A | 0.7 | B | Invention |
| 64 | C | A | *6 | 50 | 40 | 10 | 0 | 5.5 | A | 5.5 | A | 1.3 | B | Invention |
| 65 | C | A | *6 | 75 | 20 | 5 | 0 | 5.5 | A | 5.5 | A | 1.5 | B | Invention |
| 66 | C | A | *6 | 100 | 0 | 0 | 0 | 5.5 | A | 5.5 | A | 2.5 | C | Comparison |
| 67 | D | A | *6 | 0 | 80 | 15 | 5 | 5.5 | A | 5.5 | A | 0.6 | A | Invention |
| 68 | D | A | *6 | 0 | 70 | 25 | 5 | 5.5 | A | 5.5 | A | 0.8 | B | Invention |
| 69 | D | A | *6 | 0 | 60 | 30 | 10 | 5.5 | A | 5.5 | A | 0.8 | B | Invention |
| 70 | D | A | *6 | 50 | 40 | 10 | 0 | 5.5 | A | 5.5 | A | 1.3 | B | Invention |
| 71 | D | A | *6 | 75 | 20 | 5 | 0 | 5.5 | A | 5.5 | A | 1.9 | B | Invention |
| 72 | D | A | *6 | 100 | 0 | 0 | 0 | 5.5 | A | 5.5 | A | 2.5 | C | Comparison |
| 73 | E | A | *6 | 0 | 80 | 15 | 5 | 5.5 | A | 5.5 | A | 1.2 | B | Invention |
| 74 | E | A | *6 | 0 | 70 | 25 | 5 | 5.5 | A | 5.5 | A | 1.6 | B | Invention |
| 75 | E | A | *6 | 0 | 60 | 30 | 10 | 5.5 | A | 5.5 | A | 1.8 | B | Invention |

*1: Hard coat film No.
*2: Cellulose ester
*3: Acrylic polymer
*4: Types of an acrylic type polymer compound in a hard coat layer
*5: Number of residual OH groups and the ratio (%)
*6: 6 + 5 member ring/benzoic acid
*7: 6 + 5 member ring/propionic acid
*8: 6 + 6 member ring/acetic acid

TABLE 6

| | | | Saccharose ester compound: | | | | | *3 | | | | | |
|---|---|---|---|---|---|---|---|---|---|---|---|---|---|
| | | | Skeleton/ | | *5 | | Addition | | Addition | | | | |
| *1 | *2 | Compound | carboxylic acid | 0 | 1 | 2 | 3 or More | amount (weight %) | Type | amount (weight %) | *4 | Haze (%) | Flatness | Remarks |
| 76 | E | A | *6 | 50 | 40 | 10 | 0 | 5.5 | A | 5.5 | A | 1.6 | B | Invention |
| 77 | E | A | *6 | 75 | 20 | 5 | 0 | 5.5 | A | 5.5 | A | 2.0 | B | Invention |
| 78 | E | A | *6 | 100 | 0 | 0 | 0 | 5.5 | A | 5.5 | A | 2.4 | C | Comparison |

TABLE 6-continued

| | | | Saccharose ester compound: | | | | | *3 | | | | | |
|---|---|---|---|---|---|---|---|---|---|---|---|---|---|
| | | | Skeleton/ | | *5 | | Addition | | Addition | | | | |
| *1 | *2 | Compound | carboxylic acid | 0 | 1 | 2 | 3 or More | amount (weight %) | Type | amount (weight %) | *4 | Haze (%) | Flatness | Remarks |
| 79 | F | A | *6 | 0 | 80 | 15 | 5 | 5.5 | A | 5.5 | A | 0.6 | B | Invention |
| 80 | F | A | *6 | 0 | 70 | 25 | 5 | 5.5 | A | 5.5 | A | 1.2 | B | Invention |
| 81 | F | A | *6 | 0 | 60 | 30 | 10 | 5.5 | A | 5.5 | A | 1.3 | B | Invention |
| 82 | F | A | *6 | 50 | 40 | 10 | 0 | 5.5 | A | 5.5 | A | 1.2 | B | Invention |
| 83 | F | A | *6 | 75 | 20 | 5 | 0 | 5.5 | A | 5.5 | A | 1.7 | B | Invention |
| 84 | F | A | *6 | 100 | 0 | 0 | 0 | 5.5 | A | 5.5 | A | 2.1 | C | Comparison |
| 85 | A | A | *6 | 0 | 80 | 15 | 5 | 5.5 | B | 5.5 | A | 0.4 | A | Invention |
| 86 | A | A | *6 | 0 | 70 | 25 | 5 | 5.5 | B | 5.5 | A | 0.4 | A | Invention |
| 87 | A | A | *6 | 0 | 60 | 30 | 10 | 5.5 | B | 5.5 | A | 0.6 | B | Invention |
| 88 | A | A | *6 | 50 | 40 | 10 | 0 | 5.5 | B | 5.5 | A | 1.3 | B | Invention |
| 89 | A | A | *6 | 75 | 20 | 5 | 0 | 5.5 | B | 5.5 | A | 1.7 | B | Invention |
| 90 | A | A | *6 | 100 | 0 | 0 | 0 | 5.5 | B | 5.5 | A | 2.0 | C | Comparison |
| 91 | A | A | *6 | 0 | 80 | 15 | 5 | 5.5 | A | 5.5 | B | 1.0 | B | Invention |
| 92 | A | A | *6 | 0 | 70 | 25 | 5 | 5.5 | A | 5.5 | B | 1.3 | B | Invention |
| 93 | A | A | *6 | 0 | 60 | 30 | 10 | 5.5 | A | 5.5 | B | 1.4 | B | Invention |
| 94 | A | A | *6 | 50 | 40 | 10 | 0 | 5.5 | A | 5.5 | B | 1.6 | B | Invention |
| 95 | A | A | *6 | 75 | 20 | 5 | 0 | 5.5 | A | 5.5 | B | 1.6 | B | Invention |
| 96 | A | A | *6 | 100 | 0 | 0 | 0 | 5.5 | A | 5.5 | B | 2.1 | C | Comparison |
| 97 | A | — | — | — | — | — | — | — | — | — | A | 2.8 | C | Comparison |
| 98 | A | — | — | — | — | — | — | — | B | 5.5 | A | 2.6 | C | Comparison |
| 99 | A | A | *6 | 0 | 70 | 25 | 5 | 5.5 | — | — | A | 1.6 | B | Invention |
| 100 | A | A | *6 | 100 | 0 | 0 | 0 | 5.5 | — | — | A | 3.4 | D | Comparison |

*1: Hard coat film No.
*2: Cellulose ester
*3: Acrylic polymer
*4: Types of an acrylic type polymer compound in a hard coat layer
*5: Number of residual OH groups and the ratio (%)
*6: 6 + 5 member ring/benzoic acid
*7: 6 + 5 member ring/propionic acid
*8: 6 + 6 member ring/acetic acid It is clear from the evaluation results of tables 3-6 that hard coat film of this invention is superior in haze and flatness compared to comparative examples.

Example 2

<Preparation of Antireflection Film>

Antireflection layer, comprising a high refractive index layer, successively, a low refractive index layer in this order, was coated on hard coat film 1 prepared above, whereby antireflection film 1 was prepared.

(Preparation of Antireflection Layer: High Refractive Index Layer)

On hard coat film 1 the following high refractive index layer coating composition was coated by use of an extrusion coater, followed by being dried at 80° C. for 1 minute, and was cured with ultraviolet ray irradiation at 0.1 J/cm$^2$, further being cured at 100° C. for 1 minute, whereby a high refractive index layer having a thickness of 78 nm was formed.

The refractive index of this high refractive index layer was 1.62.

<High Refractive Index Layer Coating Composition 1>

| | |
|---|---|
| Isopropyl alcohol solution of metal oxide microparticles (solid content of 20%, ITO particles, primary mean particle size of 50 nm) | 55 weigh parts |
| Metal compound: Ti(OBu)$_4$ (tetra-n-butoxy titanium) | 1.3 weight parts |
| Ionization radiation curable type resin: dipentaerythritol hexaacrylate | 3.2 weight parts |
| Photo-polymerization initiator: IRGACURE 184 (manufactured by Ciba Specialty Chemicals Inc.) | 0.8 weight parts |
| 10% propylene glycol monomethyl ether solution of straight chain dimethyl silicon-EO block copolymer (FZ-2207, manufactured by Nippon Unicar Co., Ltd.) | 1.5 weigh part |
| Propylene glycol monomethyl ether | 120 weight parts |
| Isopropyl alcohol | 240 weight parts |
| Methyl ethyl ketone | 40 weight parts |

(Preparation of Antireflection Layer: Low Refractive Index Layer)

On the aforesaid high refractive index layer, the following low refractive index layer coating composition was coated by use of an extrusion coater, followed by being dried at 100° C. for 1 minute, and was cured with ultraviolet ray irradiation at 0.1 J/cm$^2$, further being cured at 120° C. for 5 minutes, whereby a low refractive index layer having a thickness of 95 nm was formed. Herein, the refractive index of this low refractive index layer was 1.37.

<Preparation of Low Refractive Index Layer Coating Composition>

<Preparation of Tetraethoxy Silane Hydrolysate A>

Tetraethoxy silane of 289 g and 553 g of ethanol were mixed, and the mixture was added with 157 g of a 0.15% acetic acid aqueous solution to be stirred in a water bath of 25° C. for 30 hours, whereby hydrolysate A was prepared.

| | |
|---|---|
| Tetraethoxy silane hydrolysate A | 110 weight parts |
| Hollow silica type micro-particles (P-1) dispersion | 30 weight parts |
| KBM503 (silane coupling agent, manufactured by Shin-Etsu Chemical Co., Ltd.) | 4 weight parts |
| 10% propylene glycol monomethyl ether solution of straight chain dimethylsilicone-EO block copolymer | 3 weight parts |

| | |
|---|---|
| (FZ-2207, manufactured by Nippon Unicar Co., Ltd.) | |
| Propylene glycol monomethyl ether | 400 weight parts |
| Isopropyl alcohol | 400 weight parts |

<Preparation of Dispersion of Hollow Silica Micro-Particles P-1>

A mixture of silica sol of 100 g having a concentration of $SiO_2$, a mean particle size of which is 5 nm, of 20 weight %, and 1,900 g of pure water was heated at 80° C. This reaction mother solution, pH of which was 10.5 was simultaneously added with 9,000 g of a 0.98 weight % sodium silicate aqueous solution as $SiO_2$, and 9,000 g of a 1.08 weight % sodium aluminate aqueous solution as $Al_2O_3$. Meanwhile, temperature of the reaction solution was kept at 80° C. The pH of the reaction solution rose to 12.5 immediately after addition, and hardly changed thereafter. After completion of addition, the reaction solution was cooled to room temperature and washed by use of an ultrafilter, whereby a $SiO_2 \cdot Al_2O_3$, nucleus particle dispersion having a solid concentration of 20 weight % was prepared. (Process (a))

This micro-particle dispersion of 500 g was added with 1,700 g of pure water and heated at 98° C., followed by being added with 3,000 g of silicic acid solution ($SiO_2$ concentration of 3.5 weight %) prepared by dealkalization of sodium silicate aqueous solution with cationic exchange resin while keeping this temperature, whereby a dispersion of nucleus particles provided with the first silica cover layer was prepared (Process (b))

Next, 500 g of nucleus particle dispersion provided with the first silica cover layer, the solid content of which had been made to 13 weight % by washing with an ultrafilter, were added with 1,125 g of pure water, followed by making the pH of the system to 1.0 by drop-wise addition of concentrated hydrochloric acid (35.5%) to perform a dealumination treatment. Then, dissolved aluminum salt was separated by use of an ultrafilter while adding 10 L of hydrochloric aqueous solution of pH 3 and 5 L of pure water, whereby a $SiO_2 \cdot Al_2O_3$, porous particle dispersion, in which a part of constituent compositions of nucleus particles provided with the first silica cover layer was removed, was prepared. (Process (c))

A mixed solution of 1,500 g of the above-described porous particle dispersion, 500 g of pure water, 1,750 g of ethanol and 626 g of 28% ammonia water, after having been heated at 35° C., was added with 104 g of ethylsilicate (28 weight % of $SiO_2$) to form the second silica cover layer by covering the surface of the porous particles, provided with the first silica cover layer, with hydrolyzed polycondensate of ethylsilicate. Successively, hollow silica type micro-particle dispersion (P-1) having a solid concentration of 20 weight %, the solvent of which was substituted by ethanol by use of an ultrafilter, was prepared.

With respect to the hollow silica type micro-particles, the thickness of the first silica covet layer was 3 nm, a mean particle size was 47 nm, $MO_x/SiO_2$, (mol ratio) was 0.0017 and a refractive index was 1.28. Herein, a mean particle size was measured by a dynamic light scattering method.

Further, on hard coat film 2-100, a high refractive index layer and a low refractive index layer, which are described above, were arranged in a similar manner to antireflection film 1, whereby antireflection film 2-100 were prepared.

<Heat Treatment of Antireflection Film>

Antireflection film 1-100 prepared each were wound on a plastic core at a roll length of 1,000 m. This antireflection film roll was subjected to a heat treatment at 80° C. for 4 days in a heat treatment room.

(Reflectance)

Spectral reflectance was measured by use of a spectrometer (U-4000, manufactured by Hitachi, Ltd.) at a wavelength range of 380-780 nm and an incident angle of 5°. The minimum reflectance in 450-650 nm was determined from the measurement result since antireflection capability is superior when the smaller is the reflectance in a wide wavelength region. As for the measurement of reflectance, the back surface against the observation side was, after having been subjected to a roughening treatment, subjected to a light absorption treatment by use of a black color spray to prevent light reflection on the film back surface, whereby measurement of the reflectance was performed.

As a result, every reflectance of antireflection film 1-100 was 0.4%.

Next, polarizing plates were prepared in the following manner employing antireflection film 1-100 prepared in example 2, and these polarizing plates were incorporated into a liquid crystal display panel (an image display apparatus), whereby visual recognition property was evaluated.

According to the following method, polarizing plates 1-100 were prepared utilizing each one sheet of the above-described antireflection film 1-100 and cellulose ester type optical compensation film as polarizing plate protective film.

(a) Preparation of Polarizer Film

Polyvinyl alcohol (hereinafter, abbreviated as PVA), having a saponification degree of 99.95 mol % and a polymerization degree of 2,400, which had been impregnated with 10 weight parts of glycerin and 170 weight parts of water, was melt kneaded, and was melt extruded on a metal roll through a T die after having been defoamed, whereby a web was cast. Thereafter, the web was dried and heat treated to prepare PVA film. PVA film prepared had a mean thickness of 40 μm, a moisture content of 4.4% and a film width of 3 m.

The above-described PVA film was continuously processed with a preliminary swelling, dying, uniaxial stretching by a wet method, a fixing treatment, drying and a heat treatment in this orders whereby polarizer film was prepared. PVA film was subjected to a preliminary swelling by being immersed in water at 30° C. for 30 seconds, and was immersed in a aqueous solution, having a iodine concentration of 0.4 g/litter and a potassium iodide concentration of 40 g/litter, at 35° C. for 3 minutes. Successively, uniaxial stretching to 6 times was performed in a aqueous solution having a boric acid concentration of 4% at 50° C. under a condition of a tension applied to film of 700 N/m, and a fixing treatment was performed by immersion in a aqueous solution having a potassium iodide concentration of 40 g/litter, a boric acid concentration of 40 g/litter and a zinc chloride concentration of 10 g/litter at 30° C. for 5 minutes. Thereafter, the PVA film was taken out to be dried with a hot wind at 40° C. and was further subjected to a heat treatment at 100° C. for 5 minutes. The polarizer film prepared had a mean thickness of 13 μm; a transmittance of 43.0%, a polarizing degree of 99.5% and a dichroic ratio of 40.1, with respect to polarizing characteristics.

(b) Preparation of Polarizing Plate

Next, according to following processes 1-5, polarizing plates 1-100 were prepared by laminating polarizer film and polarizing plate protective film.

Process 1: Cellulose ester type optical compensation film and the above-described antireflection film were immersed into a 2 mol/L sodium hydroxide solution at 60° C. for 90 seconds, followed by being washed with water and dried. The surface of antireflection film, on which an antireflection layer was arranged, was protected by laminating a peelable protective film (made of PET).

Similarly, cellulose ester type optical compensation film was immersed into a 2 mol/L sodium hydroxide solution at 60° C. for 90 seconds, followed by being washed with water and dried.

Process 2: The aforesaid polarizer film was immersed into a polyvinyl alcohol adhesive bath having a solid content of 2 weight % for 1-2 seconds.

Process 3: Excess adhesive adhered on polarizer film in process 2 was removed and the resulting polarizer film was sandwiched with cellulose ester type optical compensation film and antireflection film, which had been alkaline processed in process 1, to be accumulated.

Process 4: The accumulated composition was pasted up by two rotating rollers at a pressure of 20-30 N/cm$^2$, and a speed of approximately 2 m/min. At this time, a caution was paid not to introduce bubbles.

Process 5: The sample prepared in process 4 was dried in a drier at 80° C. for 2 minutes, whereby a polarizing plate was prepared.

(Preparation of Cellulose Ester Type Optical Compensation Film)

According to the following method, cellulose ester type optical compensation film containing an ester compound and acrylic polymer according to this invention was prepared.

<Micro-Particle Dispersion 1>

| | |
|---|---|
| Micro-particles (Aerosil R972V manufactured by Nippon Aerosil Co., Ltd.) | 11 weight parts |
| Ethanol | 89 weight parts |

The above composition, after having been mixed with stirring by a dissolver for 50 minutes, was homogenized by use of a Manton-Gaulin homogenizer.

<Inline Additive Solution>

A dissolution tank filled with methylene chloride was added with cellulose ester B, and the system, after having been completely dissolved with heating, was filtered through Azumi Filter Paper No. 244 manufactured by Azumi Filter Paper Co., Ltd.

Cellulose ester solution after having been filtered was gradually added with micro-particle dispersion while being sufficiently stirred. Further, homogenizing was performed by use of an attritor so as to make a secondary particle size of a predetermined size. The resulting system was filtered through FINEMET NF manufactured by Nippon Seisen Co., Ltd., whereby in-line additive solution 1 was prepared.

| | |
|---|---|
| Methylene chloride | 99 weight parts |
| Cellulose ester F | 4 weight parts |
| Micro-particle dispersion 1 | 11 weight parts |

<Composition of Primary Dope>

| | |
|---|---|
| Methylene chloride | 380 weight parts |
| Ethanol | 70 weight parts |
| Cellulose ester F | 100 weight parts |
| Acrylic polymer A | 5.5 weight parts |
| Saccharose ester compound A of this invention | 5.5 weight parts |
| Ultraviolet absorbent (TINUVIN 326, manufactured by Ciba Specialty Chemicals Inc.) | 1.7 weight parts |

The above composition was charged in a closed vessel and was heated with stirring to be completely dissolved, followed by filtered through Azumi Filter Paper No. 24, manufactured by Azumi Filter Paper Co., Ltd., whereby a dope was prepared.

The dope was filtered through FINEMET NF, manufactured by Nippon Seisen Co., Ltd, in a casting line. The inline additive solution was filtered through FINEMET NF, manufactured by Nippon Seisen Co., Ltd, in an inline additive solution line. The dope of 100 weight parts having been filtered and added with 2 weight parts of the inline additive solution, after having been filtered, was sufficiently mixed with an inline mixer (Toray static type inline mixer, Hi-Mixer SWJ), followed by being cast on a stainless band support having a width of 1.8 m at a temperature of 35° C., by use of a belt casting machine. On the stainless band support, the above-cast web, after a solvent of which had been evaporated to make a residual solvent amount of 120%, was peeled off from the stainless belt support. The peeled-off cellulose ester web, after a solvent of which had been evaporated at 50° C., was slit into 1.65 m wide, and was successively stretched in the TD direction (the direction perpendicular to the transport direction of film) at 180° C. at a stretching magnification of 1.4 times by a tenter. The drying was completed while being transported with plural number of rolls through a drying zone of 120° C., being slit into 1.5 m wide, and was subjected to a knurling process having a width of 15 mm and a mean height of 10 μm, whereby cellulose ester type optical compensation film having a mean layer thickness of 40 μm was prepared. The film width was set to 1.5 m and the roll length was set to 1,000 m.

A light leakage amount was measured with respect to each prepared polarizing plates 1-100. The result will be shown in tables 7-9.

<Evaluation of Antireflection Film>
<Evaluation of Light leakage>

Two sheets of polarizing plates prepared were arranged in crossed nicols, and transmittance (T1) at 590 nm was measured by use of Spectrophotometer U3100 manufactured by Hitachi, Ltd. Further, the both two sheets of polarizing plates, after having been treated under a condition of 80° C. and 90% for 100 hours, transmittance (T2) was measured when being arranged in crossed nicols in a similar manner to described above to examine a variation of transmittance between before and after the thermal treatment, whereby light leakage was measured according to the following formula.

Light leakage amount (%)=$T2$(%)−$T1$(%)

A light leakage amount is preferably 0-1.5% and more preferably not more than 1%.

<Preparation of Liquid Crystal Display Apparatus>

A liquid crystal panel for viewing angle measurement was prepared in the following manner and characteristics as a liquid crystal display apparatus were evaluated.

A polarizing plate of 40 Type Display KLV-40V1000 manufactured by Sony Corp., which had been pasted up in advance, was peeled off, and each of the polarizing plates 1-100 prepared above was pasted up on the both surfaces of the glass plate of the liquid crystal cell. At this time, the pasting-up direction of the polarizing plate was set so that the surface of a cellulose ester type optical compensation film was on the liquid crystal cell side and the absorption axis was in the same direction as that of the polarizing plate which had been pasted up in advance, whereby each of liquid crystal display apparatuses of this invention and comparative liquid crystal display apparatuses was prepared.

With respect to these liquid crystal display apparatuses, a color tint variation and front contrast were evaluated. The results will be shown in tables 7-9.

<Evaluation of Front Contrast>

Measurement was performed after a backlight of each liquid crystal display apparatus had been continuously lit for one week under an environment of 23° C. and 55% RH. By utilizing EZ-Contrast 160D manufactured by ELDI Co., Ltd. in the measurement, illuminance from the vertical direction against the display surface in white display and black display were measured and a ratio thereof was defined as a front contrast.

Front contrast=(Illuminance in white display measured from vertical direction)/(Illuminance in black display measured from vertical direction)

TABLE 7

| Polarizing plate No. | Light leakage amount | Front contrast | Remarks |
|---|---|---|---|
| 1 | 0.2 | 1140 | Invention |
| 2 | 0.3 | 1140 | Invention |
| 3 | 0.5 | 1120 | Invention |
| 4 | 0.6 | 1100 | Invention |
| 5 | 0.7 | 1080 | Invention |
| 6 | 1.9 | 940 | Comparison |
| 7 | 2.0 | 960 | Comparison |
| 8 | 0.3 | 1160 | Invention |
| 9 | 0.5 | 1150 | Invention |
| 10 | 0.6 | 1150 | Invention |
| 11 | 0.6 | 1120 | Invention |
| 12 | 0.5 | 1130 | Invention |
| 13 | 0.7 | 1140 | Invention |
| 14 | 0.5 | 1150 | Invention |
| 15 | 0.6 | 1130 | Invention |
| 16 | 0.6 | 1110 | Invention |
| 17 | 0.7 | 1120 | Invention |
| 18 | 0.5 | 1110 | Invention |
| 19 | 0.5 | 1100 | Invention |
| 20 | 0.5 | 1100 | Invention |
| 21 | 0.6 | 1080 | Invention |
| 22 | 0.4 | 1100 | Invention |
| 23 | 0.6 | 1120 | Invention |
| 24 | 2.1 | 980 | Comparison |
| 25 | 0.5 | 1100 | Invention |
| 26 | 0.7 | 1090 | Invention |
| 27 | 0.6 | 1080 | Invention |
| 28 | 0.6 | 1080 | Invention |
| 29 | 0.6 | 1090 | Invention |
| 30 | 2.4 | 990 | Comparison |
| 31 | 0.4 | 1100 | Invention |
| 32 | 0.6 | 1090 | Invention |
| 33 | 0.7 | 1080 | Invention |
| 34 | 0.5 | 1090 | Invention |
| 35 | 0.5 | 1090 | Invention |
| 36 | 2.3 | 950 | Comparison |
| 37 | 0.6 | 1100 | Invention |
| 38 | 0.6 | 1110 | Invention |
| 39 | 0.6 | 1120 | Invention |
| 40 | 0.6 | 1090 | Invention |

TABLE 8

| Polarizing plate No. | Light leakage amount | Front contrast | Remarks |
|---|---|---|---|
| 41 | 0.7 | 1080 | Invention |
| 42 | 2.6 | 950 | Comparison |
| 43 | 0.5 | 1110 | Invention |
| 44 | 0.5 | 1090 | Invention |
| 45 | 0.6 | 1110 | Invention |
| 46 | 0.5 | 1080 | Invention |
| 47 | 0.7 | 1070 | Invention |
| 48 | 2.6 | 970 | Comparison |
| 49 | 0.5 | 1090 | Invention |
| 50 | 0.8 | 1090 | Invention |
| 51 | 0.6 | 1100 | Invention |
| 52 | 0.6 | 1080 | Invention |
| 53 | 0.6 | 1070 | Invention |
| 54 | 2.4 | 970 | Comparison |
| 55 | 0.8 | 1100 | Invention |
| 56 | 0.8 | 1110 | Invention |
| 57 | 0.6 | 1140 | Invention |
| 58 | 0.6 | 1130 | Invention |
| 59 | 0.6 | 1150 | Invention |
| 60 | 2.5 | 980 | Comparison |
| 61 | 0.3 | 1140 | Invention |
| 62 | 0.5 | 1120 | Invention |
| 63 | 0.5 | 1140 | Invention |
| 64 | 0.6 | 1100 | Invention |
| 65 | 0.7 | 1110 | Invention |
| 66 | 2.6 | 970 | Comparison |
| 67 | 0.5 | 1130 | Invention |
| 68 | 0.5 | 1150 | Invention |
| 69 | 0.6 | 1120 | Invention |
| 70 | 0.6 | 1140 | Invention |
| 71 | 0.7 | 1110 | Invention |
| 72 | 2.1 | 940 | Comparison |
| 73 | 0.6 | 1120 | Invention |
| 74 | 0.5 | 1130 | Invention |
| 75 | 0.7 | 1110 | Invention |
| 76 | 0.7 | 1140 | Invention |
| 77 | 0.6 | 1130 | Invention |
| 78 | 1.8 | 960 | Comparison |
| 79 | 0.5 | 1130 | Invention |

TABLE 9

| Polarizing plate No. | Light leakage amount | Front contrast | Remarks |
|---|---|---|---|
| 80 | 0.5 | 1120 | Invention |
| 81 | 0.4 | 1100 | Invention |
| 82 | 0.6 | 1140 | Invention |
| 83 | 0.6 | 1110 | Invention |
| 84 | 1.9 | 990 | Comparison |
| 85 | 0.5 | 1120 | Invention |
| 86 | 0.7 | 1140 | Invention |
| 87 | 0.8 | 1130 | Invention |
| 88 | 0.7 | 1130 | Invention |
| 89 | 0.8 | 1110 | Invention |
| 90 | 2.0 | 980 | Comparison |
| 91 | 0.6 | 1100 | Invention |
| 92 | 0.7 | 1080 | Invention |
| 93 | 0.5 | 1090 | Invention |
| 94 | 0.6 | 1080 | Invention |
| 95 | 0.8 | 1090 | Invention |
| 96 | 2.0 | 940 | Comparison |
| 97 | 1.9 | 950 | Comparison |
| 98 | 1.8 | 960 | Comparison |
| 99 | 1.0 | 1080 | Invention |
| 100 | 2.3 | 930 | Comparison |

It is clear from the results of tables 7-9 that polarizing plates of this invention are superior in light leakage property. Further, it is clear that liquid crystal display apparatuses of this invention are superior in front contrast.

Example 3

<Preparation of Clear Hard Coat Film 200>

Employing above-described cellulose ester film 1 clear hard coat film was prepared according to the following procedure.

The following hard coat layer coating composition was filtered through a filter made of polypropylene having a pore size of 0.4 μm to prepare a hard coat layer coating solution, which was coated by use of a gravure coater on above-described cellulose ester film 1, and the coated layer was cured with an ultraviolet lamp at an illuminance on an irradiation portion of 100 mw/cm², and irradiation quantity of 0.15 J/cm², to form a hard coat layer having a dry layer thickness of 9 μm; then the following back coat layer coating composition was coated on the surface opposite to the surface coated with a hard coat layer by use of an extrusion coater so as to make a wet layer thickness of 10 μm, followed by being dried at 50° C., whereby clear hard coat film 200 was prepared <Heat Treatment of Hard Coat Film>

Clear hard coat film 200 prepared was wound on a plastic core at a length of 1,000 m. This hard coat film rolls as a result of having been subjected to a heat treatment at 65° C. for 24 hours in a heat treatment room, was proved to be hard coat film without bleed out and provided with excellent flatness and pencil hardness (measured by pencil hardness evaluation method defined by JIS-K-5400 employing a test pencil defined by JIS-S-6006) as high as not less than 4H.

Next, an antireflection layer was coated in a similar manner to example 2, and the prepared antireflection film was incorporated in a polarizing plate and a liquid crystal display apparatus to show excellent light leakage property and front contrast.

<Hard Coat Layer Composition>

The hard coat layer was prepared in the following way.

(Preparation of Fluorine-Siloxane Graft Polymer 1)
[Synthesis of Radical Polymerizing Fluorine-containing Resin (A)]

CEFRALCOAT CF-803 (hydroxyl group value of 60, number average molecular weight of 15,000; manufactured by Central Class Co., Ltd., 1,554 weight parts), xylene (233 weight parts) and 2-isocyanate ethylmethacrylate (6.3 weight parts), hardener, SUMIJULE N3200 (burette type prepolymer of hexamethylene diisocyanate; manufactured by Sumitomo Bayer Urethane Co., Ltd., 10 parts by weight were charged in a glass reaction vessel equipped with a mechanical stirrer, a thermometer, a condenser and a dry nitrogen gas introducing inlet, and the system was heated at 80° C. under a dry nitrogen atmosphere. Reaction proceeded at 80° C. for 2 hours, and the reaction mixture was taken out after confirming by infrared spectrogram of a sampled product that isocyanate had been disappeared, whereby 50 weight % via urethane bonding of radical polymerizing fluorine-containing resin (A) was prepared.

Preparation of Fluorine-Siloxane Graft Copolymer

Above-synthesized radical polymerizing fluorine-containing resin (A) (26.1 weight parts), xylene (19.5 weight parts), n-butyl acetate (16.3 weight parts), methyl methacrylate (2.4 weight parts), n-butyl methacrylate (1.8 weight parts), lauryl methacrylate (1.8 weight parts), 2-hydroxyethyl methacrylate (1.8 weight parts), FM-0721 (5.2 weight parts) and PERBUTYL O (0.1 weigh part) were charged in a glass reaction vessel equipped with a mechanical stirrer, a thermometer, a condenser and a dry nitrogen gas introducing inlet, and the system was kept at 90° C. for 2 hours after having been heated up to 90° C. under a nitrogen atmosphere. PERBUTYL O (0.1 part) was further added and the system was kept at 90° C. for 5 hours, whereby a 35 weigh % solution of fluorine-siloxane graft polymer 1 having a weight average molecular weight of 171,000 was prepared.

In the following, commercial product names of materials utilized in preparation of fluorine-siloxane graft polymer 1 will be shown.

One end radical polymerizing polysiloxane (B): SILAPLANE FM-0721 (number average molecular weight of 5,000; manufactured by Chisso Corp.)

Radical polymerization initiator: PERBUTYL O (t-butylperoxy-2-ethylhexanoate; manufactured by NOF Corp.)

The weight average molecular weight was determined by GPC. Further, weight % of fluorine-siloxane graft polymer 1 was determined by HPLC (liquid chromatography).

The following materials were stirred and mixed to prepare a hard coat layer coating composition.

| | |
|---|---|
| Pentaerythritol triacrylate | 20.0 weight parts |
| Pentaerythritol tetacrylate | 50.0 weight parts |
| Dipentaerythritol hexacrylate | 30.0 weight parts |
| Dipentaerythritol pentaacrylate | 30.0 weight parts |
| IRGACURE 184 (manufactured by Ciba Specialty Chemicals Inc.) | 5.0 weight parts |
| IRGACURE 907 (manufactured by Ciba Specialty Chemicals Inc.) | 10.0 weight parts |
| Fluorine-siloxane graft polymer 1 (35 weight %) | 5.0 weight parts |
| Pentaerythritol tetrakis (3-mercaptobutyrate) | 2.5 weight parts |
| Propylene glycol monomethylether | 10 weight parts |
| Methyl acetate | 20 weight parts |
| Acetone | 20 weight parts |
| Methyl ethyl ketone | 60 weight parts |
| Cyclohexanone | 20 weight parts |

<Back Coat Layer Coating Composition>

| | |
|---|---|
| Diacetyl cellulose | 0.6 weight parts |
| Acetone | 35 weight parts |
| Methyl ethyl ketone | 35 weight parts |
| Methanol | 35 weight parts |
| 2% methanol dispersion of silica particles (KE-P30, manufactured by Nippon Shokubai Co., Ltd.) | 16 weight parts |

What is claimed is:

1. An optical film having a hard coat layer on a cellulose ester film, wherein the cellulose ester film comprises a cellulose ester and an ester compound composed of a furanose structure or a pyranose structure, a sum of a number of the furanose structure or the pyranose structure in the ester compound is 1 to 12, a part of the hydroxy groups of the furanose structure or the pyranose structure in the ester compound has been esterified and a part of the hydroxy groups of the furanose structure or the pyranose structure in the compound remains, wherein 0-90% by weight of the ester compound has no hydroxy group and 10-90% by weight of the ester compound has only one hydroxy group; wherein the cellulose ester has an acetyl group substitution degree X which satisfies $2.8 \leq X \leq 3.0$; wherein the haze value of the optical film is not more than 2.0%; and when the optical film is cut out into a sample size of 90 cm wide and 100 cm long, all of the 5 tubes of 50 W fluorescent lamps which are fixed in a line at a height of 1.5 m, irradiating the film sample in an angle of 45°, are observed to be straight, or only some part of the irradiating 5 fluorescent lamps are observed to be slightly bending.

2. The optical film of claim 1, wherein the sum of a number of the furanose structure or the pyranose structures is 1 to 6.

3. The optical film of claim 1, wherein the ester compound is composed of at least one furanose structure, in which a part of the hydroxy groups has been esterified and a part of the hydroxy groups remains.

4. The optical film of claim 1, wherein the ester compound is a compound represented by formula (A) in which m and n is an integer of 1 to 12, respectively, provided that sum of m and n is 2 to 12, formed by dehydration condensation of not less than arbitrary two positions of $-OR_{12}$, $-OR_{15}$, $-OR_{22}$ and —$OR_{25}$, and at least one of $R_{11}$, $R_{12}$, $R_{13}$, $R_{14}$, $R_{15}$, $R_{21}$, $R_{22}$, $R_{23}$, $R_{24}$, $R_{25}$ is a hydrogen atom;

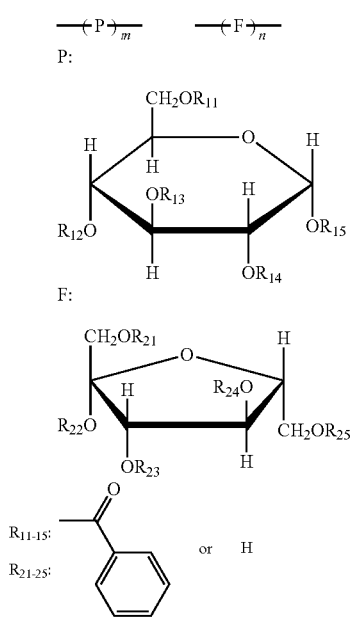

Formula (A)

wherein, the benzoyl group may have a substituent.

5. The optical film of claim 1, wherein the cellulose ester film contains an acrylic polymer.

6. The optical film of claim 1 wherein the hard coat layer comprises a urethane acrylate resin.

7. The optical film of claim 1 comprising an antireflection layer provided on the hard coat layer, wherein the antireflection layer comprises a low refractive index layer containing hollow silica micro-particles.

8. A polarizing plate having the optical film of claim 1.

9. A liquid crystal display apparatus having the polarizing plate of claim 8.

10. The optical film of claim 1, wherein
0-20% by weight of the ester compound has three or more hydroxy groups.

11. The optical film of claim 1, wherein
0-75% by weight of the ester compound has no hydroxy group,
20-80% by weight of the ester compound has one hydroxy group,
5-30% by weight of the ester compound has two hydroxy groups, and
0-10% weight of the ester compound has three or more hydroxy groups.

12. The optical film of claim 1, wherein
the ester compound is a monosaccharide (α-glucose, β-fructose) in which a part of the hydroxy groups are esterified by an acid having an aromatic ring, provided that the acid may have a substituent, and a part of the hydroxy group remains.

13. The optical film of claim 1, wherein
0-75% by weight of the ester compound has no hydroxy groups.

14. An optical film having a hard coat layer on a cellulose ester film, wherein the cellulose ester film comprises a cellulose ester and an ester compound composed of a furanose structure and a pyranose structure, a sum of a number of the furanose structure and the pyranose structure in the ester compound is at most 12, a part of the hydroxy groups of the furanose structure and the pyranose structure in the ester compound has been esterified and a part of the hydroxy groups of the furanose structure and the pyranose structure in the compound remains, wherein 0-90% by weight of the ester compound has no hydroxy group and 10-90% by weight of the ester compound has only one hydroxy group; wherein the cellulose ester has an acetyl group substitution degree X which satisfies 2.8≤X≤3.0; wherein the haze value of the optical film is not more than 2.0%; and when the optical film is cut out into a sample size of 90 cm wide and 100 cm long, all of the 5 tubes of 50 W fluorescent lamps which are fixed in a line at a height of 1.5 m, irradiating the film sample in an angle of 45°, are observed to be straight, or only some part of the irradiating 5 fluorescent lamps are observed to be slightly bending.

15. The optical film of claim 14, wherein
the ester compound composed of a furanose structure and a pyranose structure is sucrose.

* * * * *